United States Patent
Boutilier et al.

(10) Patent No.: US 8,515,814 B2
(45) Date of Patent: Aug. 20, 2013

(54) AUTOMATED CHANNEL ABSTRACTION FOR ADVERTISING AUCTIONS

(75) Inventors: Craig E. Boutilier, Toronto (CA); George L. Nemhauser, Atlanta, GA (US); David C. Parkes, Cambridge, MA (US); Tuomas Sandholm, Pittsburgh, PA (US); Robert L. Shields, Jr., Pittsburgh, PA (US); William E. Walsh, Pittsburgh, PA (US)

(73) Assignee: CombineNet, Inc., Pittsburgh, PA (US)

( * ) Notice: Subject to any disclaimer, the term of this patent is extended or adjusted under 35 U.S.C. 154(b) by 767 days.

(21) Appl. No.: 12/616,217

(22) Filed: Nov. 11, 2009

(65) Prior Publication Data

US 2010/0121671 A1 May 13, 2010

Related U.S. Application Data

(60) Provisional application No. 61/113,306, filed on Nov. 11, 2008, provisional application No. 61/151,333, filed on Feb. 10, 2009.

(51) Int. Cl.
*G06Q 30/00* (2012.01)

(52) U.S. Cl.
USPC ............ 705/14.73; 705/14.71; 705/14.4; 705/26.1

(58) Field of Classification Search
USPC ............ 705/26.1–27.2, 14.4–14.73
See application file for complete search history.

(56) References Cited

U.S. PATENT DOCUMENTS

| | | | |
|---|---|---|---|
| 8,214,267 B2 * | 7/2012 | Von Helmolt et al. | 705/28 |
| 8,306,872 B2 * | 11/2012 | Inoue et al. | 705/26.7 |
| 2002/0042756 A1 * | 4/2002 | Kumar et al. | 705/26 |
| 2006/0085336 A1 * | 4/2006 | Seubert et al. | 705/40 |
| 2006/0190310 A1 * | 8/2006 | Gudla et al. | 705/7 |
| 2007/0185816 A1 * | 8/2007 | Davis | 705/51 |
| 2007/0198365 A1 * | 8/2007 | Dutta et al. | 705/26 |
| 2007/0226082 A1 * | 9/2007 | Leal | 705/27 |
| 2009/0083119 A1 * | 3/2009 | Mided et al. | 705/10 |
| 2009/0119172 A1 * | 5/2009 | Soloff | 705/14 |
| 2010/0076895 A1 * | 3/2010 | Spencer et al. | 705/80 |
| 2012/0203625 A1 * | 8/2012 | Soloff | 705/14.44 |

OTHER PUBLICATIONS

"Intra-personal and inter-personal dimensions of promotion . . . " Henderson, Ty Thomas ProQuest Dissertations and Theses; 2007; ProQuest.*

(Continued)

*Primary Examiner* — Michael Misiaszek
(74) *Attorney, Agent, or Firm* — The Webb Law Firm

(57) ABSTRACT

In a computer-implemented method of determining an abstraction of a plurality of differentiated goods available for exchange, data regarding each differentiated good is stored in a computer storage, wherein the data regarding each differentiated good includes an attribute value assigned to at least one attribute of the differentiated good. A processor of a computer determines a first abstraction of the plurality of differentiated goods based on the stored data. The first abstraction includes at least one abstract good. Each abstract good includes one or more differentiated goods. At least one abstract good of the first abstraction includes at least two distinct differentiated goods. The processor determines for each abstract good a specification for the abstract good based on the data regarding one or more differentiated goods forming the abstract good. The processor stores in the computer storage the specification determined for each abstract good.

37 Claims, 4 Drawing Sheets

DNF SEARCH TREE FOR A SINGLE SPLIT

(56) References Cited

OTHER PUBLICATIONS

T. Sandholm, "Expressive Commerce and Its Application to Sourcing: How We Conducted $35 Billion of Generalized Combinatorial Auctions", AI Magazine, vol. 28, No. 3, 2007, pp. 45-58.
H.R. Varian, "Position auctions", International Journal of Industrial Organization, vol. 25, No. 6, (2007), pp. 1163-1178.
Abrams et al., "Optimal Delivery of Sponsored Search Advertisements Subject to Budget Constraints", ACM EC, San Diego, 2007, 7 pages.
Benisch et al., "The Cost of Inexpressiveness in Advertisement Auctions", Fourth Workshop on Ad Auctions, Chicago, 2008, 9 pages.
Bollapragada et al., "NBC's Optimization Systems Increase Revenues and Productivity", Interfaces, vol. 32, No. 1, 2002, pp. 47-60.
Borgs et al., "Dynamics of Bid Optimization in Online Advertisement Auctions", WWW, Banff, Alberta, Canada, 2007, pp. 531-540.
Boutilier et al., "Expressive Banner Ad Auctions and Model-Based Online Optimization for Clearing", AAAI, Chicago, 2008, 8 pages.
R.E. Bryant, "Graph-Based Algorithms for Boolean Function Manipulation", IEEE Transactions on Computers, vol. C-35, No. 8, 1986, pp. 677-691.
Edelman et al., "Internet Advertising and the Generalized Second-Price Auction: Selling Billions of Dollars Worth of Keywords", American Economic Review, vol. 97, No. 1, 2007, pp. 242-259.
Feldman et al., "Budget Optimization in Search-Based Advertising Auctions", Workshop on Agent Mediated Electronic Commerce, 2007, pp. 40-49.
Lahaie et al., "An Expressive Auction Design for Online Display Advertising", AAAI, Chicago, 2008, 7 pages.
Lubbecke et al., "Selected Topics in col. Generation", Operations Research, vol. 53, No. 6, 2005, pp. 1007-1023.
Mehta et al., "AdWords and Generalized On-line Matching", Proceedings of the 46th Annual IEEE Symposium on Foundations of Computer Science, 2005, pp. 1-19.
Parkes et al., "Optimize-and-Dispatch Architecture for Expressive Ad Auctions", First Workshop on Sponsored Search Auctions, Vancouver, British Columbia, 2005, 8 pages.
Rusmevichientong et al., "An Adaptive Algorithm for Selecting Profitable Keywords for Search-Based Advertising Services," ACM EC, 2006, 26 pages.

\* cited by examiner

DNF SEARCH TREE FOR A SINGLE SPLIT

ABSTRACTION 0

Solve abstract LPO;
use reduced cost
scoring to search over
DNF formula to find split
of abstract channel

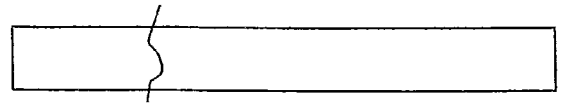

ABSTRACTION 1

Solve abstract LPO;
use reduced cost
scoring to search over
DNF formula to find split
of abstract channel

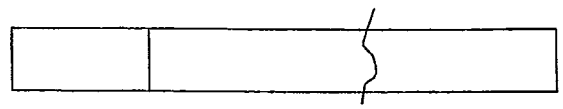

ABSTRACTION 2

Solve abstract LPO;
use reduced cost
scoring to search over
DNF formula to find split
of abstract channel

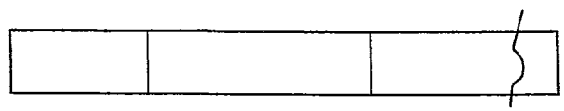

ABSTRACTION REFINEMENT: THE BIG PICTURE

FIG. 3

FRACTION OF UPPER BOUND vs NUMBER OF CHANNELS FOR m=10, n=100.

AUTOMATED CHANNEL ABSTRACTION FOR ADVERTISING AUCTIONS

CROSS REFERENCE TO RELATED APPLICATIONS

The present application claims priority from U.S. Provisional Patent Application No. 61/113,306, filed Nov. 11, 2008, and from U.S. Provisional Patent Application No. 61/151,333, filed Feb. 10, 2009, both of which are incorporated herein by reference.

BACKGROUND OF THE INVENTION

1. Field of the Invention

The present invention relates to expressive auctions for the allocation of differentiated supply. The invention will be described in connection with advertising auctions, i.e., auctions for the display of advertisements on computer devices, but applies more broadly to the allocation of differentiated supply of any collection of goods (e.g., to bidders or participants in a marketplace).

2. Description of Related Art

Online advertising has radically changed both the nature of advertising and the technology used to support the development and deployment of ad campaigns. While ad targeting and campaign design is inherently complex, the variety of online advertising services has only increased this complexity. In particular, the ability to target ads to specific individuals based on detailed, personalized online information—information that is simply not available in broadcast media—presents compelling opportunities and tremendous technical challenges for ad delivery. For instance, the development of sophisticated matching and bidding algorithms for sponsored search, such as position auctions using the generalized second price (GSP) mechanism, can be viewed as a response to such opportunities.

Contextual information about a user that suggests what a user is looking for and thinking about when engaged in online activities (such as web search) is extremely valuable to advertisers. The ability to target their advertisements to those users where the likelihood of impact is greatest—as suggested by the current contextual information—can dramatically improve the effectiveness of ads. The publishers of online information and providers of online services (such as search engines) have access to valuable contextual cues that can be used to help target advertisements.

This current state of online advertising can be characterized roughly as follows: Potential advertisers can interact directly with a publisher or search engine to determine where (and when) to place their ads, or they can reach a wide set of publishers by placing their ads via an advertising network. Generally, an advertiser will indicate the contextual conditions of interest, the amount they are willing to pay for placement of their ad or for some event caused by the ad placement (such as a click on their ad)—assuming the contextual conditions are met—and often a budget limiting the total amount of spend (and, indirectly, the number of ads placed).

One example of this interaction is exemplified by the Google search engine. An advertiser indicates their interest in specific users by bidding on particular query keywords, with their bid indicating a maximal willingness-to-pay per click for different keyword queries. For instance, "I will pay $0.10 for each query with search terms basketball+betting but no more than $200 each 24 hours". Advertisers (bidders) compete for the right to display ads, and the price paid per click for any winning bidder is a function of the other bids competing for the same (or related) keywords. In other words, Google, like many other search engines, publishers, and ad networks, uses an auction to place ads.

Another example is the display of banner ads through an advertising network. The network (e.g., as exemplified by RightMedia) consists of potential advertisers and publishers of web content/services. Advertisers bid for the right to display ads on particular types of web sites/pages, while publishers can restrict the types of ads that can appear on their sites. Again, an auction is typically used to determine a suitable assignment of ads to specific web sites/pages. Advertisers can indicate their target users of interest by specifying appropriate contextual conditions. For instance, the advertiser might specify that their ad must only be displayed: on web pages with a particular type of content (e.g., as indicated by the presence of keywords, tags, etc.); at a certain time of day; to users with a particular demographic profile (e.g., as verified by publishers of subscription sites/services, or estimated by the publisher).

More general expressive advertising auctions allow advertisers to express extremely complex conditions on the placement of their ads. In expressive auctions, advertisers can express their willingness to pay for sequences or sets of ad impressions, clicks, or other events. Expressiveness forms include: payment only if minimum targets are met; multiple targets and tiered payment; temporal sequencing of different ads; substitution of different web sites or other contextual properties.

It is important to realize that the supply of advertising space to advertisers need not be determined by an auction or an explicit market mechanism. It could be allocated using non-competitive processes such manually negotiated contracts between publishers/ad networks and advertisers. However, advertisers are rarely interested in arbitrary placement of ads: even in non-market based settings, the contextual information associated with an ad placement is vital.

In contrast to sponsored search, the selling of banner ads (aka. display ads) is still largely approached through manual negotiation. There are some exceptions to this, with online exchanges for banner ads established by companies like Right Media (now part of Yahoo!) and DoubleClick (now part of Google); however, these exchanges largely deal with lower-value, "remnant" inventory on web sites. Premium display advertising space (e.g., slots near the top, or "above the fold", of high traffic, high profile websites) is sold almost exclusively by non-automated means. The primary reason for this is a perception that auction/market mechanisms cannot be made to work for the types of campaign-level expressiveness required for display ads (e.g., as required by brand advertisers). This parallels the situation is sourcing, where advances in modeling and optimization have led to the adoption of expressive bidding (and expressive bid-taking) for what had previously been widely viewed as "too valuable" to leave to auction mechanisms. The expressive auction mechanisms are now used also for striking strategic long-term contracts on the most valuable parts of the sourcing spend.

In campaign-level-expressiveness, a variety of expressiveness forms are outlined (these include impression targets, smoothness of delivery, temporal sequencing, complements and substitutes, and many others). Although sophisticated bidding strategies can be effective in optimizing some limited forms of expressive preferences (e.g., long-term budgets) in an inexpensive auction, arbitrarily large inefficiencies can nevertheless arise. Allowing richer languages in which advertisers can express their campaign preferences directly, rather than forcing them into standard per-impression or per-click bidding models, is critical to admitting the automated matching and selling of banner ads.

A key bottleneck remains: the use of expressive bidding requires optimization to match ad supply with advertisers' demand. The richer the expressiveness forms, the more complex the optimization. For example, a stochastic optimization model can allocate ad supply to advertisers who bid using rich, campaign-level expressiveness forms. It can explicitly account for uncertainty in both supply and demand. However, it has long been recognized that even with very limited forms of expressiveness—as simple as per-impression value/pricing with budget constraints and bid expiration—that optimization is critical to extracting full value from one's ad inventory. Indeed, using simple myopic mechanisms like GSP can lead to significant loss in efficiency and revenue.

SUMMARY OF THE INVENTION

Herein, an impediment to the use of optimization in ad auctions, namely, that of channel explosion is addressed. A key advantage advertisers have in online settings is the ability to segment the target audience using an enormous variety of attributes: both static attributes (like user demographic) and dynamic attributes such as context (e.g., current browsing history, location) or historical data (e.g., past purchases, activity, etc.). This means that the number of attributes over which ad allocation must occur is extremely large. And the number of specific ad channels to which ads can be assigned—i.e., the number of distinct attribute instantiations—grows exponentially in the number of attributes. Any optimization model must (usually quite explicitly) assign advertisers to explicit channels over time—both simple linear programming (LP) models that use only budget constraints and sophisticated mixed-integer (MIP) models use variables of the form $x^i_j$ to denote the allocation of some amount of the supply of channel j to advertiser i. For example, each distinct keyword/query can be a channel; and bids (or more precisely, slates of bids) are allocated to each query. Tractability is achieved by focusing on only the few thousand highest-volume queries. The MIP model of this uses assignment variables for losslessly "abstracted" channels consisting of (bid, attribute)-intersections, and is limited to a relatively small number of channels. These models simply cannot scale directly to problems involving more than a few thousand channels (e.g., on the order of 10-15 (Boolean) channel attributes).

The channel explosion problem can be addressed through the use of channel abstraction. Intuitively, an abstract channel is any aggregation of these "concrete" channels (i.e., attribute instantiations) into a single abstract channel for the purposes of optimization. During allocation optimization, ads are assigned to abstract channels rather than concrete channels; as discussed below, dispatch of ads assigned to an abstract channel will generally be sensitive to the actual channel, or full attribute instantiation, in question hence with appropriate abstraction, exponential reduction in the number of channels can be obtained, thus rendering optimization practical. Furthermore, a well-chosen abstraction will often provide very little sacrifice of revenue or efficiency (often even providing an optimal, lossless abstraction). Such abstractions should be derived by considering their impact on value (e.g., efficiency or revenue) as opposed to clustering based on purely, say, statistical properties of the attributes in question.

Proposed herein are computer-implemented techniques for automatically generating abstractions and for optimization using a set of abstract channels. The first computer-implemented algorithm uses a form of column generation to generate an abstraction: starting with a crude abstraction, the abstraction is gradually refined by introducing distinctions that have maximal impact on objective value. Unlike standard column generation, the present invention determines which collection of columns to add (and remove). Novel scoring techniques have been developed to do just this. This computer-implemented algorithm can be used for arbitrary expressiveness forms, but is designed to take advantage of LP structure. Also developed is a new computer-implemented constraint generation algorithm for optimizing an ad allocation MIP using a specific set of abstract channels (e.g., those generated utilizing the column generation algorithm described herein). This method incrementally refines the allocation of bids to abstract channels by posting constraints to ensure advertisers are assigned only relevant ad slots. This method will converge, in principle, to an optimal solution given enough time. However, the technique can be cut short with an approximate solution, and it can be used to suggest further channel refinement for purposes of tractability.

The invention is a computer-implemented method of determining an abstraction of a plurality of differentiated goods available for exchange. Each differentiated good is differentiatable based on at least one property of the good and each property has associated therewith at least one attribute. The computer-implemented method can include: (a) storing in a computer storage accessible to a processor of a computer data regarding each differentiated good of a plurality of differentiated goods, wherein the data regarding each differentiated good can include an attribute value assigned to at least one attribute of the differentiated good; (b) the processor determines a first abstraction of the plurality of differentiated goods based on the data in step (a), wherein the first abstraction comprises at least one abstract good, each abstract good can include one or more differentiated goods, and at least one abstract good of the first abstraction can include at least two distinct differentiated goods; (c) the processor determines for each abstract good a specification for said abstract good based on the data regarding one or more differentiated good comprising the abstract good; and (d) the processor stores in the computer storage the specification determined for each abstract good in step (c).

The data in step (a) can further include a supply quantity of at least one differentiated good over a time period, wherein the supply quantity is either known with certainty or estimated.

The method can further include: (e) storing in the computer storage data about at least one set of one or more first offers to purchase, wherein each offer to purchase is either an actual offer or an estimate of a current or future offer to purchase, and each offer to purchase can include at least one differentiated good set, wherein each differentiated good set can include at least one differentiated good and an associated price, wherein: step (b) can include the processor determining the first abstraction further based on the set of first offers to purchase; and the specification for at least one abstract good in step (c) can include data about a supply quantity available or predicted to be available for the abstract good, and that portion of the supply quantity for the abstract good that satisfies one or more attribute values.

The specification of the prices related to the one or more sets of goods includes at least one of the following: a price to be paid per unit of good in any set; for each set, a price to be paid per unit of good in that set; a price per unit of good satisfying some property that is delivered to the buyer; an overall budget constraint limiting the maximum total payment for the one or more sets of goods; for each set, a budget constraint on the maximum total payment for goods in that set; for each set, a price to be paid for the entire set; or a price to be paid for the satisfaction of the one of more of constraints on the relationship between goods within a set or the quantity of goods in a set.

The at least one differentiated good set in step (e) can include at least one of the following: at least one property that each differentiated good in the differentiated good set must satisfy; at least one constraint on a relationship between the properties of a first subset of differentiated goods in the differentiated good set and the properties of a second subset of differentiated goods in the differentiated goods set; and at least one constraint on the quantity of differentiated goods in the differentiated goods set.

At least one constraint on the quantity of goods in the set of at least one good associated with the first offer to purchase includes at least one of the following: a minimum quantity constraint, a maximum quantity constraint, and a constraint on the quantity of goods with at least one temporal property.

The at least one property that each differentiated good in at least one differentiated good set must satisfy can include at least one of the following: inclusion in a set of one or more differentiated goods; the differentiated good has an attribute with a value from a set of one or more attribute values; and the values assigned to each of the attributes associated with the differentiated good satisfies a Boolean formula using operators AND, OR or NOT.

The at least one constraint on the relationship between the properties of the first subset of differentiated goods and the properties of the second subset of differentiated goods can include a constraint on the ratio of a quantity of differentiated goods in the first subset of differentiated goods and a quantity of differentiated goods in the second subset of differentiated goods, where the differentiated goods in the first subset of differentiated goods satisfy a first property and the differentiated goods in the second subset satisfy a second property.

The price associated with at least one differentiated good set can include at least one of the following: a per-unit price for each differentiated good in the differentiated good set; a per-unit price for each differentiated good in the differentiated good set that satisfies some property of the differentiated good; a budget constraint on a maximum total payment for differentiated goods in the differentiated good set; and a total price for the differentiated good set At least one first offer to purchase can include at least one of the following: a price to be paid per unit of differentiated good in each differentiated good set associated with the first offer to purchase; and an overall budget constraint limiting the maximum total payment for goods across all differentiated good sets associated with the first offer to purchase.

The at least one differentiated good and an associated price in step (e) can include at least one of the following: a constraint requiring that every good in the set satisfies at least one property, including either verifiable or stochastically verifiable properties; a condition requiring that an observable action occurs in response to the allocation of a good; a condition that defines a set of allowable substitutes for at least one good; a payment rule with one of an all-or-nothing bonus, tiered pricing, a trigger condition and effect; a constraint requiring that a minimum quantity of goods are allocated; a constraint requiring that a maximum quantity of goods is allocated; a constraint on the sequencing of the allocation of goods to an offer to purchase over a specified interval of time, including at least one of a smoothing, ramp-up, or sequencing constraint; a payment rule specifying a positive adjustment in the event that complementary goods are allocated; a payment rule that can include a counting constraint on the maximum number of goods for which payment will be made; a budget constraint on the total payment that can be made associated with an offer to purchase; an aggregate volume constraint on the total volume of goods that can be allocated to an offer to purchase; a frequency constraint on the frequency with which goods are allocated over some time interval to an offer to purchase; a joint allocation constraint on the allocation of one or more goods to the offer to purchase based on the allocation of one or more related goods to at least one other offer to purchase; and a payment rule with an adjustment that has at least one prerequisite that must be satisfied as a condition to adjusting the payment.

The method can further include the processor receiving a set of second offers to purchase, wherein at least one second offer to purchase can include at least one set of at least one abstract good and a price associated with said set of abstract goods, where the abstract goods included in the second offer to purchase are selected from the abstract goods of the first abstraction determined in step (b).

The first offers to purchase can be actual offers to purchase and the method can further include: (f) the processor determining an allocation of differentiated goods to at least one first offer to purchase in response to allocating none or at least a portion of one or more abstract goods of the first abstraction of step (b) to the first offer to purchase; (g) the processor determining a payment rule for the supply of abstract goods allocated to the first offer to purchase in step (f), wherein said payment rule is based on the specification of the abstract goods allocated in step (f) and the at least one differentiated good set included in the first offer to purchase in step (f); and (h) storing in the computer storage each allocation of differentiated goods and the payment rule.

The payment rule in step (g) can be determined in one of the following ways: when differentiated goods associated with an abstract good allocated to each first offer to purchase in step (f) are allocated randomly, the processor determines for each first offer to purchase the number of differentiated goods allocated to the first offer to purchase that are included in the one or more differentiated good sets associated with the first offer to purchase, and calculates a payment based on this determination; or the processor allocates to each first offer to purchase in step (f) only differentiated goods comprising said abstract good that are included in each differentiated good set associated with the first offer to purchase, and calculates a payment based on this determination.

The allocation in step (f) can satisfy one of the following objectives: maximizing total payments given a known supply of goods; maximizing total estimated payments given an estimated supply of goods; maximizing worst-case payments over a plurality of possible realizations of the estimated supply of goods; maximizing risk-adjusted revenue or expected utility given a distribution on possible realizations of estimated supply of goods; or maximizing total social welfare given estimated utility of buyers associated with offers to purchase and an estimated supply of goods.

The method can further include (e) storing in the computer storage data about at least one set of one or more first offers to trade, wherein each offer to trade is either an actual offer or an estimate of a current or future offer to trade, each offer to trade can include at least one set of at least one of the plurality of differentiated goods, wherein each differentiated good set can include at least one differentiated good and an associated price, and each offer to trade is either an offer to purchase or an offer of sale, wherein step (b) can include the processor determining the first abstraction further based on the set of first offers to trade.

The first offers to trade can be actual offers to trade and the method can further include: (f) the processor determining an allocation of differentiated goods to at least one first offer to trade in response to allocating none or at least a portion of one or more abstract goods of the first abstraction of step (b) to the first offer to trade; (g) the processor determining a payment rule for the allocation of abstract goods to at least one first offer to trade in response to allocating at least a portion of one or more abstract goods of the first abstraction in step (b) to said first offer to trade, wherein said payment rule is based on the specification of the abstract goods allocated in step (f) and the at least one differentiated good set included in the first offer to trade; and (h) storing in the computer storage each allocation of differentiated goods and the payment rule.

The method can further include: (f) the processor receiving a set of second offers to trade; (g) the processor determining an allocation of differentiated goods to at least one second offer to trade in response to allocating none or at least a portion of one or more abstract goods of the first abstraction of step (b) to the second offer to trade; (h) the processor determining a payment rule for the allocation of abstract goods to at least one second offer to trade in response to allocating at least a portion of one or more abstract goods of the first abstraction in step (b) to said second offer to trade, wherein said payment rule is based on the specification of the abstract goods allocated in step (g) and the at least one set differentiated good set included in said second offer to trade; and (i) storing in the computer storage each allocation of differentiated goods and the payment rule.

The method can further include: (f) the processor receiving a set of second offers to purchase; (g) the processor determining an allocation of differentiated goods to at least one second offer to purchase in response to allocating at least a portion of each abstract good of the first abstraction of step (b); (h) the processor determining a payment rule for the supply of abstract goods allocated to each second offer to purchase in step (g), wherein said payment rule is based on the specification of the abstract goods allocated in step (g) and the at least one differentiated good set included in the second offer to purchase; and (i) storing in the computer storage each allocation of differentiated goods and its payment rule.

The allocation in step (g) can satisfy one of the following objectives: maximizing total payments given a known supply of goods; maximizing total estimated payments given an estimated supply of goods; maximizing worst-case payments over a plurality of possible realizations of the estimated supply of goods; maximizing risk-adjusted revenue or expected utility given a distribution on possible realizations of estimated supply of goods; and maximizing total social welfare given estimated utility of buyers associated with offers to purchase and an estimated supply of goods.

The payment rule in step (h) can be determined in one of the following ways: when differentiated goods associated with an abstract good allocated to each second offer to purchase in step (g) are allocated randomly, the processor determines for each second offer to purchase the number of differentiated goods allocated to the second offer to purchase that are included in the one or more differentiated good sets associated with the second offer to purchase, and calculates a payment based on this determination; or the processor allocates to each second offer to purchase in step (g) only differentiated goods comprising said abstract good that are included in each differentiated good set associated with the second offer to purchase, and calculates a payment based on this determination.

Determining the first abstraction in step (b) can include: (i) storing in the computer storage a current abstraction of the plurality of differentiated goods, wherein said current abstraction comprises at least one abstract good; (ii) the processor creating one or more candidate abstractions based on the data in step (a) and the set of first offers to purchase; (iii) the processor determining a score for each candidate abstraction based on at least the set of first offers to purchase; (iv) the processor replacing the current abstraction with a candidate abstraction that satisfies a predetermined objective, said objective being either a maximal score or minimal score; and (v) repeating steps (ii)-(iv) until a predetermined termination criterion is met, whereupon the current abstraction is selected as the first abstraction.

The at least one constraint on a first and second candidate abstract good that can co-occur in an abstraction requires that no good appears in more than one abstract good.

The termination criterion can include one of the following: a property of the current abstraction meets, is greater than, or is less than a threshold, where the property is either: the number of abstract goods in the abstraction, or the improvement in absolute score relative to the prior current abstraction; the number of repetitions of steps (ii)-(iv) meets or exceeds a limit; and the computation time spent in steps (ii)-(iv) meets or exceeds a limit.

The first abstraction in step (b) can include: (i) storing in the computer storage a plurality of candidate abstract goods, wherein each candidate abstract good can include one or more differentiated goods; (ii) storing in the computer storage at least one constraint to preclude the first and second candidate abstract goods stored in step (i) from both occurring in at least one abstract good that comprises an abstraction; (iii) the processor determining one or more candidate abstractions based on the data in step (a) and the set of first offers to purchase; (iv) the processor determining a score for each candidate abstraction based on at least the set of first offers to purchase; and (v) the processor determining the first abstraction comprising one or more candidate abstract goods of step (i), wherein the first abstraction satisfies the at least one constraint of step (ii); and the first abstraction satisfies either minimal score or maximal score among all candidate abstractions comprised of one or more candidate abstract goods from step (i) and the first abstraction satisfies the at least one constraint of step (ii).

The method can further include: (f) the processor determining an allocation of differentiated goods to at least one first offer to purchase in response to allocating at least a portion of one or more abstract goods of the first abstraction of step (b); (g) the processor determining a payment rule for the supply of abstract goods allocated to each first offer to purchase in step (f), wherein said payment rule is based on the specification of the abstract goods allocated in step (f) and the at least one differentiated good set included in the first offer to purchase; and (h) storing in the computer storage each allocation of differentiated goods and the payment rule.

The method can further include: (f) the processor receiving a set of second offers to purchase; (g) the processor determining an allocation of differentiated goods to at least one second offer to purchase in response to allocating at least a portion of one or more abstract goods of the first abstraction of step (b); (h) the processor determining a payment rule for the supply of abstract goods allocated to each second offer to purchase in step (g), wherein said payment rule is based on the specification of the abstract goods allocated in step (g) and the at least one differentiated good set included in the second offer to purchase; and (i) storing in the computer storage each allocation of differentiated goods and its payment rule.

Determining a score for each candidate abstraction in step (iii) can include: the processor determining properties of the abstract goods that comprise the candidate abstraction from the specification for each abstract good determined in step (c), wherein the properties of the abstract goods include at least the total amount of supply available or estimated to be available of each abstract good and either none or the portion of each abstract good that satisfies one or more attribute values; the processor determining an allocation of differentiated goods to at least one first offer to purchase in response to allocating none or at least a portion of each abstract good of the candidate abstraction to the first offer to purchase in a way that is feasible given the available or estimated supply of the abstract good; and the processor determining the score of the candidate abstraction as a sum of payments from all first offers to purchase, wherein said payments depend on the allocation.

When the first offers to purchase are actual offers to purchase, the allocation of differentiated goods to first offers to purchase computed for the selected first abstraction is output by the processor to at least one of the following: a display of the computer or a computer network.

The payment from each first offer to purchase the allocation is determined in one of the following ways: when differentiated goods associated with an abstract good allocated to each first offer to purchase are allocated randomly, the processor determines for each first offer to purchase the number of differentiated goods allocated to the first offer to purchase that are included in the one or more differentiated good sets associated with the first offer to purchase, and calculates a payment based on this determination; or the processor allocates to each first offer to purchase only differentiated goods comprising said abstract good that are included in each differentiated good set associated with the first offer to purchase, and calculates a payment based on this determination.

The offers to purchase can be actual offers to purchase, and the allocation that corresponds to the first abstraction can be implemented by allocating the abstract goods to offers as dictated by the allocation, and the payments are those determined in determining the score for the abstraction.

Determining the first abstraction in step (b) further can include: the processor determining a current allocation of the abstract goods in the current abstraction based on an objective of maximizing a total payment to be received from the current allocation and in a way that is feasible given the available or estimated supply of the abstract goods; the processor determining at least one candidate abstract good to introduce into the current abstraction and creating at least one candidate abstraction by introducing at least one of the candidate abstract goods into the current abstraction; the processor determining, for each of the at least one candidate abstract goods, an estimate of the improvement in total payment that would be realized using a candidate allocation instead of the current allocation, said candidate allocation allocating none or at least portion of one or more abstract goods from the set comprising the current abstraction and the candidate abstract good, to one or more first offers; and for each candidate abstraction determining a score based on the computed estimate in improvement in total payment for each candidate abstract good into the current abstraction to form the candidate abstraction.

The method can further include the processor removing from each candidate abstraction each abstract good that is in the current abstraction and which intersects with a candidate abstract good that is introduced to the current abstraction to create the candidate abstraction.

The score of the at least one candidate abstract good that is introduced into the current abstraction is determined as one of the following: a maximum reduction in costs of variables corresponding to the candidate abstract good in a linear programming solution to the allocation of the current abstraction; a sum of reduced costs of variables corresponding to the candidate abstract good in a linear programming solution to the allocation problem of the current abstraction; a sum of non-negative reduced costs of variables corresponding to the candidate abstract good in a linear programming solution to the allocation problem of the current abstraction; a sum of the reduced costs of variables corresponding to the assignment of some portion of the candidate abstract good to each first offer to purchase in a linear programming solution to the allocation problem of the current abstraction, wherein at least one variable for each offer is included in the sum; and a sum of non-negative reduced costs of variables corresponding to the assignment of some portion of the candidate abstract good to each first offer to purchase in a linear programming solution to the allocation problem of the current abstraction, wherein at least one variable for each offer is included in the sum.

Each candidate abstract good can be a child abstract good of a parent abstract good included in the current abstraction; and each child abstract good can include a subset of the goods in the parent abstract good included in the current abstraction.

The method can further include determining a score for each child abstract good given the current abstraction as follows: the processor determining a set of values for the child abstract good, wherein each child abstract good value is based on at least a reduced cost of each variable corresponding to the child abstract good in a linear programming solution to the allocation problem for the abstract goods that comprise the current abstraction and on the total supply of differentiated goods available in the child abstract good; the processor determining a set of values for a complement child abstract good of the child abstract good, wherein said complement child abstract good comprises each differentiated good in the parent abstract good that was not included in the child abstract good, wherein each complement child abstract good value is based on the reduced cost of each variable corresponding to the complement of the child abstract good in a linear programming solution to the allocation problem for the abstract goods that comprise current abstraction and on the total supply of differentiated goods included in the complement child abstract good; and the processor computing the score for the child abstract good based on the set of values for the child abstract good and the set of values for the complement child abstract good.

Each abstract good in each current abstraction can be associated with a property. The property of each abstract good can be determined from values assigned to one or more attributes of the differentiated goods included in the abstract good or by a Boolean formula using operators AND, OR or NOT over such assignments. Determining the first abstraction in step (b) further can include: the processor selecting at least one parent abstract good from the current abstraction and, for each selected parent abstract good, selecting at least one attribute-value pair; the processor determining for each selected parent abstract good and each attribute value pair selected for that parent abstract good: (a) a child abstract good that can include differentiated goods in the parent abstract good that satisfy the attribute-value pair, wherein a property associated with the child abstract good corresponds to the Boolean conjunction of the parent abstract good's property and its attribute-value pair; and (b) a complement child abstract good that can include differentiated goods in the parent abstract good that do not satisfy the attribute-value pair, wherein a property associated with the complement child abstract good corresponds to the Boolean conjunction of the parent abstract good's property and the negation of its attribute-value pair;

and the processor determining at least one candidate abstraction by adding to the current abstraction the child abstract good and the complement child abstract good corresponding to the selected parent abstract good and removing the selected parent abstract good from the current abstraction; and the processor determining a score for each candidate abstraction based on the reduced costs of the variables corresponding to the child abstract good and the reduced costs of the variables corresponding to the complement child abstract good in a linear programming solution to the allocation problem that assigns abstract goods in the current abstraction to the set of first offers to purchase.

Each abstract good in each current abstraction is associated with a property. The property of each abstract good can be determined from values assigned to one or more the attributes of the differentiated goods included in the abstract good or by a Boolean formula using operators AND, OR or NOT over such assignments. Determining the first abstraction in step (b) can further include the processor selecting at least one parent abstract good from the current abstraction and, for each selected parent abstract good, the processor determining a selected target refinement of the selected parent abstract good, wherein the selected target refinement is a child abstract good that is a subset of the parent abstract good.

The selected target refinement of the selected parent abstract good can be determined as follows: (i) storing in the computer storage a current target refinement corresponding to the parent abstract good and associating with the current target refinement the property associated with the parent abstract good; (ii) storing in the computer storage a set of one or more attribute-value pairs, wherein each attribute value pair comprises an attribute used to describe properties of differentiated goods and a value assigned to said attribute; (iii) the processor determines a set of one or more candidate conjunctive target refinements, wherein for each attribute-value pair in step (ii) the candidate conjunctive target refinement is a child abstract good comprising the differentiated goods in the parent abstract good that satisfy the Boolean conjunction of the property associated with the current target refinement and said attribute-value pair, and associating with each candidate conjunctive target refinement the property comprised of the Boolean conjunction of the property associated with the current target refinement and said attribute-value pair; (iv) the processor determines for each candidate conjunctive target refinement, a complement child abstract good comprising the differentiated goods in the parent abstract good that do not satisfy the conjunction of the property associated with the current target refinement and the attribute-value pair for the candidate conjunctive target refinement; (v) the processor determines a set of one or more candidate disjunctive target refinements, wherein for each attribute-value pair in step (ii) the candidate disjunctive target refinement is a child abstract good comprising the differentiated goods in the parent abstract good that satisfy the Boolean disjunction of the property associated with the current target refinement and said attribute-value pair, and associating with each candidate disjunctive target refinement the property comprised of the Boolean disjunction of the property associated with the current target refinement and said attribute-value pair; (vi) the processor determines for each candidate disjunctive target refinement a complement child abstract good comprising the differentiated goods in the parent abstract good that do not satisfy the disjunction of the property associated with the current target refinement and the attribute-value pair for the candidate disjunctive target refinement; (vii) the processor determines a score for each candidate target refinement in the set of one or more candidate conjunctive target refinements in step (iii) and in the set of one or more candidate disjunctive target refinements in step (v), wherein each score is based on a reduced costs of the variables corresponding to the child abstract good and its complement child abstract good in a linear programming solution to the allocation problem that assigns abstract goods in the current abstraction to the set of first offers to purchase; (viii) the processor designates as the current target refinement the target refinement from step (vii) that has satisfies a predetermined objective, the predetermined objective being either a maximal score or a minimal score, from the set of one or more candidate conjunctive target refinements in step (iii) and the set of one or more candidate disjunctive target refinements in step (v); and (ix) repeating steps (ii)-(viii) until a second predetermined termination condition is met, whereupon the current target refinement becomes the selected target refinement of the parent abstract good.

The processor can determine the set of one or more candidate abstractions by constructing a candidate abstraction from the current abstraction for each of the selected parent abstract goods by adding the child and complement child abstract goods corresponding to the selected target refinement for the selected parent abstract good to the current abstraction, and removing the selected parent abstract good from the current abstraction.

The second predetermined termination criterion can include one of the following: a score computed for the new target refinement meets or exceeds some maximum threshold; a score computed for the new target refinement meets or is less than some minimum threshold; a difference in the score of the new target refinement and the score of the current target refinement is below some minimum threshold; a number of repetitions of steps (ii)-(viii) exceeds a maximum number of repetitions; a computation time of steps (ii)-(viii) meets or exceeds a maximum computation time.

In the method the differentiated goods available for exchange can be advertising slots on TV, internet or other media; and the properties by which advertising slots are differentiable are of interest to a set of at least one potential advertiser.

In the method, the properties of an advertising slot include at least one of the following: a time at which the advertising slot is displayed to one or more members of the slot's audience; an expected or actual audience size for the advertising slot; an expected or actual demographic property of the slot's audience, such demographic property including at least one of the following: gender, income, geographic location, number of times audience members have previously viewed the advertisement allocated to that slot, or related advertisements; in the case of television, a show or show genre in which the advertising slot occurs; in the case of the Internet, content properties of a web page or web site on which the advertising slot occurs; a nature or content of advertisements displayed in temporally proximal advertising slots to said advertising slot; a nature or content of advertisements displayed in spatially proximal advertising slots to said advertising slot on a web page; and past trackable behavior of an audience member, including television viewership of previous shows or advertisements, previous visits to the web site or page on which the advertising slot occurs, or the pattern of previous visits to other web sites or web pages.

At least one offer to trade can be an offer to purchase that can include at least one set of one or more advertising slots and an associated price, and can further include at least one of the following: in connection with the Internet, a specification of at least one property of web-sites on which the one or more advertising slots occur; in connection with the Internet, a specification of at least one property of the content or meta-tags of web-pages or web-sites on which the one or more advertising slots occur; in connection with the Internet, a specification of at least one temporal property of the one or more advertising slots; in connection with the Internet, a specification of at least one demographic property of at least one user who views the one or more advertising slots; in connection with the Internet, a specification of at least one behavioral property of at least one user who views the one or more advertising slots, said behavioral property describing past web browsing, click-stream, or purchasing behavior of said user; in connection with the Internet, a specification of at least one constraint on the advertisements that can be shown in other advertising slots spatially or temporally proximate to the one or more advertising slots; in connection with the Internet, a specification of a minimum quantity of the one or more advertising slots; in connection with the Internet, a specification of a maximum quantity of the one or more advertising slots; in connection with the Internet, a specification of at least one temporal constraint on the timing of two or more advertising slots or the advertisements displayed in said advertising slots; in connection with the Internet, a specification of a price for a set of advertising slots based on per-impression, per-click, or per-action pricing; in connection with the Internet, a specification of a single price for an entire set of advertising slots; in connection with the Internet, a specification of price discounts or price bonuses based on reaching designated advertising slot volume thresholds; in connection with television, a specification of at least one property of the TV shows on which the one or more advertising slots occur; in connection with television, a specification of at least one property of the content of the TV shows on which the one or more advertising slots occur; in connection with television, a specification of at least one demographic property of the audience of the TV show on which the one or more advertising slots occur; in connection with television, a specification of at least one behavioral property of at least one user who views the one or more advertising slots, said behavioral property describing the past viewing behavior, remote control usage, or personal video recorder usage of said user; in connection with television, a specification of at least one constraint on the advertisements that can be shown in other advertising slots in the same or temporally proximate commercial breaks as the one or more advertising slots; and in connection with television, a specification of a price for a set of advertising slots based on expected or actual demographic data of the TV audience.

Abstract goods can be represented using Boolean Decision Diagrams (BDDs), the available supply of differentiated goods satisfying specific attributes can be represented using BDDs, and new abstract goods can be determined using standard BDD algorithms/software for creating logical combinations of formula.

The properties of each abstract good determined from the specification of differentiated goods can be computed by manipulating the BDD representation of each abstract good and the BDD representation of supply.

The invention is also a computer-implemented method for determining an allocation of an abstraction of a plurality of differentiated goods to a set of offers. the method includes: (a) storing in a computer storage accessible to a processor of a computer an abstraction of a supply of differentiated goods, said abstraction comprising a set of one or more abstract goods, each abstract good an aggregation comprising at least one differentiated good, and at least one abstract good in the abstraction comprises at least two differentiated goods; (b) storing in the computer storage data about at least one offer to purchase, where each offer to purchase can include at least one set of at least one of the plurality of differentiated goods and a price associated with said set of differentiated goods; (c) storing in the computer storage a current allocation of none or a portion of each abstract good to each offer to purchase; (d) the processor determining for each abstract good whether the current allocation is feasible or infeasible, wherein the current allocation is feasible when there is an allocation of differentiated goods to each offer to purchase assigned a portion of the abstract good in the current allocation such that: (i) the allocated differentiated goods are contained in the allocated abstract good; (ii) the allocated differentiated goods lie within the one or more sets of goods associated with said offer to purchase; and (iii) the quantity of allocated differentiated goods meets or exceeds the portion of the allocation of the abstract good allocated to the offer to purchase, and wherein the current allocation is infeasible when there is no such allocation of differentiated goods to each offer to purchase assigned a portion of the abstract good; (e) when at least one abstract good is determined to be infeasible in step (d), the processor determining a new allocation of none or a portion of each abstract good to each offer to purchase that satisfies the constraint that, for any abstract good determined to be infeasible in step (d) and for all offers that are allocated a portion of said abstract good in the current allocation, the new allocation of said abstract good to each offer to purchase is feasible in that an allocation of differentiated goods exists that does not exceed the supply of any differentiated good, and designating the new allocation to be the current allocation; and (f) repeating steps (d) and (e) until a termination condition is met.

The allocation of abstract goods to the set of at least one offer to purchase in steps (c) and (e) can achieve one of the following objectives: maximizes total payments for a known supply of differentiated goods; maximizes total estimated payments for an estimated supply of differentiated goods; maximizes worst-case payments over a plurality of possible realizations of the estimated supply of differentiated goods, maximizes risk-adjusted revenue or expected utility given a distribution on possible realizations of estimated supply of differentiated goods; or maximizes total social welfare given estimated utility of buyers associated with offers to purchase and an estimated supply of differentiated goods.

The termination condition can be one of the following: each abstract good is determined in step (d) to be feasible in the current allocation; a number of repetitions of steps (d)-(e) meets or exceeds a threshold number of repetitions; a computation time of steps (d)-(e) meets or exceeds a threshold computation time; a number of abstract goods that are infeasible in the current allocation in step (d) falls below a threshold number of infeasible abstract goods; a maximum amount of infeasibility for every abstract good in the current allocation in step (d) falls below a threshold amount of infeasibility, where the degree of feasibility for an abstract good given an allocation is based on the amount by which the quantity of supply required of goods to meet an assigned portion of abstract goods exceeds the available supply; a value of the objective criteria achieved in determining the new allocation meets or exceeds a threshold value; a value of the objective criteria achieved in determining the new allocation meets or falls below a threshold value; and an absolute difference in the value of the objective criteria of the new allocation and the current allocation meets or falls below a threshold value.

The allocation of abstract goods to offers in steps (c) and (e) can be determined by the processor solving a linear or mixed integer program. The processor can determine the feasibility of the current allocation of the supply of an abstract good by checking the feasibility of a linear program that assigns to each offer assigned a portion of an abstract good, a quantity of each differentiated good that comprises the abstract good and lies within the one or more sets of goods associated with said offer, subject to a set of at least one constraint of a type (i) that requires respecting the available supply of each differentiate good and constraints of a type (ii) that require meeting or exceeding the portion of the abstract good allocated to said offer to purchase in the current allocation. For each abstract good that is determined to be infeasible in step (d), the processor determines a second set of constraints that is jointly infeasible and is comprised of at least one constraint from the set of constraints of type (i) and at least one constraint from the set of constraints of type (ii), and then introducing a new constraint based on this second set of jointly infeasible constraints to the determination of the new allocation in step (e).

The second set of constraints that are jointly infeasible can be computed as a minimal infeasible set.

In determining whether the allocation of an abstract good in the current allocation is feasible, the processor can construct a sub-abstraction of said abstract good, said sub-abstraction comprising a set of sub-abstract goods, each sub-abstract good comprising an aggregation of at least one differentiated good from the abstract good, and at least one sub-abstract good in the sub-abstraction comprising at least two differentiated goods from the abstract good.

The differentiated goods available for exchange are advertising slots on TV, internet or other media; and the properties by which advertising slots are differentiable are of interest to a set of at least one potential advertiser.

BRIEF DESCRIPTION OF THE DRAWINGS

FIG. 3 is a representation of an overall refinement process for forming and scoring child/split abstractions of a parent abstraction.

DETAILED DESCRIPTION OF THE INVENTION

The present invention will be described with reference to the accompanying figures.

Figure 1:
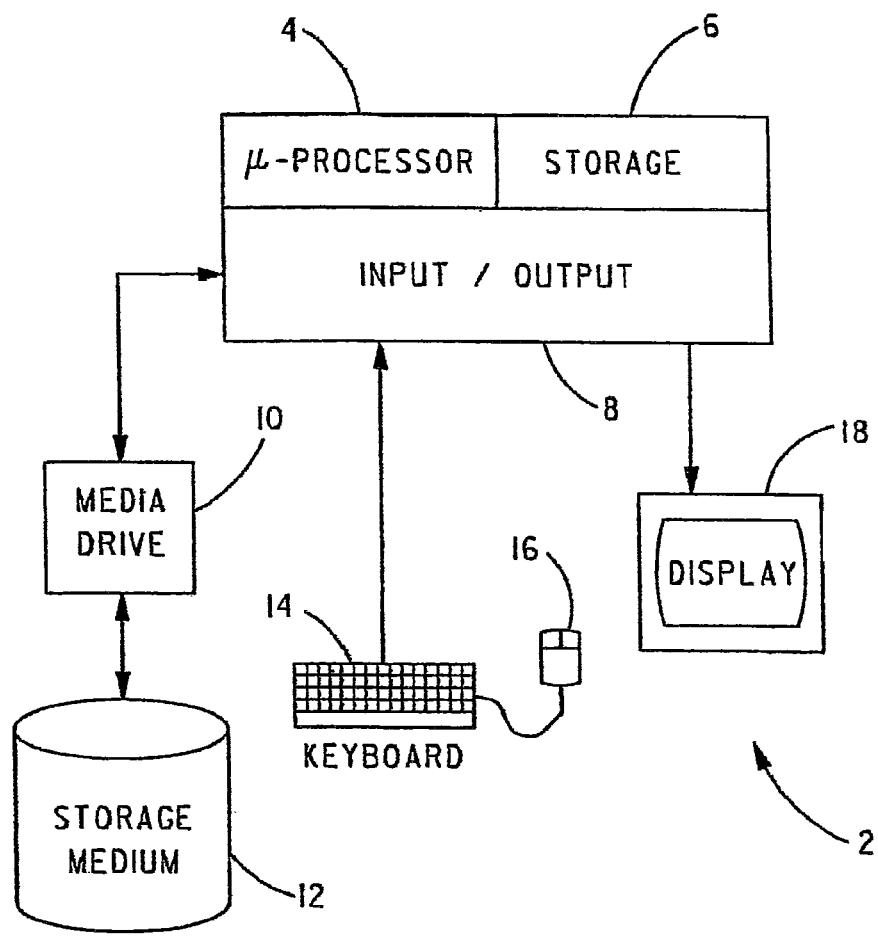
FIG. 1 is a block diagram of an exemplary computer that can be utilized either alone or as part of a computer network for implementing the present invention.

With reference to FIG. 1, the present invention is embodied in computer software which executes on one or more standalone or networked computers 2. Each computer 2 includes a microprocessor or processor 4, a local or remote computer storage 6, and an input/output system 8. Each computer 2 can also include a media drive 10, such as a disk drive, CD-ROM drive, and the like. Media drive 10 can operate with a computer storage medium 12 capable of storing the computer software that embodies the present invention, which computer software is able to configure and operate computer 2 in a manner to implement the present invention. Input/output system 8 can include a keyboard 14, a mouse 16, and/or a display 18. Computer 2 is exemplary of standalone or network computers capable of executing the computer software of the present invention and is not to be construed as limiting the invention.

An example of the concept of abstract goods as described herein, their value, and the difficulties that arise when allocating them will now be described.

Suppose a supply of widgets is offered for sale by auction. The widgets have three different attributes, Color, Size and Quality, with the different attributes each taking the following different values: Color can be red, green, or blue; Size can be small, medium or large; and Quality can be high-quality or low-quality.

There are 18 different widget configurations in this example: red, small, high-quality; red, small, low-quality; red, medium, high-quality; blue, large, low-quality; and so on. But as the number of attributes grows, the number of configurations grows exponentially. In general, with N attributes, each taking on K distinct values, there will be $K^N$ configurations. (E.g., if N=20, and K=3, then there will be roughly 3.5 million distinct configurations.)

In principle, a seller must determine how to allocate each of these different configurations to bidders in way that maximizes revenue. This allocation problem can be computationally very difficult, even practically unsolvable, as the number of distinct widget configurations grows. In accordance with abstraction techniques described herein, the allocation of these different configurations is addressed by aggregating distinct goods—in this case, widget configurations—into sets of (generally, related) goods, and allocating portions of the smaller sets of goods to bidders.

For example, group the widgets into three sets: W1, the set of red, small widgets (either high or low quality); W2, the set of blue, large widgets (either high or low quality); and W3, all other widgets.

Each of these sets of widgets is called an abstract good. The supply of abstract good W1 is equal to the supply of the differentiated widgets (red, small, low quality, or red, small, high quality) that make it up. An especially convenient way to construct and describe abstract goods is by reference to the attributes satisfied by its elements. In this example, W1 is characterized by the logical (Boolean) formula: Color=red AND Size=small;

W2 is characterized by the logical (Boolean) formula: Color=blue AND Size=medium; and W3 is characterized by the logical (Boolean) formula: NOT (Color=red AND Size=small) AND NOT (Color=blue AND Size=medium)

These logical formulas are the "properties" corresponding to the abstract goods W1, W2, and W3. For example, the abstract good W1 comprises those widgets satisfying the property "Color is red and Size is small." Each abstract good can be characterized alternatively as a particular set of differentiated goods, or as a specific property, namely, the property defining which goods belong to that set.

An abstraction is any aggregation of differentiated goods into a smaller collection of abstract goods such as these. In this example, the "abstraction" is the set of abstract goods {W1, W2, W3}. One value of such an abstraction is that is provides a simpler way of describing the available inventory. For instance, one might limit bidders to bidding on abstract goods instead of arbitrary widget configurations.

This would allow for simpler communication of bids, and could also be used to promote competition.

Another benefit of such an abstraction arises if the seller allocates the supply of abstract widgets instead of the supply of actual widgets to bidders. This makes the optimization problem considerably easier. Instead of considering how many widgets of each of the 18 different configurations should be allocated to each bidder, the seller can now consider how to allocate the supply of the 3 abstract widgets to each bidder. Once the allocation of this abstract supply is determined, the supplier can then either allocate actual widgets from the abstract supply so-allocated to each bidder randomly, or can attempt to only allocate widgets of interest to each bidder.

The techniques disclosed herein describe how to do both.

This also illustrates a potential drawback of allocating abstract goods to bidders rather than allocating actual differentiated goods. Suppose a bidder B is interested in red, small, high-quality widgets. By allocating abstract widgets to bidder B using the abstraction above, the seller has no means of allocating only red, small, high quality widgets to B. Instead, the seller is forced to allocate abstract widgets W1 to B, leading to a situation in which some of the (differentiated) widgets do not meet B's needs. The techniques disclosed herein resolve this issue in two ways.

First, the techniques choose the abstraction very carefully to minimize the amount of "wasted supply" assuming random allocation. For example, actual widgets from the abstract supply of W1 are allocated randomly to B.

If the supply of widgets is distributed such that most small, red widgets are of high quality, then most of the widgets in W1 (all of which are small and red) will be high quality and thus, most widgets allocated to B will satisfy B's needs. Similarly, suppose that most bidders who desire small, red widgets are indifferent with respect to quality. In this case, allocating abstract widgets from W1 will meet the full demands of such bidders. The techniques described hereinafter for creating abstractions, using data about both supply and demand characteristics, will ensure that allocating using abstraction creates as little "waste" as possible while keeping the number of abstract goods to be allocated as small as possible.

Second, once abstract goods are allocated to a bidder, the constraint generation technique described herein will determine how best to allocate the differentiated goods constituting an abstract good in way that ensures each bidder receives only differentiated goods that it desires.

One important application of the techniques is in the exchange of advertising inventory, for example, TV advertising slots or internet display advertising slots. For example, a TV network may have tens of thousands of 30-second prime-time advertising slots for sale over its prime-time season, and hundreds of potential advertisers interested in them. Each advertising slot is characterized by a number of attributes, such as, without limitation: what day of the week, what week of the year, what time, what position in a commercial break, the genre of the show in which it appears, the identity of the show, various demographic elements (e.g., age, gender, geographic distribution, income level, etc.), and so on.

Of course, predicted and actual ratings, broken down by various demographic elements are vital, characterizing the (predicted) amount of inventory available. Different advertisers have interest in different attributes, and each will generally desire a collection of slots satisfying some different combination of slot properties to meet its advertising campaign needs. The optimal allocation problem is completely intractable for problems of a decent size. Slot (or channel) abstraction aggregates these different channels into groups, and allows the allocation problem to become much more tractable. As above, the abstraction is desirably chosen very carefully to ensure that advertiser demand is met as effectively as possible.

As a very simple example, a TV network might aggregate all of the ad slots on a particular TV show into a single abstract channel when Advertisers who desire slots on that show have no specific preferences for timing of their ads shown on that show. It might aggregate all the TV shows within a specific genre (e.g., crime drama), while still distinguishing day, week, and slot position, if no advertiser has specific preferences for shows within that genre.

Finally, while the examples above are described in connection with an auction (forward auction), the benefits of abstraction apply equally well in a reverse auction in which a single buyer solicits offers from multiple sellers/supplier, or in a two-sided exchange with multiple buyers and sellers.

Having thus generally described the present invention, the detailed techniques (algorithms) for implementing various aspects of the present invention to realize the present invention will now be described.

Channels: Combinations of Contextual Attributes.

As described above, the set of contextual properties (e.g., search terms in a search engine; user or web site attributes in banner ads) is the key determinant of the value of an ad placement to the advertiser and the revenue generated for the publisher or ad network. Let a contextual attribute be any attribute associated with either the display of an advertisement, or with some event (such as a click, purchase, or other measurable/estimable user action) that an advertiser is allowed to include within a condition on their ad placement(s), or the payment associated with (the set of) ad placement(s). Let F be the set of such attributes. Each attribute $F_i \in F$ has an associated set (or domain) of attribute values $Dom(F_i)$, corresponding to the values that attribute can take. For example, "Medical Content on Web Page" is a attribute that takes values "true" or "false"; "query contain keyword betting" is another boolean attribute; "time of day" is a multivalued attribute that could take values 1 AM, 2 AM, 3 AM, etc.; "user location" is a attribute that could be determined roughly in some contexts (e.g., using IP address) or very precisely in others (e.g., using cellular or GPS localization for users of mobile devices).

Each ad placement (or event caused by such) has a value for each attribute $F_i \in F$ of interest.

This allows the potential ad supply to be broken into supply channels. Formally, a channel c is any instantiation of the set of attributes:

$$c \in \times \{Dom(F_i) : F_i \in F\}$$

The supply S(c) of channel c is the number of user impressions expected to satisfy the contextual conditions dictated by c. These channels are the differentiated goods that are offered for sale by the publisher. This supply is dependent on the time frame of interest, and is typically estimated using statistical models of user behavior (e.g., search behavior in a search engine, or viewing habits in publisher's site).

Notice that the number of channels grows exponentially in the number of attributes (if they have discrete and finite domains).

Optimization for Advertising Assignment.

By far the most common way in which ads are allocated in online settings is through auctions using relatively simple schemes to decide on winners (i.e., which advertisers are awarded which ad slots on a web page or search page) and the price paid by the winning advertisers for the ad placement (or event caused by the placement, e.g., click). One common auction scheme is the generalized second price auction (GSP). Some instantiations of this mechanism adjust the bids using some quality score (e.g., the predicted click rate for the ad).

A key drawback of such auction schemes is their myopic nature. The supply of ad slots available over a particular period of time is not allocated to bids in a way that maximizes an objective such as efficiency (best use of the slots) or publisher (or ad network) revenue. Instead as ad slots become available—as users view web pages or access web services—they are myopically allocated to the "highest bidder" using schemes such as GSP.

It is well-known that myopic allocation of ad slots to bidders in this fashion is generally suboptimal. For example, if bidders have budgets, such myopic schemes can often fail to exhaust a bidder's budget, thus reducing ad revenue (and in most cases, using ad slots inefficiently). Optimization techniques have been proposed as a means to overcome this problem. Roughly speaking, optimization techniques attempt to allocate the entire supply of ad slots over some specified time interval to the set of bidders in a way that maximizes some objective (such as revenue or reported efficiency). The key distinction from myopic models is that in optimization techniques the allocations of future slots is done jointly with active slots, so that more effective use of slots results.

Most sophisticated optimization require the explicit allocation of bids (or bidders or advertisers) to ad slots within specific channels. Specifically, quantities (or variables) $x^i_j$ relating the amount of supply from channel j that is allocated to advertiser or bid i, for all channels j and advertisers i, must be considered to determine an optimal allocation. The quantity $x^i_j$ can safely be ignored if advertiser i has no interest in channel j. But since each channel is of interest to at least one bidder, as discussed below, there is at least one such relevant quantity $x^i_j$ for each channel j.

The enumeration of these channels within an algorithmic optimization model can cause tremendous difficulties. As noted above, the number of channels grows exponentially in the number of attributes of interest to advertisers. Optimization techniques involving linear programming, mixed integer programming, heuristic search, etc. have computational complexity that scales at least polynomially in the number of channels (LP methods), and often exponentially (MIP methods). Thus considering allocations of advertisers to all concrete channels is inherently problematic.

Consider the problem faced by an ad network selling and serving banner ads over a variety of web sites. Ads are served (dispatched) to specific locations on web pages as the pages are served by members of the network. Dispatch decisions can be based on a variety of attributes (attributes of the impression in question): either attributes of the web page (e.g., page identity, page category, predicted demographic profile of users, page content, etc.), attributes of the user, if available (e.g., demographic properties such as gender, income level, geographic location), and transient contextual attributes (e.g., day-part, browsing history, past purchases, etc.).

In typical ad auctions, advertisers bid for ad slots satisfying specific attributes. Advertisers that match the attributes of the current ad slot are often allocated via the GSP. Such mechanisms are deployed much more frequently for sponsored search than for banner ads. Regardless of the setting, however, expressiveness is typically non-sequential and restricted to per-item bidding (e.g., a bid price is offered per-impression or per-click), time eligibility conditions, and simple budget constraints (often linking multiple bids/items). Structured (tree-based) languages have been proposed for specifying item prices over ad attributes. These do not extend expressiveness beyond per-item, but allow compact, natural specification of a set of item prices that can be exploited in optimization.

Even in such a simple setting, the need for optimization can be acute. Consider the following example.

There are two sites A and B. Bidder $b_1$ bids $1 per thousand impressions on A and $0.50 on B, with a budget of $50K. Bidder $b_2$ bids $0.50 per thousand impressions on A, with a budget of $20K. Suppose supply on A is 5 times that of B for the first 50K units, but is then exhausted (only B has supply from then on). In a typical per-item auction, $b_1$ will win all of A's and B's supply until its budget is exhausted. Specifically, $b_1$ would win (500/11)K impressions ((1)x+0.5x/5=50K). At this point $b_2$ wins the remaining (50/11)K impressions on A. Total revenue is 50+(0.5)(50/11)≈$52.3K. The optimal allocation would collect revenue of $70K by selling 40K units of A to $b_2$, and 10K units of A plus 80K units of B to $b_1$.

Optimization is also critical when one considers slates of ads (multiple advertisers shown on a single web page).

The need for richer expressiveness in ad auctions is evident, especially campaign-level expressiveness for banner ads. A similar need for campaign-level expressiveness is clear in other media as well, e.g., in TV advertising. The techniques disclosed herein apply directly to such problems, though the channel explosion problem is somewhat mitigated by the inability (or at least, current unwillingness) to segment individual impressions by very fine-grained attributes. The technology and willingness to monitor viewing habits and individual details to target ads as they are online would make the problem addressed here as acute in such settings. This point was described in U.S. patent application Ser. No. 11/396,410, filed Mar. 31, 2006, entitled "System For And Method Of Expressive Sequential Auctions In A Dynamic Environment On A Network" which is incorporated herein by reference, where various forms of expressiveness are described, along with an optimize-and-dispatch architecture in which: (a) optimization is used to allocate ads over time at a coarse level of time granularity; and (b) a dispatcher assigns ads in real time to specific page impressions using parameters determined by the optimizer. Further forms on campaign-level expressiveness can include algorithms for the online, approximate solution of the Markov decision process induced by the allocation model. Specifically, given uncertain supply (in the form of web page hits) and demand (in the form of bids or contracts), the approach optimizes the allocation of (long-term) expressive ad contracts to ad channels (that is, groups of attributes satisfying specific properties) based on the distribution of predicted supply. Regarding the cost of inexpressiveness in ad auctions, it can be shown that GSP can be arbitrarily inefficient for certain distributions of agent preferences (even with per-item preferences), and that this inefficiency can be removed by adding expressiveness.

In what follows, it is assumed that advertisers make expressive offers: offers in which their preferences for particular sequences or sets of impressions are articulated (clicks, conversions, etc., can also be mixed with impressions if desired). These can include per-item bids, budgets, and other standard forms, but are extended to include much richer offer terms. Below are just a few examples of expressiveness over sets of impressions:

Minimum targets/threshold preferences: bidder pays a fixed amount only if a minimum impression threshold is met during a target period (e.g., $d for 300K impressions satisfying some condition φ). Multiple targets may be mixed, as may per-impression bids with bonuses for achieving specific targets. Maximums, even frequency capping at the site or individual level, can be imposed as well.

Temporal sequencing/smoothness: bidder desires a minimum number of impressions satisfying condition φ in each of a set of time periods (e.g., 200K impressions per day for two weeks); or the bidder may make a threshold or per-impression offer that is only "valid" if the variance in the number of impressions per time period is no more than 10% (here validity may mean that the impressions outside that range are not counted, or that the entire contract is invalid).

Complements: ads on site A and site B must appear in a 2:1 ratio (either over the life of the campaign, or during each relevant time period, e.g., hour, day-part, day, week).

While per-item expressiveness and budgets can usually be incorporated directly into an LP model, some of these richer forms of expressiveness require the introduction of binary variables (e.g., threshold preferences). However, existing LP/MIP models are unable to scale to practical problems involving a large number of attributes (impression attributes); yet it is precisely the ability to segment on very detailed attributes that explains the appeal of online advertising! The key bottleneck is channel explosion: the number of specific ad channels to which ads can be assigned in an LP/MIP—i.e., the number of distinct attribute instantiations—grows exponentially in the number of attributes. Hereinafter this problem is discussed through the use of channel abstraction.

Channel Abstraction.

Channel Abstraction offers a means for overcoming the problem of a large (possibly exponential) number of channels in optimization techniques for ad auctions. An abstract channel is any aggregation of supply channels: the channels within the abstract channel are then treated as indistinguishable at one or more points during the process of determining the allocation of supply channels to bidders. Channel abstraction is one specific embodiment of the abstraction technique described herein for any type of differentiated goods, where the goods in question are the advertising channels made available to advertisers.

In what follows, focus is on the use of abstract channels during the optimization phase of ad assignment. However, abstract channels can be used at any or all of the phases the online advertising cycle:

During bidding or contract negotiation: the publisher or ad network can restrict advertisers to expressing their demand over abstract channels. This can be accomplished by restricting the attributes an advertiser can express, or by mapping more expressive demands into the smaller set of abstract channels. Advantages of such restrictions include ease of communication and understandability (advertiser attention is focused on a smaller set of distinctions); ability to guide advertisers to relevant supply through appropriate abstract channel definition; and demand intensification, which can increase publisher/network revenue by preventing fine-grained market segmentation and encouraging competition.

During the offline allocation of channels to advertisers: This is elaborated on below. The benefit of using abstract channels is a reduction—often dramatic—in computational complexity of the allocation procedure.

During the online serving or dispatch of ad slots: While offline optimization and allocation determines the supply of an abstract channel that is given to a particular advertiser, the ads must be dispatched in an online fashion to (concrete) channels as the supply is realized. At dispatch time, fine-grained distinctions among channels can be made (subject to the allocation constraints imposed by the offline assignment of abstract channels); or the fine-grained distinctions can be ignored, implying the use of abstract channels at dispatch time.

The need for channel abstraction is clear—optimization-based approaches to online advertising cannot scale to problems of realistic size and scope. The number of channels that must be accounted for grows so quickly in practice that optimization-based approaches cannot be used. However, with suitable channel abstraction, the number of channels can be reduced exponentially, thus allowing optimization-based techniques to be used in practice. However, channel abstraction usually implies some form of approximation: assign advertisers are assigned to abstract channels that incorporate some channels that are not of interest to them. As such, they pay only for some of the ad displays on an abstract channel (in particular, they pay only for those displays that are dispatched on a concrete channel of interest). Thus the appropriate construction of abstract channels is vital to meet the goals outlined above (e.g., demand intensification or computational efficiency) with as little sacrifice in objective value (e.g., economic efficiency or revenue) as possible.

A detailed description of the invention and several illustrative examples will now be described.

The invention is a computer-implemented method for automatically constructing a set of abstract supply channels for the purposes of assigning advertisements to advertising inventory (or ad slots) in an online advertising environment. For the purpose of describing the invention, the following will be assumed hereinafter.

A collection of ad slots are available to be allocated to advertisers over some time frame of interest. These available slot inventory for the period may be known in advance, or may be uncertain. Uncertainty arises because of the inherent uncertainty of user views of specific web pages or use of specific web services. In the latter case, estimates of inventory may be available (e.g., using statistical models), or other characterizations of the uncertainty may be available (inventory level bounds, probability distributions, etc.).

Ad inventory is characterized by a set of attributes F. Specifically, for each attribute $F \in \mathbf{F}$, each ad slot has associated with it a specific attribute value $f \in Dom(F)$ (the possibility of unknown or inapplicable attributes is allowed). As with ad inventory, the attribute values may be known precisely at the time the time the ad slot is created/becomes available, may be estimated in a statistical sense, or may be unknown. The term condition or property will be used to refer to logical combinations of attribute values, saying, for instance, that a slot satisfies condition or property $\phi$.

Ad inventory is broken into channels, where each channel groups together ad slots that are indistinguishable according to the attributes of interest. Specifically, any two slots within the channel are indistinguishable from the point of view of satisfying any advertiser's expressed interests.

Potential advertisers communicate their interest in having their ads displayed on ad slots: this interest captured by expressing the attribute values desired of the slots on which their ads are shown. They can also express their interest in receiving various collections or sequences of such ad slots during the period of interest. Advertisers also express their willingness to pay for displays on ad slots—or events (e.g., clicks) caused by such displays—satisfying their conditions of interest (including potential conditions on collections or sequences of ad displays). The communication of interest and willingness to pay can be effected via an auction mechanism, by the direct purchase of slots at prices posted by the publisher/network, manual negotiation, or any other means.

Advertisers pay the publisher, ad network, or other provider of the advertising inventory for the displays of their ads—or the events caused by the display of their ads—as a function of the attribute values of said displays or events, their expression of interest and willingness to pay for ads satisfying specific conditions, and possibly the expressions of interest and willingness to pay of other advertisers. (e.g., in an auction, the price for an ad display paid by a winning bidder often depends on the bids of other bidders.)

The publisher, ad network, or provider of advertising inventory wishes to determine an assignment of (actual or predicted) ad slots to specific advertisers over the time period of interest in order to achieve some objective. Potential objectives include, but are not limited to: (a) maximizing total (predicted) payment by advertisers for ad displays (where predictions are made with respect to realizations of ad inventory, attribute values, and events caused by ad display); (b) maximizing expected payment (with expectation taken with respect to possible realizations of inventory, attribute values, and events); (c) maximizing worst-case revenue over possible realizations of inventory, attributes, and events; (d) maximizing risk-adjusted revenue (or utility); (e) maximizing predicted social welfare or efficiency (with respect to predicted utility of advertisers given their declared interests and willingness to pay); (f) and so on.

The publisher, ad network, or provider of advertising inventory will determine the assignment of (actual or predicted) ad slots using some form of optimization, for instance, mathematical programming, heuristic search, specialized combinatorial algorithms, or some other algorithmic technique. The provider may insist on an optimal assignment, may allow an approximately optimal assignment (where a difference from optimal can be guaranteed), or may allow purely heuristic assignments (where it is expected that the assignment will perform well with respect to the provider's objective, but no guarantee can be provided).

As noted above, exact, approximate, and heuristic means of determining assignments all run into computational difficulty when the number of supply channels is large. And since the number of supply channels grows exponentially in the worst case with the number of attributes of interest, the number of supply channels is too large to allow practical optimization of ad assignments except in very small domains (small attribute set or small number of bidders).

Proposed herein is a computer-implemented means for constructing a set of abstract channels that supports effective optimization with as little sacrifice of objective quality as possible. Algorithmically, the approach starts with an initial set of abstract channels, and iteratively refines these channels into more fine-grained abstract channels until either: (a) the number of abstract channels achieves some (statically or dynamically) defined limit (e.g., reflecting limits on the ability of an optimizer to handle a large number of channels, or limits on the communication complexity desired to express ad conditions); or (b) until the true or estimated quality of the set of abstract channels, with respect to the objective criterion, reaches a satisfactory level.

To establish terminology, let C be the set of (concrete) channels determined by the attributes of interest. An abstract channel $a \subseteq C$ consists of a non-empty set of (concrete) channels $\{c_1^a, \ldots c_{n_a}^a\}$, where $n_a$ is the number of concrete channels that have been aggregated within a. Each concrete channel is viewed as a special case of an abstract channel (namely, a singleton set). A split of an abstract channel a is a set $\{a_1, \ldots, a_n\}$ of mutually disjoint subsets of a that covers a (i.e., a partition of a). The abstract channel a is often referred to as the parent abstract good, and the subsets of a are often referred to as child abstract goods, in reference to such a split. When a is split, it is "replaced" by this set of more fine-grained abstract channels, $a_1 \subset a$, $a_2 \subset a$, etc. A split of a set of abstract channels A is any the union of splits of its constituent components. Thus if $A=\{a,b\}$ and $\{a_1,a_2,a_3\}$ is a split of a and $\{b_1,b_2\}$ is a split of b, then $\{a_1,a_2,a_3,b_1,b_2\}$ is a split of A. A binary split of a is any partitioning of a into two subsets, while a binary split of a set of abstract channels A is any binary split of a single abstract channel in A.

The number of c-channels |C| grows exponentially in the number of attributes of interest. This number can be pruned by eliminating any attributes that interest no bidder. A tighter bound on the number of required channels can be provided by aggregating c-channels that are indistinguishable to every bidder; this provides a simple lossless abstraction by grouping sets of c-channels corresponding to (logically consistent) formulae of the form $\wedge_{i \in B} \pm \phi^i$; i.e., conjunctions over all bid formulae or their negations.

However, such simple lossless abstraction is unlikely to render optimization (whether LP or MIP) practical: exponential growth would be expected in the number of channels, even when abstracted in this way. Instead, the use of "approximate" abstract channels (a-channels) is considered. An abstract channel is any aggregation of concrete channels, and can be represented as a logical formula $\alpha$ over F. An abstraction is any partitioning of c-channels C into a set A of a-channels, i.e., a set of mutually exclusive and covering formulae $\{\alpha_1, \ldots, \alpha_{|A|}\}$. When convenient, a-channel and its logical representation $\alpha$ are treated indistinguishably (e.g., writing $c \in \alpha$ to emphasize $\alpha$ as a collection of c-channels, or $c|=\alpha$ to focus on its logical form). Abstractions can also admit overlapping abstract channels, but preferred embodiments of the method described herein do not generally use overlapping (nondisjoint) abstract channels.

Given an abstraction A, the optimization problem becomes one of assigning ads for a particular advertiser or bid to a-channels rather than c-channels. To accomplish this, the supply of an a-channel $\alpha$ is defined to be $s(\alpha)=\Sigma\{s(c):c \in C, c|=\alpha\}$. In the simple LP case discussed above reflecting per-impression value, the value of an $\alpha$-impression to bid i is defined:

$$v_\alpha^i = v^i Pr(\phi^i|\alpha), \text{ where } Pr(\phi^i|\alpha)=s(\phi^i \wedge \alpha)/s(\alpha).$$

This value reflects the (expected) value of a random dispatch policy: if i is assigned to an abstract channel $\alpha$, it will be assigned randomly to the c-channels that constitute $\alpha$. Naturally, the dispatch of ads can be handled more intelligently: no ad for i will actually be assigned to a channel not satisfying $\phi^i$; intelligent dispatch can be used to reassign such wasted supply to ads that can exploit it. In this sense, the values $v_\alpha^i$ will underestimate true value in practice. This is discussed further below, wherein methods to assign ads to abstract channels in a more refined fashion are developed. When bid i has a budget $g^i$ capping its total expenditures, the optimal allocation under the random dispatch assumption is given by the LP:

$$\max_{x_{\alpha_j}^i} \sum_i \sum_{\alpha_j} v_{\alpha_j}^i x_{\alpha_j}^i$$

$$\text{s.t.} \sum_i x_{\alpha_j}^i \leq s(\alpha_j) \quad \forall \alpha_j \in C$$

$$\sum_i v_{\alpha_j}^i x_{\alpha_j}^i \leq g^i \quad \forall i \in B$$

In the case of more general IP expressiveness, value is not associated directly with impressions, but with arbitrary properties of the entire allocation; specific impressions satisfying logical formulae $\phi^i$ "count towards" satisfaction of a bid's conditions. Thus, the impressions that count toward bid satisfaction by $Pr(\phi^i|\alpha)$ are generally discounted rather than discounting objective function value. Of course, the value discount in the per-impression LP is a just special case of this.

At each iteration t of the algorithm, let $A^t$ denote the current set of abstract channels. The approach begins with an initial set of abstract channels $A^0$—this could be as simple as the single abstract channel containing all inventory, or it could reflect the a priori knowledge of the publisher/network regarding good initial abstract channels. At iteration t, a set of possible splits of $A^t$ is examined, and each of these is scored using a suitable (heuristic or exact) measure of the impact of the split on the ability to better assign ads according to the objective in question (e.g., revenue or efficiency). This score is assessed in the context of $A^t$—that is, it measures the (relative or absolute) degree to which splitting $A^t$ will improve objective value. The split with the best score (e.g., highest) is the split that is adopted. Scores need not be computed explicitly for all possible splits. Some splits may be determined to be dominated by (i.e., worse than) other splits by means of some logical (or other) relationship between them, without requiring the explicit computation of the score of the dominated split. In some cases, a best split can be determined without explicit computation of its score either. Once adopted, the set of abstract channels is updated by replacing any split channels in $A^t$ by their splits, resulting in an updated set of abstract channels $A^{t+1}$. At iteration t+1, the process is repeated unless an appropriate termination criterion (as discussed above) is satisfied by $A^{t+1}$. Optionally, once the appropriate splits of $A^t$ are determined at iteration t, merging of channels can be considered. Merging involves coalescing several abstract channels into a more abstract channel by replacing the merged set by its union. Merging of two or more channels may be made attractive by the new splits entered at iteration t: it can, for example, reduce computational complexity, while hindering objective value only minimally.

A special case of this procedure in which only a single round of splits is described followed by an algorithm for doing a single round of splits.

Criteria that can be included in scoring possible splits include, but are not limited to:

explicit scoring of a split by solving for the optimal allocation using that split, and comparing the resulting optimal objective value with the split, with that obtained without the split; the value of the optimal objective value (both with and without the split can be approximated as well); and heuristic scoring of a possible split using a function $f$ that combines into a single score: the relative (predicted or actual) supply of ad slots within the split abstract channels; the relative (predicted or actual) demand for ad slots within the split abstract channels; the (predicted or actual) prices bid (or posted) for ad slots within the split abstract channels; the number of bidders/advertisers expressing interest in ad slots in the split abstract channels; the complexity of the description (e.g., in a logical language over attributes) of the abstract channels that result from splitting; distinctions between the channels within split abstract channels in their ability to offer more or less precise predictions of user events caused by ad displays (e.g., clicks or conversions); and other relevant metrics.

Channel Abstraction by Column Generation.

One specific example of the process for channel abstraction will now be described. This process is utilized for the case of advertisers expressing interest in ad slots using arbitrary logical conditions or properties of ad slot attributes, with per-impression values and budgets. The extension to events (e.g., clicks) induced by ad impressions is straightforward using standard conversion of per impression bids to "per event" bids. Assume LP-based optimization is used to allocate impressions to abstract channels (though the specific algorithm, whether exact or approximate is not critical). Assume the objective is revenue maximization, however, the generalization to other linear objectives is straightforward. Additional forms of expressiveness will be described later.

Bids.

Assume a set of logically independent attributes $\gamma=\{A,B,C,\ldots\}$, and for simplicity assume these are boolean and can take values $a,\bar{a},b,\bar{b},\ldots$. Each bid takes the form:

$$B^i=\langle \phi^i, v^i, g^i \rangle$$

where $\phi^i$ is some logical formula over the propositional variables $a,b,c,\ldots$; $v^i>0$ is bid i's value for any impression satisfying $\phi^i$; and $g_i>0$ is bid i's budget limit.

Channel Supply.

Let $\Omega$ denote the set of value assignments to variables in $\gamma$ (i.e., the set of possible worlds, or truth assignments in the boolean special case). Assume the supply $s(\omega)$ is known for each possible world $\omega \in \Omega$. The supply associated with any formula $\phi$ is $$s(\phi)=\Sigma\{s(\omega):\omega \models \phi\}.$$

Each $\omega \in \Omega$ corresponds to an unabstracted channel: if an $\omega$-impression is assigned to any bid i, it is known categorically whether or not the bid's formula $\phi_i$ is satisfied.

Unabstracted Optimization.

The unabstracted optimization problem can be formulated as a very straightforward LP. Let $x_\omega^i$ denote the number of impressions of channel $\omega$ assigned to bid i. Define $v_\omega^i$ to be i's value for an $\omega$-impression:

$$v_\omega^i = \begin{cases} v^i & \text{if } \omega \models \phi^i \\ 0 & \text{if } \omega \not\models \phi^i \end{cases}$$

Then, optimize:

$$\max_{x_\omega^i} \sum_i \sum_\omega v_\omega^i x_\omega^i$$

$$\text{s.t.} \sum_i x_\omega^i \le s(\omega) \quad \forall \omega \in \Omega$$

$$\sum_\omega v_\omega^i x_\omega^i \le g^i \quad \forall i \in \text{Bids}$$

Obviously, variables corresponding to irrelevant bid-channel pairs can be removed (i.e., where $v_\omega^i=0$).

Numbers of Channels.

Generally speaking, the number of (unabstracted) channels $|\Omega|$ will grow exponentially in the number of attributes of interest to bidders. Even with aggressive pruning, the number of channels will not permit even writing out the LP above, let alone solving it. The ideal way to construct channels is not actually to consider attributes of interest, but to manage the logical formula associated with bids. The relevant abstract channels are those corresponding to the formulae given by the logical conjunction of each bid formula:

$$\bigwedge_{i \in \text{Bids}} \pm \phi^i$$

Logically inconsistent conjunctions can be removed from this set (since no property can satisfy their conditions); in addition, any formula that has (near) zero-supply can also be ignored (we'll call such potential formulae/channels supply inconsistent). The number of channels can be bounded the minimum of $2^{|\text{Bids}|}$ and $2^{|\gamma|}$ (where the latter provides an upper bound on the number of logically distinct formulae that can be generated by the (full) conjunction of bid formulae (and their negations)). Practically, of course, if bids have much in common, there is likely to be considerable pruning due to logical and supply inconsistency: how much is an empirical question.

Simple LP Channel Abstraction.

Each formula $\psi$ corresponds to an abstract channel: an assignment of an abstract channel to a bid is interpreted as randomly assigning impressions from the constituent unabstracted channels $\{\omega:\omega|=\psi\}$ to that bid. In other words, abstract channel $\psi$ aggregates those unabstracted channels consistent with it. If a bid i is assigned to abstract channel $\psi$, but has bid on impressions satisfying a distinct formula $\phi^i \neq \psi$, then not all of the impressions will have value to i; instead, it will pay only for a fraction of these impressions. Specifically, the expected value of a $\psi$-impression is defined as:

$$v_\psi^i = v^i \frac{s(\phi^i \wedge \psi)}{s(\psi)}$$

(if $s(\psi)=0$, let $v_\psi^i=0$). Note that:
1. if $\psi|=\neg \phi_i$, then $v_\psi^i=0$ (logical inconsistency);
2. if $s(\psi \wedge \phi_i)=0$, then $v_\psi^i=0$ (supply inconsistency);
3. if $\psi|=\phi_i$, then $v_\psi^i=v^i$ (i.e., channel $\psi$ specializes $\phi_i$—note that the definition of $v_\omega^i$ is a special case of this).

The abstract assignment problem requires the assignment of a collection $\Psi$ of disjoint (and generally, exhaustive) set of abstract channels to each bid. The optimization is again straightforward: When $x_\psi^i$ denote, the number of impressions of abstract channel $\psi$ assigned to bid i, then:

$$\max_{x_\psi^i} \sum_i \sum_{\psi \in \Psi} v_\psi^i x_\psi^i$$

$$\text{s.t.} \sum_i x_\psi^i \leq s(\psi) \quad \forall \psi \in \Psi$$

$$\sum_\psi v_\psi^i x_\psi^i \leq g^i \quad \forall i \in \text{Bids}$$

Again irrelevant bid-channel pairs can be removed (i.e., where $v_\psi^i=0$).

It is important to note that no intelligent dispatch in being considered here. If several bids are assigned to an abstract channel, an intelligent dispatch protocol could generally make more effective use of the channel than is indicated by the objective above. Desirably, this formulation is utilized to help generate abstractions "quickly" below. Once an abstraction is fixed, optimization of the channel assignment in a way that accounts for intelligent dispatch could be used.

Column Generation for Abstractions.

Now consider the use of column generation to aid in the construction of a suitable abstraction: a set of computationally-manageable size, yet whose optimal solution provides a good—ideally, optimal or near-optimal—solution to the original unabstracted LP/MIP. Column generation is naturally suitable to LP forms of expressiveness, although in practice it can be shown that it is also effective for IP expressiveness. It can also be shown how IP expressiveness can be further handled via constraint generation techniques below.

The All-Channels Linear Program.

To begin, consider the LP that allows the assignment of bids to any channel at any level of abstraction. When $\Psi$ is the set of all logical formulae in some canonical representation (that is, each subset of $\Omega$ is represented by exactly one formula), then:

$$\max_{x_\psi^i} \sum_i \sum_{\psi \in \Psi} v_\psi^i x_\psi^i$$

$$\text{s.t.} \sum_i x_\psi^i \leq s(\psi) \quad \forall \psi \in \Psi$$

$$\sum_\psi v_\psi^i x_\psi^i \leq g^i \quad \forall i \in \text{Bids}$$

In matrix form, a reasonably nice structure can be seen. If the language has the three boolean variables A, B and C, then:

$$\begin{bmatrix} v_T^1 & v_T^2 & v_T^3 & v_a^1 & v_a^2 & v_a^3 & v_{\bar{a}}^1 & v_{\bar{a}}^2 & v_{\bar{a}}^3 & \cdots & v_{abc}^1 & v_{abc}^2 & v_{abc}^3 \\ 1 & 1 & 1 & 0 & 0 & 0 & 0 & 0 & 0 & \cdots & 0 & 0 & 0 & \leq s(T) \\ 0 & 0 & 0 & 1 & 1 & 1 & 0 & 0 & 0 & \cdots & 0 & 0 & 0 & \leq s(a) \\ 0 & 0 & 0 & 0 & 0 & 0 & 1 & 1 & 1 & \cdots & 0 & 0 & 0 & \leq s(\bar{a}) \\ \vdots & & & & & & & & & \cdots & \vdots & \vdots & \vdots & \vdots \\ 0 & 0 & 0 & 0 & 0 & 0 & 0 & 0 & 0 & \cdots & 1 & 1 & 1 & \leq s(\overline{abc}) \\ v_T^1 & 0 & 0 & v_a^1 & 0 & 0 & v_{\bar{a}}^1 & 0 & 0 & \cdots & v_{abc}^1 & 0 & 0 & \leq g^1 \\ 0 & v_T^2 & 0 & 0 & v_a^2 & 0 & 0 & v_{\bar{a}}^2 & 0 & \cdots & 0 & v_{abc}^2 & 0 & \leq g^2 \\ 0 & 0 & v_T^3 & 0 & 0 & v_a^3 & 0 & 0 & v_{\bar{a}}^3 & \cdots & 0 & 0 & v_{abc}^3 & \leq g^3 \end{bmatrix}$$

Of course, this LP allows overallocation of channel supply, since channels that overlap can be allocated. For example, channel a might be allocated up to its capacity s(a), while simultaneously allocating "additional" supply from channel ab despite the fact that this is included in the former channel. Constraints can be imposed that prevent this—integer variables recording allocation to each channel can be constrained to ensure that no overlapping channels have positive allocations (see below). However, the column generation approach discussed hereinafter will make such constraints unnecessary: no overlapping channels will be permitted in the LP itself.

The problem with this LP is that it has a number of variables and constraints that is doubly exponential in the number of impression attributes of interest: $|\Omega|$ is exponential in the number of attributes, and $|\Psi|=2^{|\Omega|}$.

Aside: Single IP to Find Optimal Abstraction.

It is interesting to consider how one would find an optimal abstraction in a single optimization. Each channel corresponds to a logical formula $\phi$, or equivalently, the subset of the possible worlds $\|\phi\| \subseteq \Omega$. We'll say channel $\phi'$ is a (strict) refinement of $\phi$, written $R(\phi', \phi)$, if $\|\phi'\| \subset \|\phi\|$. Channel $\phi'$ is an immediate refinement of $\phi$, written $IR(\phi', \phi)$ if it is a refinement of $\phi$ and there is no $\phi''$ that is both a refinement of $\phi$ and is refined by $\phi'$. (This simply says that $\phi'$ is a child of $\phi$ is the subset lattice over $\Omega$.) A valid abstraction is any packing of $\Omega$ (i.e., a set of logically disjoint channels). A complete abstraction is any partitioning of $\Omega$ (i.e., a set of logically disjoint and exhaustive channels).

This is encoded as follows:

For any channel $\phi$, let 0-1 variable $I_\phi$ denote that $\phi$ is a channel in the abstraction.

Let 0-1 variable $D_\phi$ denote that some refinement of $\phi$ is in the abstraction.

Then impose the following constraints:
(a) $I_\phi \leq D_{\phi'}$, for all $\phi$ and all $\phi'$ s.t. $IR(\phi,\phi')$ (i.e., if $\phi$ is in the abstraction, each parent of $\phi$ has a descendent in the abstraction).
(b) $D_\phi \leq D_{\phi'}$, for all $\phi$ and all $\phi'$ s.t. $IR(\phi, \phi')$ (i.e., if $\phi$ has a descendent in the abstraction, then so does each of its parents).
(c) $D_\phi \leq 1-I_\phi$ for all $\phi$ (i.e., if $\phi$ has a descendent in the abstraction, it cannot be in the abstraction).
(d) $x_\phi^i \leq I_\phi$ for all bids i, channels $\phi$ (i.e., bids can only be assigned supply from channels in the abstraction).

This IP is enough to ensure that an optimal abstraction is found (when added to the all-channels LP). (It has exponentially many integers vars (in $|\Omega|$), but only linearly many constraints per integer var. Of course, $\Omega$ itself has exponential size in the number of attributes.) This IP has no bias toward smaller abstractions: this could be accomplished with the addition of penalty terms, of suitable magnitude, associated with finer levels of abstraction.

Column Generation: General Approach.

One way to think of generating an abstraction is as column generation. Column generation is used to solve linear programs with very large numbers of variables by solving a version of the LP with very few variables (columns), then adding new variables into the LP at each iteration and then resolving, using a heuristic scoring method to determine which new variables to add at each iteration. This approach is adopted here, but with some significant enhancements that account for the fact that multiple columns must be introduced at once that exploit the special structure of the problem. The basic approach is as follows: solve an abstract LP using some initial level of abstraction (e.g., aggregating all concrete channels into a single abstract channel T). Refine the abstraction heuristically by choosing an abstract channel $\alpha$ to split into two by conjoining a formula $\beta$ and its negation, thus replacing $\alpha$ by $\alpha \wedge \beta$ and $\alpha \wedge \bar\beta$. Solve a new LP with the new abstract channels, and the process repeats until the improvement in LP objective value falls below some threshold or the number of channels reaches a specified limit.

Suppose the All-Channels LP is solved but use only a small subset of channels corresponding to a particular abstraction are used. The LP will have only variables corresponding to these channels. Refining this abstraction amounts to "splitting" one or more of the abstract channels into finer-grained channels. This can be seen as adding variables/columns to the abstracted LP. If it is desired that channels in the abstraction not overlap, then any channel (variables) so split will need to be removed from the LP. Thus considered is the use/adaptation of column generation methods to determine which columns to add (equivalently, which channels to split).

To motivate the method, consider a simple example. Suppose the starting point is an abstract LP with two abstract channels, a and $\bar a$. By ignoring all other channel variables, the problem is simplified considerably: only 2·|Bids| variables (corresponding to these two channels) and 2+|Bids| constraints (the two capacity constraints for the two channels and the budget constraints for each bid) are needed. For instance, suppose there are three bids, then the abstract LP is:

| Obj: | $v_a^1$ | $v_a^2$ | $v_a^3$ | $v_{\bar a}^1$ | $v_{\bar a}^2$ | $v_{\bar a}^3$ | |
|---|---|---|---|---|---|---|---|
| Constraints | 1 | 1 | 1 | 0 | 0 | 0 | $\leq s(a)$ |
| | 0 | 0 | 0 | 1 | 1 | 1 | $\leq s(\bar a)$ |
| | $v_a^1$ | 0 | 0 | $v_{\bar a}^1$ | 0 | 0 | $\leq g^1$ |
| | 0 | $v_a^2$ | 0 | 0 | $v_{\bar a}^2$ | 0 | $\leq g^2$ |
| | 0 | 0 | $v_a^3$ | 0 | 0 | $v_{\bar a}^3$ | $\leq g^3$ |

Note that by restricting attention to specific abstract columns—removing columns from the All-Channels LP—results in effectively reducing the number of constraints since those corresponding to the capacity of the removed, finer-grained channel are vacuous in the abstract LP.

Once solved, then determine which of these two channels, a or $\bar a$, would the most value to the LP solution if split. In classic column generation, the unused variable that has greatest reduced cost would be utilized. Here things are different, since the introduction of an arbitrary variable/column to the LP is not allowed; instead multiple columns are added and multiple columns are removed at each refinement:
If a channel is added to the LP, then introduce all of the variables associated with it; for instance, if channel ab is added, then add the columns corresponding to $x_{ab}^i$ for each bid i.
An existing channel is split, thus adding two new channels that partition an existing channel This means two new sets of columns are introduced. In this example, two sets of columns would need to be added if a is split: $\{x_{a \wedge \phi}^i, x_{a \wedge \neg \phi}^i : i \in Bids\}$.
The columns for the channel that is split must then be removed to ensure no overlapping channels exist in the refined abstraction.
This procedure is repeated until a satisfactory abstraction is obtained.

Aside: Overlapping Abstraction in Restricted Circumstances.

There might be the temptation, when splitting a channel a into ab and $a\bar b$, to retain variables for $x_a^i$ when adding $x_{ab}^i$, $x_{a\bar b}^i$. (Here think of a, b as arbitrary formulae, not just literals). Intuitively, the resulting a-channel can be thought of as undifferentiated supply: i can be assigned to either ab, to $a\bar b$, or to arbitrary a supply which doesn't distinguish b or $\bar b$. This undifferentiated channel is denoted by a* (indicating that at least some of a has been carved off into more specific channels). The only natural way to define the capacity of a* is with respect to what's left of a after ab and $a\bar b$ are accounted for:

$$s(a^*) = s(a) \sum_i (x_{ab}^i + x_{a\bar b}^i).$$

This leads to one conceptual problem and one technical problem. Conceptually, there is no value in allowing all three variables $x_{a^*}^i, x_{ab}^i, x_{a\bar b}^i$ for a single bid i. So, assume that bids i are partitioned into two classes, those that can be assigned differentiated supply only, and those that can be assigned undifferentiated supply only. To be fully expressive all bids could classified as "differentiable" since anything that can be done with a* can be done with ab and $a\bar b$ jointly. The value in classifying some bids as "undifferentiable" is that an allocation variable is saved.

Intuitively, think of a bid i as not caring about the difference between ab and $a\bar b$ if its value for each of the two channels were the same. For instance, if i doesn't care about b or anything involving b, it would be desirable like to assign i supply from a*. Unfortunately, pricing becomes a problem. Recall the value of the abstract channel a* to i is given by $v_{a*}{}^i = Pr(\phi^i|a*)$. But $Pr(\phi^i|a*)$ can depend on the (a priori unknown) assignment to ab and $a\bar{b}$:

$$Pr(\phi^i|a*) = \frac{s(ab) - \sum_j x_{ab}^j}{s(a*)} Pr(\phi^i|ab) + \frac{s(a\bar{b}) - \sum_j x_{a\bar{b}}^j}{s(a*)} Pr(\phi^i|a\bar{b})$$

In other words, the value of $v_{a*}{}^i$ cannot be fixed in advance for an undifferentiated channel that has more specific, differentiated subchannels. This should be obvious due to the channel skimming effect. Note that this holds even if i doesn't "care" about b directly: if b is correlated with some other attribute that does impact i's value, then skimming of b is a problem.

This can be made to work if $\phi^i$ is independent of b given a: if $Pr(\phi^i|ab) = Pr(\phi^i|a\bar{b})$, then $Pr(\phi^i|a*) = Pr(\phi^i|a)$ and $v_{a*}{}^i = v_a{}^i$. In this case, replace allocational variables $x_{ab}{}^i$, $x_{a\bar{b}}{}^i$ with $x_{a*}{}^i$, since $v_{ab}{}^i$ and $v_{a\bar{b}}{}^i$ are identical in the objective. Any such bid can be added to the set of bids that use undifferentiated supply a*. A couple points:

- If a⊨$\phi^i$, then this independence is logical, not just statistical, and will persist with any further splits of a, ab, etc. No special tracking is required.
- Otherwise, this independence is purely statistical and can disappear with further splits: e.g., while $\phi^i$ is independent of b given a, it may not be independent of c given ab. In this case, additional splits are monitored and the set of bids that are differentiable or not are adjusted. This requires some additional bookkeeping.

The bookkeeping will be fairly detailed (more so in the latter case than in the former) because of the existence of multiple levels of undifferentiated supply. For instance, if ab is split into abc and $ab\bar{c}$, undifferentiated supply channels a* and ab* will result, and the definition of s(a*) must be modified accordingly.

Computing Reduced Costs.

The solution to the abstract LP gives rise to a set of basic variables (including slack variables), and the basis matrix B. Any $x_\phi{}^i$ variables not present in the abstract LP can be viewed as nonbasic variables. Reduced cost measures the increase in objective value per unit increase in the (nonbasic) variable in question. Specifically, any variable that has positive reduced cost may improve the value of the objective. Standard column generation algorithms solve a pricing subproblem to identify columns absent from an LP with positive reduced cost, and generally add the column with maximum reduced cost (for maximization problems), terminating when no reduced costs are positive. Note though that when applied to channel abstraction, column generation requires bringing in both sides of the channel split while, typically, removing the parent channel. Furthermore, the reduced cost of the split are related to the dual prices of the parent channel in a special way. These aspects imply a need for novel approaches to scoring a split.

To compute the reduced cost is reasonably straightforward. Let B be the basis matrix corresponding to the abstract LP solution. Let $c_B$ be the vector of objective coefficients corresponding to this basis. First, compute the vector of simplex multipliers $\pi = c_B B^{-1}$. These can be interpreted as shadow or dual prices corresponding to the constraints in the current abstract LP. In other words, these are prices associated with the "consumption" of either abstracted supply or a bid's budget such that the objective value "produced" by each basis variable is equal to the cost of the supply/budget that it consumes. Each simplex multiplier corresponds to a specific constraint, so they are labeled as follows: $\pi^\psi$ for any $\psi$ in the current abstraction (corresponding to the supply constraint for $\psi$); and $\pi^i$ for each bid i (corresponding to bid i's budget constraint). In this example, the shadow prices are $\pi = \langle y^a, y^{\bar{a}}, y^1, y^2, y^3 \rangle$.

Let $\pi_\phi{}^i$ be the column corresponding to $x_\phi{}^i$. The reduced cost of variable $x_\phi{}^i$ is $$\hat{c}_\phi{}^i = v_\phi{}^i - \pi u_\phi{}^i$$

For instance, in this example, the reduced cost of $x_{ab}{}^2$ would be $$x_{ab}{}^2 - \langle \pi^a, \pi^{\bar{a}}, \pi^1, \pi^2, \pi^3 \rangle \cdot u_{ab}{}^2.$$

Examining the structure of column $u_\phi{}^i$ it can be seen that it is a zero vector except for:

1. entry 1 in the supply constraint for $\phi$;
2. and entry $v_\phi{}^i$ in bid i's budget constraint.

Of course, constraint (b) is not actually present in the abstract LP. In this example, $$u_{ab}{}^2 = \langle 0 0 0 v_{ab}{}^2 0 1 0 \rangle$$

where the last two entries $\langle 1 0 \rangle$ correspond to the proposed split supply ab and $a\bar{b}$.

This gives the problem of dimensionality mismatch. More precisely, the supply associated with the refined channel $\phi$ (which is one part of a split of some parent channel) has not been priced. (Note that included are the constraints for ab and $a\bar{b}$ in the abstract LP, they would have been vacuous, leading to dual variable values/shadow prices of zero in any case.) There are several approaches that could be taken to computing dual variables for the s(ab) and s($a\bar{b}$) constraints. The critical point is not to re-solve the LP with the new constraints in place. Accordingly, consider four approaches: the first makes intuitive sense, but in the end is incorrect; the second seems to suggest something reasonable; the third describes a more principled way to use LP dual prices; and the fourth is the preferred method for using dual prices. In particular, the fourth method uses dual prices in a way that exactly computes the improvement of a split under a restricted model of expressiveness. It is a heuristic overestimate of the improvement for more general forms of expressiveness.

Approach 1: Redefining Variables.

However, if channel a is split into ab and $a\bar{b}$, there is still an intuitive notion of price that can be applied to these split channel constraints at the current solution. Recall that $\pi$ satisfies $c_B = \pi B$: these are prices of the budget and supply constraints at which the total consumption cost of each basic variable equals its contribution to objective value. For the column $x_a{}^i$, these simplex multipliers must satisfy $$v_a{}^i = \pi^a + v_a{}^i \pi^i$$

(this is simply one equality in the system $c_B = \pi B$). The consumption of channel a by any variable $x_a{}^i$ can be broken into the consumption of the subchannels ab and $a\bar{b}$. But within the current abstraction, only $x_{ab}{}^i$ and $x_{a\bar{b}}{}^i$ can be allocated with fixed ratios $Pr(b|a)$ and $Pr(\bar{b}|a)$. If:

$$x_{ab}{}^i = Pr(b|a) x_a{}^i$$

$$x_{a\bar{b}}{}^i = Pr(\bar{b}|a) x_a{}^i$$

then the abstract LP can be rewritten in terms of the supply constraint on s(ab):

$$\sum_i Pr(b|a) x_a^i \leq s(ab)$$

The optimal solution of the abstract LP with this constraint replacing the supply constraint dictated by s(a) will be identical to the original. The shadow price $\pi^{ab}$ associated with this constraint satisfies $$v_a^i = Pr(b|a)\pi^{ab} + v_a^i \pi^i$$

This implies that $$\pi^{ab} = \frac{1}{Pr(b|a)} \pi^a.$$

Note that the shadow price for the ab supply is at a premium of $$\frac{1}{Pr(b|a)}$$

relative to a. For instance, if s(ab)=0.25s(a), then $\pi^{ab}=4\pi^a$ and (since a$\bar{b}$ makes up the other three-quarters of a-supply)

$$y^{a\bar{b}} = \frac{4}{3} \pi^a.$$

Intuitively, this makes sense. Differentiated supply is much more "valuable" than undifferentiated supply since much less of it is "wasted" in general.

This enables a reduced cost to be assigned to any new column $x_\phi^i$:

$$v_\phi^i - \pi^{Par(\phi)} \frac{1}{Pr(\phi|Par(\phi))} - \pi^i v_\phi^i$$

(Here Par($\phi$) is the parent channel of $\phi$, i.e., the channel in the current abstraction that is split to create $\phi$.) If the column has positive reduced cost, then adding the column to the LP will improve value (ignoring the refinement constraints). Intuitively, the inequality $\pi u_\phi^i < v_\phi^i$ means that at the current solution (in current abstraction), there is more marginal value associated with the allocating to this new variable than the marginal cost of the supply/budget that it consumes at the current shadow prices.

Approach 2: Shadow Price Division.

An alternative approach is to simply "share" the dual price associated with the constraint on channel supply with the split supply. For instance, suppose channel a is split into ab and a $\bar{b}$. Recall the dual variable $\pi^a$ induces a total cost of $\pi^a s(a)$ on the use of channel a (recall the constraint is tight if $y^a$ is nonzero). Intuitively, the total price assigned to the "resources" s(ab) and s(a$\bar{b}$) should induce the same total cost: hence the dual prices on the split channels should satisfy: $\pi^a s(a) = \pi^{ab} s(ab) + \pi^{a\bar{b}} s(a\bar{b})$ (s.t., $\pi^{ab}, \pi^{a\bar{b}} \geq 0$). This equality has infinitely many solutions; but notice that since s(a)=s(ab)+s(a$\bar{b}$), a trivial (and natural) solution is to set $\pi^{ab}=\pi^{a\bar{b}}=\pi^a$. Hence, simply use the shadow price of the parent channel for the split channels when computing reduced costs. More generally, the reduced cost of any new column $x_\phi^i$ is:

$$\pi_\phi^i - \pi^{Par(\phi)} - \pi^i v_\phi^i$$

This approach has some intuitive appeal. Computationally, it seems to point in the direction of appropriate splits when tested on some small numerical examples (three bids, eight channels over three attributes). However, it does seem to lack any sensitivity to the differences in split channel capacity. The final reduced cost derivation will address this directly.

Approach 3: One Method for Using Dual Prices.

The abstract LP is then solved to determine an optimal solution to the abstracted problem—in this example, with channels a and $\bar{a}$. This solution is also an optimal solution for the less abstract LP in which one of the original channels is split, e.g., where a is split into ab and a$\bar{b}$, subject to the constraint that ab and a$\bar{b}$ are assigned to each bid in a fixed ratio Pr(b|a):Pr($\bar{b}$|a). Of course, breaking the abstraction by splitting a in this way, can be viewed as simply dropping the fixed ratio constraint. The optimal solution of this fixed-ratio LP is not optimal for the relaxed version; but it is a feasible solution. As such computed are the dual prices associated with this sub-optimal feasible solution in the split LP. This would reflect the true value of dropping the constraint, i.e., adopting the split.

While this suggests the need to solve the LP associated with each split, it turns out that the dual prices of the split channels in the split LP are tightly related to the dual price of the parent in the abstract LP.

In the split LP (dropping the fixed ratio constraint), the dual prices for s(ab) and s(a$\bar{b}$) must satisfy (for each bid i):

$$v_{ab}^i = \pi^{ab} + \pi_{ab}^i$$

$$v_{a\bar{b}}^i = \pi^i v_{a\bar{b}}^i$$

Solving for $\pi^{ab}$, produces (again for each bid i):

$$y^{ab} = v_{ab}^i - \pi^i v_{ab}^i$$
$$= Pr(b|a)(v_a^i - \pi^i v_{ab}^i)$$
$$= Pr(b|a)\pi^a$$

The first equality is simple term rearrangement; the second follows for the definition of $v_{ab}^i$; and the third follows from the constraints on shadow prices in the abstract LP, which satisfies $v_a^i = \pi^a + v_a^i \pi^i$ for all bids i (see above). Similarly, $$\pi^{a\bar{b}} = Pr(\bar{b}|a)\pi^a$$

This is another suitable means of computing shadow prices of the new split channel constraints without solving a new LP.

In general, the reduced cost of any new column $x_\phi^i$ is defined as follows:

$$\pi^{a\bar{b}} = Pr(\bar{b}|a)\pi^a$$

Apart from its principled derivation, computationally, it seems to point in the direction of appropriate splits when tested on some small numerical examples (three bids, eight channels over three attributes).

Reduced Costs of a Split.

The reduced cost approaches above score the potential value of adding specific columns. Splitting a channel $\psi$ into $\psi \wedge \phi$ and $\psi \wedge \neg \phi$ does not introduce a single column, but the set of columns $\{x^j_{\psi \wedge \phi}, x^j_{\psi \wedge \neg \phi} : i \in \text{Bids}\}.$ The split of any channel is heuristically scored by summing the reduced costs of each column generated by the split, with the exception of any columns with negative reduced costs (since they do not have to be used in the solution at the less abstract level).

One difficulty with a pure positive-sum scoring metric is the fact that it does not account for the fact that different columns "compete" for specific constraints (i.e., "resources"). For instance, if variables/columns are added for both $x_{ab}{}^i$ and $x_{a\bar{b}}{}^i$, these will both compete for bid i's budget. Similarly, if both $x_{ab}{}^1$ and $x_{ab}{}^2$ are added, they each compete for the new channel ab. In both cases, summing the score has the potential to overestimate the value of a split by ignoring such interactions. Positive-sum scoring can be refined by restricting the sum to include at most one column per bid and at most one column per new channel. This would require some very trivial maximization: consider the split ab/a$\bar{b}$. Let $x_{ab}{}^{i*}=\arg \max_i x_{ab}{}^i$ and let $x_{a\bar{b}}{}^{j*}=\arg \max_j x_{a\bar{b}}{}^j$ (maximizing reduced costs in each case). Then, compute the two pseudoscores: $h_1 = x_{ab}{}^{i*} + \arg \max_{j \neq i*} x_{a\bar{b}}{}^j$ and $h_2 = x_{a\bar{b}}{}^{j*} + \arg \max_{i \neq j*} x_{ab}{}^i$, and score the split using the max of $h_1, h_2$.

Alternative scoring measures include simply using the score of the maximum column reduced cost (and possibly others).

Aside: Greedy Splitting.

There are simpler versions of this process that are very easy to optimize. In other words, the search over possible splits becomes straightforward (in contrast to the process discussed below). For example, if the supply constraints are ignored and focus is solely on value, the reduced cost of a column $x_\phi{}^i$ can be defined as $v_\phi{}^i - \pi^i v_\phi{}^i$. This makes it easy to find the split with max reduced cost by searching over bids: for any bid with $y^i < 1$, the reduced cost will be maximized at the split $\phi^i$ (i.e., splitting on bid i's formula). Thus the bid with maximum value, scaled by its budget shadow price, is the (single) column with max reduced cost.

This process basically incrementally splits off the formulae associated with specific bids, doing it in a greedy order corresponding to adjusted value. Thus, it is a bit more sophisticated than simply ordering bids by marginal bid value and splitting off their formulae—this accounts for the fact that previous channel splits can do a good job of satisfying a bid with high marginal value, leaving it with very low adjusted value, and allowing us to focus on other bids. However, while computationally convenient, this procedure completely ignores supply constraints. It is unlikely to perform well for this reason. But it might be worth exploring.

Approach 4: Preferred Method Using True Dual Prices.

Consider the following LP to allocate bids B={1,2} to a single abstract channel $\alpha$ (with no budget or other constraints). A single channel is illustrated to reduce notational clutter. Unless $\alpha \equiv T$, this LP will have a set of a-channels $\alpha_j$ and allocation variables $x^i_j$ for each bid i and a-channel $\alpha_j$:

Max $v^1_\alpha x^1_\alpha + v^2_\alpha x^2_\alpha$ s.t. $x^1_\alpha + x^2_\alpha \leq s(\alpha)$ Refining a-channel $\alpha$ requires introducing the columns corresponding to $\alpha \wedge \beta$, $\alpha \wedge \bar\beta$ for some $\beta$.

Scoring Abstract Channel Splits.

Assume the solution of the abstract LP above, the value, or score, of a potential split of $\alpha$ into two channels $\alpha \wedge \beta$, $\alpha \wedge \bar\beta$ is determined. The preferred method scores a split by: (a) scoring the new columns introduced by the split using a form of column generation scoring; and (b) combining the scores of these new columns in a particular way that exploits the special structure of the problem.

Let $\pi_\alpha$ denote the value of the dual variable corresponding to the supply constraint for a-channel $\alpha$ in the dual of the abstract LP (equivalently, the shadow price of the constraint). The reduced cost of variable $x_{\alpha \wedge \beta}{}^i$ is:

$$rc(x^i_{\alpha \wedge \beta}) = v^i_{\alpha \wedge \beta} - c\pi$$

where c is $x_{\phi j \wedge \beta}$'s column and $\pi$ is the vector of dual variables. The reduced cost of $x^i_{\alpha \wedge \bar\beta}$ is defined similarly. Unfortunately, the abstract LP does not include relevant supply constraints for $\alpha \wedge \beta$ or $\alpha \wedge \bar\beta$, meaning shadow prices for these constraints cannot be directly obtained from the LP. Consideration is given to adding two new rows to the original abstract LP, reflecting split channel supply, as follows:

Max $v^1_\alpha x^1_\alpha + v^2_\alpha x^2_\alpha$ s.t. $x^1_\alpha + x^2_\alpha \leq s(\alpha)$ $Pr(\beta|\alpha)x^1_\alpha + Pr(\beta|\alpha)x^2_\alpha \leq s(\alpha \wedge \beta)$ $Pr(\bar\beta|\alpha)x^1_\alpha + Pr(\bar\beta|\alpha)x^2_\alpha \leq s(\alpha \wedge \bar\beta)$ Since $s(\alpha \wedge \beta) = Pr(\beta|\alpha)s(\alpha)$ (similarly for $\bar\beta$), these new constraints are multiples of the original $s(\alpha)$ constraint, leaving the optimal solution unaffected. This allows pricing of the two new constraints: when the dual of this LP is considered, one optimal solution sets the dual variable $\pi_\alpha$ to its value in the original abstract dual LP, and sets the two new dual variables $\pi_{\alpha \wedge \beta} = \pi_{\alpha \wedge \bar\beta} = 0$. As a result, the reduced costs of the variables corresponding to the split channels using terms available from the solution of the original abstract LP can be determined:

$rc(x_\alpha \wedge {}_{\beta}{}^i) = v_\alpha \wedge {}_\beta{}^i - c\pi = v_\alpha \wedge {}_\beta{}^i - \pi_\alpha$ $rc(x_\alpha \wedge {}_{\bar\beta}{}^i) = v_\alpha \wedge {}_{\bar\beta}{}^i - c\pi = v_\alpha \wedge {}_{\bar\beta}{}^i - \pi_\alpha$ In this simple case, with only supply constraints, the change in objective value resulting from a split can be measured exactly. Without budget constraints, it is clear that all supply of the new split channel $\alpha \wedge \beta$ will be allocated to the bid i that has maximum value $v_{\alpha \wedge \beta}{}^i$, giving total objective value improvement of $rc(x_\alpha \wedge {}_\beta{}^i)s(\alpha \wedge \beta)$. Here the reduced cost component reflects the precise difference in objective value if an $\alpha$-impression to a current winning bid is replaced by an $\alpha \wedge \beta$-impression to bid i, while the supply component informs how much substitution is available. Applying the same argument to $\alpha \wedge \bar\beta$ gives the following heuristic for scoring the split of any channel $\alpha$ into two subchannels $\alpha \wedge \beta$ and $\alpha \wedge \bar\beta$:

$$\text{score}(\alpha, \beta, \bar\beta) = \max_{i \in B}\{rc(x^i_{\alpha \wedge \beta})s(\alpha \wedge \beta)\} + \max_{i \in B}\{rc(x^i_{\alpha \wedge \bar\beta})s(\alpha \wedge \bar\beta)\}$$

This scoring function has the desirable property that the score of a split is exactly the induced improvement in objective value when the only constraints are supply constraints. Of course, almost all natural problems will have other constraints: budget constraints most certainly, and other expressive forms as well. However, if limited to LP expressiveness, the reduced cost calculation remains straightforward, requiring one vector product (using dual/shadow prices computed in the LP solution). The scoring function itself becomes heuristic, providing an upper bound on the possible improvement in objective value (e.g., consider the case where the maximizing bid i for split $\alpha \wedge \beta$ has a budget constraint that prevents it from consuming the entire split supply). Despite this, it provides much better performance than using reduced costs alone. One could envision more complex scoring functions that attempt to solve small optimization problems to better estimate the improvement in objective value for a given split. Folklore in column generation suggests this is rarely worthwhile. However, a key advantage is that the scoring function requires no additional computation over standard reduced cost calculations (using terms readily available from the LP solve) apart from a trivial maximization. This is critical, since as discussed next the number of potential splits is doubly exponential.

Choosing a Refinement.

Unfortunately, the number of potential splits of an a-channel $\alpha$ is doubly exponential in n (i.e., $2^{k^n}$ formulae over n attributes with domain size k), and there does not seem to be much of the way of compositional structure of these scores that would allow optimal searching over these columns (to find the split with optimal score). In addition, there is a need to evaluate splits of each a-channel $\alpha_j$ in the current abstraction A.

Unfortunately, there are doubly exponentially many splits that need to be evaluated. Instead, a simple greedy search scheme that will allow construction of a Disjunctive Normal Form (DNF) formula $\beta$ describing a split of channel $\alpha$ into $\alpha \wedge \beta$ and $\alpha \wedge \overline{\beta}$ can be used. The search can be defined in such a way that any DNF formula can be constructed, this giving the ability to find any split, in principle. It is also possible to introduce other biases into the process by restricting the form of the splits that can be constructed (e.g., conjunctions of literals, k-term DNF, etc.)

Computing the score of any formula $\alpha \wedge \beta$ representing the refinement of an existing abstract channel is computationally simple, requiring at most 2|B| reduced cost calculations. This is in fact an overestimate, since any bid i that cannot use abstract channel $\alpha \wedge \beta$ (i.e., $\alpha \wedge \beta \models \neg \phi^i$) will not have a variable $x^i_j$ and will not contribute to the score. The scores of such formulae can be used to guide the incremental construction of a split. Since each original abstract channel gives rise to mutually exclusive formulae when they are split, possible splits are independently evaluated for each existing channel in the current abstraction. A process for one channel only will now be described with reference to FIG. 2.

Figure 2:
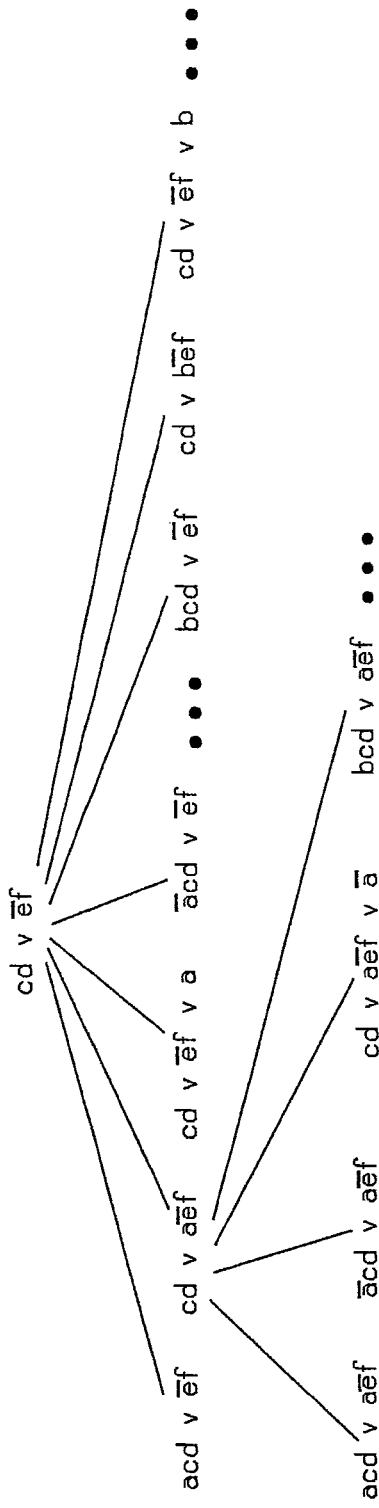
FIG. 2 is an exemplary search tree that can be utilized for choosing a refinement of an abstract channel by generating split or child abstract channels.

Consider a search tree with split formulae $\beta$ labeling nodes (the formula $\overline{\beta}$ is implicit). Assume each $\beta$ is written in DNF. In FIG. 2 the root node is labeled with $\beta_c$=cd∨ ef. Note that FIG. 2 depicts only a portion of a search tree, with $\beta_c$ actually being an intermediate node in the broader tree rooted at $\beta_r$=T.

The children of any node $\beta$ in the search tree are defined as those formula that can be constructed using one of two classes of operations:

for any literal l, the formula resulting from conjoining the literal to one of the terms of $\beta$; and for any literal l, the formula resulting from disjoining the literal as a new term.

The first to nodes at level one of the tree in FIG. 2 illustrate the first operation using literal a (which is added to terms cd and ef, respectively). The third node illustrates the second operation, again with literal a.

Any search procedure can be used to explore this tree. The key is that the reduced costs scoring metric can be used as a heuristic to guide the process. It remains to look more deeply into the relationship between the reduced costs of different formulae to determine whether useful bounding and search ordering information can be derived. For simplicity, a very simple, greedy search mechanism over this tree will be described below.

The non-backtracking search process proceeds as follows. Let $\beta$ be the current node. For each of $\beta$'s children, $\beta'$, score $\beta'$ using the reduced cost metric for those columns introduced by adding channels $\alpha \wedge \beta'$ and $\alpha \wedge \overline{\beta'}$. The node with the highest score becomes the current node and the search continues from that point. Essentially, the process greedily commit to the literal with the maximal score at each iteration of the search process; but there is no commitment to this as a split.

The search process can terminate when one of several conditions are met:

The best score falls some threshold.

The search tree reaches some depth.

The set of all improving children (over some threshold) exceed a complexity limit.

In the last category, for example, might include restricting formulae to k-DNF (at most k literals per term) or m-term DNF (at most m-terms) or a combination. Biases such as conjunctive splits can be imposed by considering only 1-term DNF.

Despite the iterative nature of this formula search, no additional optimization is required. The scores of all candidate formulae are computed relative to the solution (basis) of the original abstract LP. Only once the actual split is determined at the end of the process is a new, less abstract LP solved.

Another restriction could be introduced into the search process: namely, only evaluate branches or moves in the search tree that lead to a formula that more closely "approximates" the bid formula $\phi^i$ of some bid i. The only way in which a split can enhance objective value is if it allows more accurate discrimination of the value associated with at least one bid. This could be accomplished in several ways, including methods that look at the statistical correlations between bid formula and potential splits. By focusing on splits that create channel formulae that are "logically" closer to an existing bid formula, it intuitively is more likely that the bid will be satisfied when assigning the new channel to it.

The moves made to construct DNF formulae will not permit adherence to a strict definition of closeness, but it is worth providing such a definition: at least semantically. Let $\psi=\alpha \wedge \beta$ be the current channel formula (i.e., the DNF formula labeling the current tree node) and let $\psi'=\alpha \wedge \beta'$ be one of its child formula (i.e., that obtained by adding a literal to $\beta$). It can be said $\psi'$ is closer to bid formula $\phi$ than $\psi$ iff the symmetric set difference is reduced; more precisely, iff Diff ($\|\psi'\|,\|\phi\|$)⊆ Diff ($\|\psi\|,\|\phi\|$) where Diff (S,T)=S\T∪T\S. In other words, the formula $\psi'$ moves closer to $\phi$ iff the set of possible worlds that satisfy one but not the other becomes smaller. A sequence of moves that take us (strictly) closer to a target formula $\phi$ is guaranteed to converge (monotonically) to $\phi$.

This is a very strict definition of closeness and is hard to enforce using very limited moves (adding literals to terms or adding disjuncts) as can be seen below. Closeness can be defined somewhat more weakly by removing the implicit conjunction in the set difference definition. Specifically, say $\psi'$ is weakly closer to $\phi$ than $\psi$ iff either: (a)

$(\|\psi'\|\wedge\|\phi\|) \subseteq (\|\psi\|\wedge\|\phi\|)$; or (b) $(\|\phi\|\wedge\|\psi'\|) \subseteq (\|\phi\|\wedge\|\psi\|)$. This requires only that either: (a) $\psi'$ falsifies some possible worlds satisfied by $\psi$ that are falsified by $\phi$; or (b) $\psi'$ satisfies some possible worlds falsified by $\psi$ that are satisfied by $\phi$. Unlike with symmetric difference, this allows the new formula to "overshoot" while adding or removing worlds from $\psi$ to more closely approximate $\phi$.

The following restrictions on syntactic moves will ensure that each move takes us closer to some bid formula in this weaker sense:

a literal l can be added to a term t iff there exists a bid formula $\phi^i$ containing a term t' such that $t'|\neq\neg\ t$ a literal l can be added as a new term iff there exists a bid formula $\phi^i$ containing a term t' such that l is contained in t'.

The other syntactic restrictions mentioned above can be applied (e.g., so cycles are not introduced). It is not hard to show that each move satisfies the weaker definition of closeness. Notice that it is not required that each move is closer to a fixed bid formula, just that each stage moves closer to some bid formula.

Although DNF can be a convenient form for manipulating logical formulae, unfortunately negation of a DNF formula can be computationally expensive (which is required for one side of the split $\alpha \wedge \overline{\beta}$). An alternative is to represent formula via binary-decision diagrams (BDDs), which can represent many formulae very compactly, and for which negation is computationally simple. For BDDs, consider a more restricted form of the formula search process, wherein the formula $\beta_j$ on which $\alpha_j$ is split is built up as follows. Denote $\text{Dom}(F^i)\backslash\{f_k^i\}$ as $\overline{f_k^i}$, i.e., the exclusion of the value k for attribute i (note that this definition generalizes to the case in which attributes have more than two values). First, consider each $\beta_j^1$ consisting of $\overline{f_k^i}$, for a single i and k. That is, at the first "level" consider splits that exclude one attribute-value and "commit" to a single attribute-value exclusion with the best score $\text{score}(\alpha_j, \beta_j^1, \overline{\beta_j^1})$. Then, consider refining $\beta_j^1$ by conjoining with some new $\overline{f_k^i}$ or disjoining with some new $f_k^i$ (conjoining tightens $\beta_j^1$, disjoining relaxes it). Each resulting $\beta_j^2$ is scored in a similar fashion, and a commitment is made to the $\beta_j^2$ with the highest score. This continues for m iterations, where m is either a fixed threshold or is determined dynamically by requiring a minimum score improvement be met. The best split of $\alpha_j$ is determined heuristically as $\langle \beta_j, \overline{\beta_j} \rangle$, where $\beta_j = \beta_j^m$.

This more restricted formula search can be realized without using BDDs, but with some other representation of the logical formulae corresponding to abstract channels.

Given a current abstraction A, the $\alpha_j \in A$ with the highest-scoring best split is adopted, creating a new abstraction A' with $\alpha_j$ replaced by $\alpha_j \wedge \beta_j$ and $\alpha_j \wedge \overline{\beta_j}$. The LP resulting from the new abstraction is solved, and the search for a best split repeated until the score of the best split of A falls below some threshold $\tau$.

Overall Refinement Process.

With reference to FIG. 3 the overall refinement process can be visualized as FIG. 3. Initially, start with a particular abstraction, or collection of channels, for instance, beginning with a fully abstract, single channel problem, and solve the LP corresponding to Abstraction 0. With the optimal solution in hand, arbitrary splits of this abstraction can now be scored. This information is used to guide the search process described in the previous section. Once the DNF (or BDD) formula-split tree is searched, a specific split of an existing channel is made. This leads to a refined Abstraction 1. The corresponding abstract LP, LP1, is then solved and the process repeats.

Notice that only one LP is solved per abstraction. The split-search requires no reoptimization.

Adding LP Constraints, LP Expressiveness, IP Expressiveness.

The model thus far can accommodate only budget and supply constraints. In principle, there is no problem accommodating other forms of constraints that don't involve integer variables. Of course, there is a significant question as to what types of constraints can and should actually be modeled this way. Supply constraints are obvious constraints, as are budget constraints. But many other forms of expressiveness are not most naturally modeled as constraints, but perhaps can be usefully approximated this way as long as they never force infeasibility. Specifically, are desirably formulated constraints (e.g., smoothness) in such a way that a trivial option exists to maintain feasibility (such as no assignment to a bid).

Forms of expressiveness that can be expressed using LP constraints can be introduced into the process using the same column generation process. Reduced cost calculations can be modified appropriately to handle constraints in addition to budget constraints.

Some forms of expressiveness are most naturally expressed using integer variables, thus requiring a MIP formulation. One limitation of the column generation model as proposed is its focus on LP expressiveness. One approach is to use MIP column generation (branch-and-price) techniques known in the art. However, recall that the abstraction process is used to create the set of abstract channels to be used in MIP optimization; i.e., the intended output of this process is a set of a-channels, not (necessarily) the allocation itself. Thus, given an allocation problem with IP expressiveness, column generation with a linear relaxation of the problem can be used to generate abstract channels. Once the abstract channels are constructed, the "original" MIP can then be solved using allocation to the abstract channels created, with appropriate discounting of impression values or count variables by the probability of a bid receiving a relevant impression within an a-channel. If the original problem uses only LP expressiveness, then the LP solution used to create the final refinement will be the optimal allocation and no re-solve is needed.

To illustrate this column generation approach for MIPs, consider using the column generation process described above is used to handle bonus (all-or-nothing) bids. A bonus bid requires an integer variable to denote whether its target has been met (and hence whether payment is to be made). This can be approximated in an LP as follows: replace each bonus bid by a simple item-price bid with a budget constraint (e.g., if k impressions of a are valued at d, all or nothing, replace with a per-item bid for a with value d/k per impression and a budget constraint of d). Record when each such approximated bid i has a significant influence on the choice of a split; this can be recognized by examining the contribution of the $x^i$ variable to the reduced cost computation for a split that has been acted on. With each LP solution (after each split), it is expected that the bid should get close to meeting its budget constraint. If it is close, there is good reason to believe that the IP based on the existing abstraction will assign it what it needs to meet its threshold (intuitively, the remaining supply needed has very high marginal value). However, if the bid is not "close" to its target, this suggests that its average value per impression is simply not competitive, and that the IP is unlikely to satisfy the bid. So any splits where bid i has had undue influence can be retracted. In this manner, channel capacity is not wasted trying to satisfy a bid that is unlikely to be satisfied in the final IP.

If there is a split that improves objective value (for an all-or-nothing bid) in the MIP, then there is a value-improving split in the LP as well. LP estimates of split values will be less than the MIP value in general.

Using Abstractions in Ad Auction Optimization.

To explore this column generation approach to channel abstraction, experiments were run with the column generation model on a collection of random problems, some with LP expressiveness only, others with IP expressiveness. The experiments were run on a computer with a 3.8 GHz Xeon CPU, 2 BM cache, and 16 GB RAM.

LP Expressiveness.

The first battery of problems involves bids that use only LP expressiveness; specifically, each bid has per-impression valuations for a particular set of attribute-values over a given time period, along with a total budget. Optimizations are performed over a time horizon of 30 periods. This battery includes multiple sets of problem instances, with each set characterized by two parameters: m binary attributes and n bidders. Sets of instances were run with n=10m for m∈{10, 20, 30, . . . , 100}.

Supply distribution. The probability of a unit of supply satisfying attribute-value $f_1^i$ is drawn from U[0,1]: since Dom($F^i$)={$f_1^i$, $f_2^i$}, then Pr($f_2^i$)=1−Pr($f_1^i$). The total supply of impressions, over all attribute-values, is 1,000,000 for each time period.

Bids. Each bid j has the form $\langle \phi^j, v^j, g^j, w^j \rangle$. Bid j cares about a set of attributes $A^j$, with size $|A^j|$~U[0,10]. The model embodies the assumption that bidders tend to have a lot of commonality with respect to the attributes they care about, so a bid's attributes are sampled from a Zipfian distribution, with the probability of choosing attribute $F^i$ being Pr($F^i$)=(1/i) ($\Sigma_{1 \leq k \leq m} 1/k$), without replacement. For a given attribute $F^i \in A^j$, the bid requires that impressions satisfy $f_{z_i}^i$, with $z_i \in \{1,2\}$ chosen uniformly at random. The bid's formula is then the conjunction of all required attributes, $\phi^j = \wedge_{F^i \in A^j} f_{z_i}^i$.

The bid valuation model reflects the intuition that bidders tend to place higher value on more specific bids (i.e., with more attributes), and higher value if the attributes in their bid formula (i.e., that they care about) are in greater demand. Bidder j's per impression value $v^j$ is determined as follows. First, draw a "base value" $\hat{v}^j$ from U[0.1,1] then adjust it to account for the aforementioned factors by setting $v^j = \hat{v}^j(1+ 10\Sigma_{F^i \in A^j} \text{Pr}(F^i))$. That is, if the bid cares about no attributes, then $v^j = \hat{v}_j$, whereas if were to care about all m attributes, then $v^j = 11\hat{v}_j$.

A bid's time window $w^j$ is chosen as follows. Select numbers $t_1$ and $t_2$ from U[−10, 40], set $w^j$=[min($t_1$,$t_2$), max($t_1$,$t_2$)], then truncate $w^j$ to be in [1, 30]. This incorporates the idea that some bids will have time windows that extend beyond the optimization horizon.

A bid's budget is set to a fraction of the value of the total supply that it cares about. Namely, if $\sigma_j$ is the total supply of formula $\phi^j$ during time window $w^j$, then the budget is $g^j = \tau^j \sigma_j$ with $\tau^j$~U[0.1,1].

In addition to the bids described above, an additional "market" bid is included with value 0.1, unlimited budget, and no attribute preferences (i.e., $\phi$=True). This is used to account for value that might be obtained from other sources (e.g., future bids or a spot market).

Optimization Parameters.

During an iteration of column generation, a search is made for a suitable split so long as a channel refinement can be found that provides a score that offers a certain minimum improvement over the previous abstraction. Parameter MI sets this target: if some refinement offers at least an MI fractional improvement over the allocation value of the most recent LP, the process continues; if there is no such refinement on any channel, column generation is terminated. Note that, even if there is no MI improvement, it does not necessarily mean the allocation value is within MI fraction of the true optimal value. Rather, it means there is no myopic improvement of at least MI that can be obtained within the restricted channel splitting space considered. Furthermore, it could be that some sequence of channel refinements could obtain a higher improvement. The restricted space of channel splits under consideration can obviously impact the ability to find a suitable refinement. Even without this restriction (i.e., even if splitting into arbitrary pairs of subsets is allowed), it can be shown that myopic splitting is insufficient in general when IP expressiveness is admitted. For certain forms of LP expressiveness, however, it can be shown that, if an abstraction is not lossless, there always exists a two-way split of some channel that improves value. Hence, a myopic search (over an unrestricted split space) is sufficient to find an optimal, lossless abstraction.

Estimating an Upper Bound on the Optimal Value.

To measure how good an allocation is, an estimate is needed of the true optimum value that could be achieved if all relevant columns are generated. An upper bound on the optimal is computed as follows. When column generation is complete, another optimization is run using undiscounted values. That is, remove all Pr($\phi^i | \alpha_j$) terms. This is clearly an upper bound on the optimum because it assumes that bids could actually make use of the entire amount of a channel it is allocated (rather than the only Pr($\phi^i | \alpha_j$) fraction it actually cares about for channel j). However, this is a very loose upper bound. It can be tightened by ensuring that a bid's allocation does not exceed the supply that it actually cares about. That is, additional constraints of the form $x_j^i \leq s(\phi^i \wedge \alpha_j)/s(\alpha_j)$ are added for all bids i and channels j. The allocation value obtained from this optimization is still an overestimate because it does not account for interactions between multiple bids. However, empirically, this upper bound is quite close to an even tighter upper bound that can be generated via constraint generation.

Experimental Results.

Table 1 shows results from runs with parameter MI=0.01, averaged over 20 instances for each $\langle$m, n$\rangle$ pair. The table shows several key measures including the number of a-channels generated. The fraction of the upper bound on the optimal value obtained by the abstract LP when column generation terminates ("Frac UB") is also shown (giving us a lower bound on the quality of the abstract allocation relative to the true optimal allocation). An estimate of the improvement in the degree of optimality is shown ("Improve"). This is reported as the average of (Final−Initial)/UB, where Final is the final LP value, Initial is the LP value at the start of column generation (when a single abstract channel is used), and UB is the upper bound on the optimal value. Finally, the average and range of runtimes is presented.

Table 2 shows similar results, but for runs with MI=0.001.

TABLE 1

Average results for column generation with LP expressiveness and MI = 0.01, m attributes, and n bidders.

| | | # | Frac | | Runtime (sec) | |
|---|---|---|---|---|---|---|
| m | n | channels | UB | Improve | μ | range |
| 10 | 100 | 12.0 | 0.893 | 0.447 | 12 | [4, 24] |
| 20 | 200 | 11.0 | 0.828 | 0.364 | 40 | [8, 74] |
| 30 | 300 | 10.2 | 0.841 | 0.380 | 75 | [35, 150] |
| 40 | 400 | 9.8 | 0.803 | 0.334 | 153 | [28, 556] |
| 50 | 500 | 10.0 | 0.816 | 0.396 | 212 | [23, 418] |

TABLE 1-continued

Average results for column generation with LP expressiveness and MI = 0.01, m attributes, and n bidders.

| m | n | # channels | Frac UB | Improve | Runtime (sec) μ | range |
|---|---|---|---|---|---|---|
| 60 | 600 | 8.6 | 0.827 | 0.343 | 245 | [33, 470] |
| 70 | 700 | 8.3 | 0.824 | 0.304 | 314 | [26, 656] |
| 80 | 800 | 9.2 | 0.824 | 0.345 | 461 | [101, 940] |
| 90 | 900 | 8.6 | 0.806 | 0.333 | 566 | [75, 1211] |
| 100 | 1000 | 9.3 | 0.804 | 0.344 | 811 | [203, 1438] |

TABLE 2

Average results for column generation with LP expressiveness, MI = 0.001, m attributes, and n bidders.

| m | n | # channels | Frac UB | Improve | Runtime (sec) μ | range |
|---|---|---|---|---|---|---|
| 10 | 100 | 32.4 | 0.965 | 0.515 | 53 | [10, 112] |
| 20 | 200 | 33.8 | 0.905 | 0.439 | 317 | [21, 758] |
| 30 | 300 | 27.1 | 0.899 | 0.438 | 538 | [112, 1384] |
| 40 | 400 | 28.6 | 0.871 | 0.399 | 1247 | [211, 4159] |
| 50 | 500 | 26.8 | 0.871 | 0.450 | 1543 | [153, 4027] |
| 60 | 600 | 22.7 | 0.877 | 0.392 | 1775 | [88, 4798] |
| 70 | 700 | 19.3 | 0.867 | 0.346 | 1959 | [66, 5878] |
| 80 | 800 | 24.2 | 0.873 | 0.393 | 3746 | [469, 8670] |
| 90 | 900 | 24.0 | 0.858 | 0.374 | 4956 | [807, 14534] |
| 100 | 1000 | 25.7 | 0.853 | 0.392 | 6687 | [1677, 17047] |

As can be seen, with LP expressiveness, column generation can obtain a significant fraction of the upper bound value for problems in which it would be impossible to even enumerate the full unabstracted LP. Setting a lower value for the minimum improvement parameter MI allows a greater fraction of the upper bound to be obtained, but with a fairly significant increase in run time. This suggests adopting a more sophisticated technique that occasionally computes an upper bound during the course of column generation (using the current set of channels), then weighs the additional potential improvement against the amount of time already spent.

Figure 4:
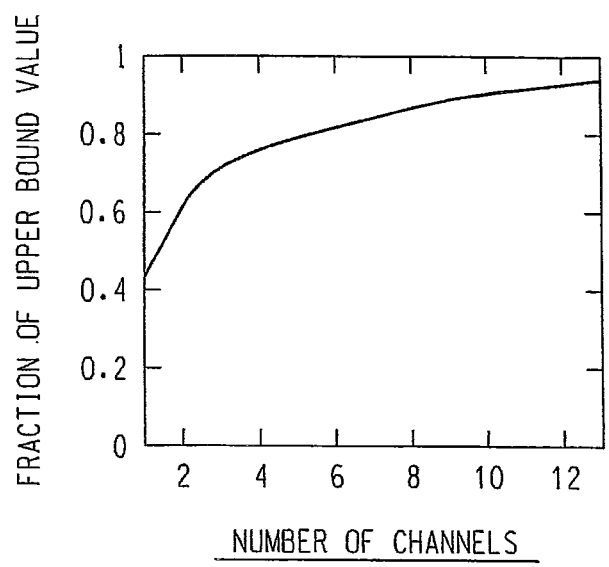
FIG. 4 is a graph showing the fraction of upper bound on optimal allocation value obtained after generation of a given number of abstract channels (abstract goods).

Fortunately, although the number of potential channels increases exponentially in m and n, the column generation procedure described herein can obtain high value with very few channels. Indeed, the number of generated channels, and the resulting quality of solution, are comparable across all m and n tested. Furthermore, on average, much of the improvement is obtained early in the procedure. FIG. 4 shows the fraction of upper bound obtained after a given number of channels has been generated, averaged over 20 instances, with m=10, n=20, and MI=0.001. A high fraction of the upper bound was obtained from the first few channels generated, with additional channel splitting providing more modest improvement.

IP Expressiveness.

The second battery of problems include some bidders with all-or-nothing bonus bids, in addition to bidders with only per-impression values and budgets. Note that all-or nothing bids require binary variables, hence the LP relaxation of the column generation procedure will be only an approximation.

All problems had 100 attributes, $n_b$ bonus bidders, and $n_i=4n_b$ per-impression bidders, with $n_b=\{10, 20, \ldots, 60\}$. The preferences of per-impression bidders is determined as before. A bonus bidder had $\phi^j$ and $w^j$ chosen similarly. However, its per-impression value is $v^j=0$, and instead the bidder is willing to pay $b^j$ if he receives at least $q^j$ impressions satisfying $\phi^j$, but zero otherwise. $q^j$ is selected to be a fraction $\tau^j$ of the total supply the bid cares about, namely, $q^j=\tau^j\sigma_j$, with $\tau^j \sim U[0.1,1]$, and $\sigma_j$ the total supply of formula $\phi^j$ during time window $w^j$. Then, set $b^j=\hat{b}^j q^j$ where $\hat{b}^j$ is chosen as for a flat bidder, but then multiplied by a factor chosen from U[0.1,1]. Also included is a "market" bid as described above.

Table 3 shows results with MI=0.01, averaged over 20 instances from each $\langle n_b, n_i \rangle$ pair. Shown are the number number of channels generated, the fraction of the upper bound (on the optimum) obtained by when column generation terminates ("Frac UB"), the improvement over the fraction of the upper bound obtained before column generation ("Improve"), and the range of runtimes over the 20 instances. For these instances, although LP relaxation is used to determine which channels to split, MIPs are run to determine the abstract allocation value (hence fraction of the upper bound) obtained before column generation and at the end of column generation.

TABLE 3

Average results for column generation with IP expressiveness, MI = 0.01, 100 attributes, $n_b$ bonus bidders, and $n_i$ per-impression bidders.

| $n_b$ | $n_i$ | # channels | Frac UB | Improve | Runtime (sec) μ | range |
|---|---|---|---|---|---|---|
| 10 | 40 | 6.6 | 0.847 | 0.248 | 41 | [5, 82] |
| 20 | 80 | 6.6 | 0.815 | 0.252 | 66 | [15, 129] |
| 30 | 120 | 7.0 | 0.769 | 0.264 | 91 | [14, 205] |
| 40 | 160 | 8.5 | 0.790 | 0.296 | 153 | [31, 282] |
| 50 | 200 | 8.8 | 0.823 | 0.325 | 188 | [39, 613] |
| 60 | 240 | 6.8 | 0.814 | 0.289 | 92 | [5, 325] |

Although column generation operates on a relaxation of the true IP, the scoring function is nevertheless effective in guiding the procedure to good channel splits. Indeed, the performance with IP expressiveness compares favorably to that with LP expressiveness. It is emphasized that these campaign-level optimizations are run offline, and used to parameterize dispatch policies that are then implemented in real time. Thus the times reported here allow frequent, multiple optimizations (and reoptimization) of offline allocations.

Overall Architecture and Other Considerations.

The following details the potential use of abstract channels created by the column generation approach (or by any other approach) in a fully integrated optimization-based advertising system.

Overall architecture: it is envisioned using the LP-column generation approach to provide a core abstraction that will be refined as specific bids are received. More precisely, statistical summaries could be used to produce a set of prototypical bids and/or demand profiles from which a concrete abstraction is generated. However, this abstraction will not use up all channel capacity. By this is meant: suppose that IP optimization problems can be solved with up to k channels in the online setting; then the offline abstraction will include m channels, with m<k. At optimization time, the actual set of bids active at that time will be used to refine the core abstraction, refining channels in a way that accommodates the specific bids that need to be optimized in the IP. This refinement process could involve the same column generation algorithm, or it could be quite different (e.g., by dealing directly with IP expressiveness). The key is that, with judicious choice of the prototypical bids used to generate the core abstraction, (hopefully) very few refinements will be needed to adjust the abstraction to the current set of bids. There are many refinements on this high-level idea too (e.g., focusing only on high-level bids), solving the core abstraction using only the simplest item-price and demand distributions for all combinations of attributes, etc.

There needn't be a single core abstraction: there could be different core abstractions for different parts of the day, reflecting the fact that demand and supply are likely to be highly variable. Accordingly, the use of day-part, day-of-week, seasonal, or other core abstractions is envisioned.

Suppose T is the optimization time interval (i.e., assignments to channels are considered over the course of a day, and optimize over some number of periods (i.e., days)). Bids distinguishing subperiods of the default period are treated as any other attribute, e.g., day-parts would simply be attributes that could be used to define channels like gender.

Defining a suitable set of attributes is important. Especially important is how ordered (discrete or continuous) variables are treated. If many bids care about golfers of a certain age, then it is not necessarily desirable to split on all possible ages. Instead, the process could take a "data-driven" approach much like in decision tree induction. If some bids want age 25-45 and other bids want age 35-60, the ages could be aggregated into three intervals: 25-35, 35-45, 45-60.

Lossless Abstraction.

To create abstractions using full MIP expressiveness in such a way that no loss in objective value (e.g., revenue) occurs, the following process is used with a sequence LP solves.

Full Attribute Expansion.

Assume that there are n distinct binary attributes that have been specified in bids (although the algorithms in no way rely on attributes being binary). To correctly encode this in a MIP, every bid in the ad auction language will expand to up to $2^n$ binary variables. The degree of expansion will be greater for less specific bids. Additionally, up to $2^n$ binary variables will be needed to encode the supply constraints.

As an example, consider attributes for gender and age. Gender can be male (m) or female ($\bar{m}$), age can be young (y) or old ($\bar{y}$). Denote a bid by x(gender, age), where "don't care" is specified by $\perp$. One advertiser bids for males, $x^1$ (m,$\perp$,$\perp$), the second bids for young people, $x^2$ ($\perp$, y,$\perp$), and the third bids for everything, $x^3$($\perp$,$\perp$). The bids expand into MIP variables as follows:

$x^1(m,\perp):x^1(m,\bar{y}),x^1(m,y)$ $x^2(\perp,y):x^2(\bar{m},y),x^2(m,y)$ $x^3(\perp,\perp):x^3(\bar{m},\bar{y}),x^3(\bar{m},y),x^3(m,\bar{y}),x^3(m,y)$ Letting s(gender, age) be the quantity of a channel available, the following constraints are needed:

$x^3(\bar{m},\bar{y}) \leq s(\bar{m},\bar{y})$ $x^2(\bar{m},y)+x^3(\bar{m},y) \leq s(\bar{m},y)$ $x^1(m,\bar{y})+x^3(m,\bar{y}) \leq s(m,\bar{y})$ $x^1(m,y)+x^2(m,y)+x^3(m,y) \leq s(m,y)$ Attributes can result in an optimization problem that is too large to solve. If there are enough attributes, it may even be too large to represent. One way to deal with this is through attribute abstraction, that is by ignoring some of the attributes during optimization, as described above.

Dispatching with Attribute Abstraction.

If the optimization is solved with abstracted channels, there is an issue of how to dispatch. An intelligent dispatch would consider attributes specified in a bid, even if some of those attributes were ignored during optimization.

Consider the simple example with above with three bids. Assume the optimizer determines fractional allocations for undifferentiated supply. Assume these are: $x^1$=0.6, $x^2$=0.3, and $x^3$=0.1. The problem is that this allocation, while feasible in the abstracted space, is not feasible in the non-abstracted space.

How should this allocation be translated differentiated supply for dispatch? One simple, but unsatisfactory, approach would be to first determine dispatch eligibility (based on all attributes), then rescale the probabilities accordingly. For instance, if a young male arrived, then $x^2$ and $x^3$ would be eligible and the probabilities would be scaled by 0.4, giving $x^2$=0.3/0.4 and $x^3$=0.1/0.4. If an old female arrived, then $x_1$ and $x_3$ would be eligible, the probabilities would be scaled by 0.7. This approach can lead to realized allocation that differs quite a bit from the one computed by the optimizer, even in a deterministic setting. Assume that the attribute-specific supplies are as follows (expressed as fractions of the undifferentiated supply): $s(\bar{m},\bar{y})$=0.1, $s(\bar{m},y)$=0.1, $s(m,\bar{y})$=0.7, $s(m,y)$=0.1. In this case, advertiser 3 will get all of the old male supply, plus some of the other supplies, which will amount to significantly more than the 0.1 fraction of the overall supply specified by the optimizer. On the other hand, advertiser 1 will get significantly less than the 0.6 fraction of the overall supply specified by the optimizer because 1) the fraction of females is only 0.2 of the overall supply, and 2) advertisers 2 and 3 will get some of the female supply.

The optimization using the abstraction generated by the above-described column generation process assumes that any ad allocated to an a-channel $\alpha$ will be randomly dispatched to the component c-channels that make up $\alpha$. This is reflected in the MIP (or LP) objective function by replacing the per-impression value $v^i$ that bid i has by $v_\alpha^i \Pr(\phi^i|\alpha)$. With a well-crafted abstraction, this may be sufficient to produce an optimal allocation (e.g., consuming as much of each advertiser's budget as possible). However, if the number of a-channels is limited for computational reasons, the "pessimistic" assumption of random dispatch may leave revenue on the table.

Allocating with Abstract Channels

Another means of optimizing with abstract channels that relies on constraint generation in the abstract MIP (or LP) to allocate the supply of abstract channels to bids non-uniformly, thus improving the revenue generated by ad allocation will now be described.

Let A be a channel abstraction and M the optimistic MIP in which bids are assigned to abstract channels, but in which each impression to a bid i is assumed to satisfy the bid formula $\phi_i$. This assumption is embodied by replacing the per-impression value $v_\alpha^i$ for a-channel $\alpha$ by $v^i$ itself: in other words, assume that every ad i assigned to $\alpha$ will be dispatched intelligently, thus guaranteeing that $\phi^i$ is satisfied. In a simple two-bid, two a-channel example, the resulting MIP (in this case, LP) would be:

$$\text{Max } v^1 x_{\alpha_1}^1 + v^2 x_{\alpha_1}^2 + v^1 x_{\alpha_2}^1 + v^2 x_{\alpha_2}^2 \leq s(\alpha_1)$$

$$\text{s.t. } x_{\alpha_1}^1 + x_{\alpha_1}^2, x_{\alpha_2}^1 + x_{\alpha_2}^2 \leq s(\alpha_2)$$

The optimistic assumption embodied in this formulation is, of course, unreasonable in general. There is no reason to believe, for example, that the allocation of bids to $\alpha_1$ permits feasible "packing" of their promised supply in such a way that each bid i gets only $\phi^i$-impressions. However, this assumption can be tested by solving an LP that determines whether there is enough supply to do just this: this example strives to determine if $\alpha_1$ contains enough $\phi^1$ and $\phi^2$ supply to meet the "obligations" contained in the solution of the optimistic MIP. Test a-channel $\phi_2$ can be similarly tested.

Constraint Generation.

Next, a constraint generation approach is described wherein bids are kept in an abstracted form and multiple optimizations solved, each time adding constraints to correct infeasibilities when dispatching in the non-abstracted space. The high-level algorithm is as follows:

1. Solve the abstracted optimistic MIP.
2. Solve an LP to determine a dispatch policy in the non-abstracted space.
3. If the LP in Step #2 feasible, the process is done. Otherwise, generate a set of mutually unsatisfiable constraints. From these, generate new constraints for the MIP in Step #1 and then resolve.

Dispatch LP.

Let et $\dot{x}=\{\dot{x}_{\alpha_j}^i\}$ be the solution of the optimistic MIP (Step 1) with a-channels $\{\alpha_j\}$. Let $W(j)=\{i:\dot{x}_{\alpha_j}^i>0\}$ denote the "winners" of a-channel $\alpha_j$. Thus, solve the following LP for each $\alpha_j$ (with a constant objective, since the aim is only to determine feasibility):

$$\max 1 \quad (2)$$

$$\text{s.t.} \sum_{c\in\alpha_j, cl=\varphi^i} x_c^i = \dot{x}_{\alpha_j}^i$$

$$\forall\, i \in W(j)(1)$$

$$\sum_{i\in W(j)} x_c^i \leq s(c)$$

$$\forall\, c \in \alpha_j$$

This LP determines a feasible allocation of bids i that share $\alpha_j$ to the c-channels that constitute $\alpha_j$, thus guaranteeing that every impression given to i satisfies its bid condition $\phi^i$. The first set of constraints ensures there is enough $\phi^i$ supply for each bid i—call these bid adequacy constraints—while the second establishes that no constituent c-channel is overallocated—call these channel supply constraints. There is no objective function, because the goal is to only determine feasibility.

If the LP gives a feasible solution, the dispatch policy is defined. If not, additional constraints are generated for the MIP. Before describing this procedure, the nature of these constraints will be described.

Computationally, the most demanding aspect of this algorithm is the solution of the LPs used to generate constraints. While the solution of $LP(\alpha_j)$ could, in principle, require an exponential number of variables (i.e., the $x_c^i$ corresponding to all c-channels $c\in\alpha_j$) and constraints, the use of simple lossless channel abstraction collapses this number. As such, the number of winners for each channel (and the interaction of their bids) determines the true complexity of the required LP solves. The interaction is in fact even less when one accounts for time windows: a separate feasibility testing/generation process is invoked for each a-channel, time-period pair.

The constraint generation algorithm can be used directly to solve the ad allocation MIP without relying on column generation. For example, it can be applied directly to the fully abstract MIP with a single a-channel (T). It could also be used to optimize over any heuristically chosen abstraction, using a process other than column generation.

Projection into the Abstracted Space.

By adding additional supply constraints to the abstract MIP, it can be transformed into a projection of the non-abstracted problem, ensuring that any solution to the abstract MIP is a feasible in the non-abstracted space. Herein, two bids (i,i') overlap on an abstract channel $\alpha_j$ if there is a c-channel $c\in\alpha_j$ where $cl=\phi^i$ and $cl=\phi^{i'}$. Also, a set of bids B is connected on $\alpha_j$ if, for any pair of bids (i, i') in B there is a sequence of bids (i=$b^1$, $b^2$, ..., $b^n$=i') in B such that every $b^k$ and $b^{k+1}$ overlap on $\alpha_j$. For all abstract channels $\alpha_j$ where all sets of bids B are connected on $\alpha_j$ add the following constraint:

$$\sum_{i\in B} x_i \leq \sum_{c\in\alpha_j, cl=\varphi^i, i\in B} s(c) \quad (3)$$

Adding all such constraints makes the MIP a projection of the non-abstracted space.

In the worst case, this will require $2^m-1$ constraints, where m is the number of bids. Alternatively, the total number of constraints can be bounded by $2^{2^n}$, where n is the number of binary attributes. This can be seen by observing that some of the constraints in Eq. (3) are dominated. In particular, $\Sigma_{i\in B}x^i+\Sigma_{k\in B}x^i\leq s$ dominates (and hence is tighter than) $\Sigma_{i\in B}x^i\leq s$, for some s. Thus, at most one constraint needs generated for each subset of the set attribute-value assignments a, giving at most $2^{2^n}$ constraints.

To see how the projection works, consider the example from the above section entitled "Full Attribute Expansion". If a full abstraction is performed (eliminate all attributes), then the bids are $x_1$, $x_2$, and $x_3$. All of the bids overlap. The complete set of constraints (including dominated) are:

$$x^1 \leq s(m,\bar{y})+s(m,y) \quad (4)$$

$$x^2 \leq s(\bar{m},y)+s(m,y) \quad (5)$$

$$x^3 \leq s(\bar{m},\bar{y})+s(\bar{m},y)+s(m,\bar{y})+s(m,y) \quad (6)$$

$$x^1+x^2 \leq s(m,\bar{y})+s(\bar{m},y)+s(m,y) \quad (7)$$

$$x^1+x^3 \leq s(\bar{m},\bar{y})+s(\bar{m},y)+s(m,\bar{y})+s(m,y) \quad (8)$$

$$x^2+x^3 \leq s(\bar{m},\bar{y})+s(\bar{m},y)+s(m,\bar{y})+s(m,y) \quad (9)$$

$$x^1+x^2+x^3 \leq s(\bar{m},\bar{y})+s(\bar{m},y)+s(m,\bar{y})+s(m,y) \quad (10)$$

Only constraints (4), (5), (6), and (10) are undominated. The four undominated constraints are less than the $2^{2^n}=16$ upper bound because constraints are not needed for all subsets of the s's (for instance, a constraint is not needed for s(m,y) alone because there are no bids for (m,y) only). Nevertheless, in general the full set of projection constraints will be far too many to enumerate. Instead, the LP is used to generate only the violated constraints, because it is believed that far fewer than the entire set of constraints are needed.

Generating New Constraints.

If $LP(\alpha_j)$ is feasible for each $\alpha_j$, then it provides an optimal dispatch policy that extracts the full objective value of the optimistic MIP. If not, then constraints are posted on the solution of the optimistic MIP and resolve. In particular, let $LP(\alpha_j)$ be infeasible. Then there must be some minimal set of constraints that are jointly infeasible. Let $S=S_a \cup S_s$ be such a minimal set, where $S_a$ are bid adequacy constraints (1) and $S_s$ are channel supply constraints (2). The solution of the optimistic MIP violates the inequality:

$$\sum_{i \in S_a} x_{\alpha_j}^i \leq \sum_{c \in S_s} s(c) \qquad (11)$$

The MIT can be resolved by posting this constraint to ensure that overallocation of the channels in $S_s$ does not occur for the purposes of maximizing value extracted from bids in $S_a$. A tighter version of this constraint can be employed by adding to the sum on the lefthand side any bid i all of those relevant channels included in $S_s$, i.e., any i s.t. $\{c \in \alpha_j : c | = \phi^i\} \subseteq S_s$. Note that while all minimal sets S will induce a violated constraint, other sets S may also induce violated constraints.

At each iteration, sets S leading to violated constraints are identified for each a-channel and posted. These can be identified using the facilities of standard solvers, such as the CPLEX IIS (irreducible inconsistent set) routine run on a computer, like the computer shown in FIG. 1. The MIP is resolved until feasibility is attained (in which case full optimistic objective value is obtained), or computational or time bounds are reached.

Equation 11 is a violated constraint if it is determined by the CPLEX IIS routine. First, it is shown that $\Sigma_{i \in S_a} x_{\alpha_j}^i \leq \Sigma_{c \in S_s} s(c)$ is a projection constraint (3) for the MIP. This has two requirements: 1) the bids $S_a$ are connected on $\alpha_j$, and 2) $\Sigma_{c|=\phi^i, i \in S_a, c \in \alpha_j} s(c) = \Sigma_{c \in S_s} s(c)$. Consider requirement 1. Assume there are two subsets $S_a^1$ and $S_a^2$ of $S_a$ that are not connected. It must be that none of the constraints in $S_s$ include a bid from both $S_a^1$ and $S_a^2$. But then it cannot be the case that the constraints on $S_a^1$ are fully independent of the constraints on $S_a^2$, which violates a condition of the CPLEX IIS routine. Now consider requirement 2. Note that the LP constraints of type (1) alone cannot cause infeasibility. In particular, if a constraint for $x_i$ is in $S_a$, then all constraints of type (2) corresponding to $x_i$ must appear in $S_s$. It immediately follows that $\Sigma_{c|=\phi^i, i \in S_a, c \in \alpha_j} s(c) = \Sigma_{c \in S_s} s(c)$.

Next it can be shown that $\Sigma_{i \in S_a} x_{\alpha_j}^i \leq \Sigma_{c|=\phi^i, i \in S_a, c \in \alpha_j} s(c) = \Sigma_{c \in S_s} s(c)$ is violated in the MIP. The constraints in $S_s$ may contain some variables that are not in $S_a$. Denote as $S'_s$ the constraints $S_s$ but with the variables not in $S_a$ removed. It must be that $S_a \cup S'_b$ constitutes an irreducible inconsistent set (IIS), because if the removed variables were required to have an IIS, the original IIS would include constraints in $S_a$ containing those variables. Summing the constraints in $S'_s$, procedures $\Sigma_{i \in S_a} \Sigma_{c|=\phi^i} x_c^i \leq \Sigma_{c \in S_s} s(c)$. But since $\Sigma_{c|=\phi^i} x_c^i = \dot{x}_{\alpha_j}^i$ is in $S_a$, and since $S_a$ and $S'_s$ are mutually unsatisfiable, it must be that $\Sigma_{i \in S_a} x_{\alpha_j}^i > \Sigma_{c \in S_s} s(c)$. Hence, $\Sigma_{i \in S_a} x_{\alpha_j}^i \leq \Sigma_{c \in S_s} s(c)$ is violated for allocation $\dot{x}$, which is the wanted proof.

Alternatively a special purpose algorithm can be used to identify violated constraints.

In general, Equation 11 may be tightened. Let $C_i = \{c | = \phi^i | c \in \alpha_j\}$. If there is some bid $i \notin S_a$ such that $C_i \subseteq S_c$, then $x_{\alpha_j}^i$ can be added to the left hand side of the constraint to make it tighter. Thus, instead of Equation 11, add the constraint $$\sum_{i | C_i \subseteq S_c} x_{\alpha_j}^j \leq \sum_{c \in S_s} s(c) \qquad (12)$$

to the MIP then go back to Step #1 of the constraint generation procedure.

Example of the Constraint Generation Procedure.

Consider three bids from above: $x^1(m, \perp)$, $x^2 (\perp, y)$ and $x^3(\perp, \perp)$. Assume that the non-abstract channel supply is $s(\overline{m}, \overline{y}) = s(\overline{m}, y) = s(m, \overline{y}) = s(m, y) = 25$ In Step #1, a MIP is specified with a single abstract channel, so the only channel supply constraint is $$x^1 + x^2 + x^3 \leq 100 \qquad (13)$$

If the MIP allocation is $(\dot{x}^1, \dot{x}^2, \dot{x}^3) = (50, 50, 0)$, then in Step #2, an LP is specified with the following constraints:

$$x^1(m, \overline{y}) + x^1(m, y) = 50 \qquad (14)$$

$$x^2(\overline{m}, \overline{y}) + x^2(m, y) = 50 \qquad (15)$$

$$x^3(\overline{m}, \overline{y}) + x^3(\overline{m}, y) + x^3(m, \overline{y}) + x^3(m, y) = 0 \qquad (16)$$

$$x^3(\overline{m}, \overline{y}) \leq 25 \qquad (17)$$

$$x^2(\overline{m}, y) + x^3(\overline{m}, y) \leq 25 \qquad (18)$$

$$x^1(m, \overline{y}) + x^3(m, \overline{y}) \leq 25 \qquad (19)$$

$$x^1(m, y) + x^2(m, y) + x^3(m, y) \leq 25 \qquad (20)$$

The LP is infeasible, and the IIS is $\{(14), (15), (18), (19), (20)\}$. Therefore, the constraint $$x^1 + x^2 \leq 75$$

is added to the MIP and the MIP is resolved. If the next Step #1 MIP allocation is $(75, 0, 25)$, then the Step #2 LP is:

$$x^1(m, \overline{y}) + x^1(m, y) = 75 \qquad (21)$$

$$x^2(\overline{m}, y) + x^2(m, y) = 0 \qquad (22)$$

$$x^3(\overline{m}, \overline{y}) + x^3(\overline{m}, y) + x^3(m, \overline{y}) + x^3(m, y) = 25 \qquad (23)$$

$$x^3(\overline{m}, \overline{y}) \leq 25 \qquad (24)$$

$$x^2(\overline{m}, y) + x^3(\overline{m}, y) \leq 25 \qquad (25)$$

$$x^1(m, \overline{y}) + x^3(m, \overline{y}) \leq 25 \qquad (26)$$

$$x^1(m, y) + x^2(m, y) + x^3(m, y) \leq 25 \qquad (27)$$

This LP is infeasible, and the IIS is $\{(21), (26), (27)\}$. Therefore, add the constraint $$x^1 \leq 50 \qquad (28)$$

to the MIP and resolve. If the next Step #1 MIP allocation is $(50, 25, 25)$ then the Step #2 LP is:

$$x^1(\overline{m}, y) + x^1(m, y) = 75$$

$$x^2(\overline{m}, y) + x^2(m, y) = 0$$

$$x^3(\overline{m}, \overline{y}) + x^3(\overline{m}, y) + x^3(m, \overline{y}) + x^3(m, y) = 25$$

$$x^3(\overline{m}, \overline{y}) \leq 25$$

$$x^2(\overline{m}, y) + x^3(\overline{m}, y) \leq 25$$

$$x^1(m, \overline{y}) + x^3(m, \overline{y}) \leq 25$$

$$x^1(m, y) + x^2(m, y) + x^3(m, y) \leq 25$$

A feasible solution to this LP is $x^1(m, \overline{y}) = x^1(m, y) = x^3(\overline{m}, \overline{y}) = 25$, $x^2(\overline{m}, y) = x^3(\overline{m}, y) = x^3(m, \overline{y}) = x^3(m, y) = 0$.

In this example, the initial Step #1 MIP started with only one supply constraint (13) based only on supply in the abstract space. A larger subset of the constraints (3) could have been chosen with the desire of reducing the number of MIP and LP solves. One set that would be natural to include in the initial MIP contain those involving a single bid variable:

$$x^i \leq \sum_{c|=\varphi^i} s(c).$$

In this example, including these constraints would have obviated the generation of the second constraint (28).

Early Termination.

The constraint generation procedure is guaranteed to terminate because every infeasible Step #2 LP implies a violated projection constraint (3), and there are a finite number of such constraints. However, undesirably a very large number of these constraints could be generated. If the process takes too long, the process may need to be terminated before a feasible LP is found. In this case, a relaxed LP can be used to determine a dispatch policy that is feasible in the non-abstracted space. This relaxed LP keeps the supply constraints (2) from the original LP but relaxes the MIP consistency constraints (1) as follows:

$$\forall x^i_{\alpha_j} \in x, \sum_{c \in \alpha, c|=\varphi^i} x^i_{\alpha_j} - \varepsilon^i = \hat{x}^i_{\alpha_j} \quad (29)$$

$$\varepsilon^i \geq 0. \quad (30)$$

In general, the solution to the relaxed LP will be suboptimal with respect to the Step #1 MIP with the generated constraints. One attempt to bound the value loss is to add the objective function $$\text{Minimize} \Sigma \varepsilon^i \quad (31)$$

Alternatively, a value $p^i$ could be determined on the bids $x^i$ (accounting for per-impression value, the effective per-impression value arising from bonuses, etc.) and, rather than using constraints (29) and (30), replace the MIP consistency constraints (1) with $$\sum_{c \in \alpha_j, c|=\varphi^i} x^i_c \leq \hat{x}^i_{\alpha_j}$$

and use the objective function $$\text{Maximize} \sum_i p^i x^i.$$

If a time limit is imposed on the overall optimization, and if it is not expensive to compute the original LP or one of the relaxed LPs above, the following revised constraint generation procedure may improve the quality of the solution:
1. Initialize the best allocation x* to 0.
2. Solve the abstracted MIP.
3. Attempt to solve the LP defined by constraints (1) and (2). If this is feasible, set x* to the feasible allocation and terminate. If not, generate a violated constraint and add it to the MIP.
4. Solve one of the relaxed LPs described above. Compute the value of the allocation using all bid preferences. If the value is greater than x*, set x* to the new allocation.
5. If the time limit has been exceeded, terminate. Otherwise repeat steps 2-5.

When this revised constraint generation procedure terminates, x* will have the best feasible allocation that has been generated.

Empirical Results.

To evaluate the effectiveness of constraint generation, the results of experiments on problems with bonus and per-impression bidders described above are presented. First, perform column generation, using MI=0.01 as the stopping condition, then extend with constraint generation.

To avoid generating an unreasonable number of constraints, allow a tolerance $\in$, whereby the feasibility LP allows the allocations from the MIP to decrease by up to $\in$. That is, replace the first set of constraints in the LP by:

$$\sum_{c \in \alpha_j, c|=\varphi^i} x^i_c \leq \hat{x}^i_{\alpha_j}$$

$$\forall i \in W(j)$$

$$\sum_{c \in \alpha_j, c|=\varphi^i} x^i_c \geq \hat{x}^i_{\alpha_j} - \varepsilon$$

$$\forall i \in W(j)$$

Thus, when constraint generation terminates, the allocation is guaranteed to be feasible, but may be suboptimal. In the experiments, $\in$=0.01 was chosen, however, this is not to be construed as limiting the invention.

For larger problems, constraint generation did not always terminate within a reasonable amount of time. In the experiments, if constraint generation did not terminate within 600 seconds, the generation of constraints was stopped and a feasible allocation that minimized the maximum difference from the MIP allocation was generated. This was accomplished with the following LP:

$$\min \varepsilon$$

$$\sum_{c \in \alpha_j, c|=\varphi^i} x^i_c \leq \hat{x}^i_{\alpha_j}$$

$$\forall i \in W(j)$$

$$\sum_{c \in \alpha_j, c|=\varphi^i} x^i_c \geq \hat{x}^i_{\alpha_j} - \varepsilon$$

$$\forall i \in W(j)$$

$$\sum_{i \in W(j)} x^i_c \leq s(c)$$

$$\forall c \in \alpha_j$$

As discussed above, the feasibility LP could require an exponential number of variables. In practice, if W(j) is no greater than around 20, the size of the LP is quite reasonable (and much smaller than $2^{20}$). If at any point the MIP gives W(j)>20, the channel $\alpha_j$ is split. However, rather than using the scoring function discussed above, the score($\alpha, \beta, \bar{\beta}$)=max({|{i}|:$\beta$|=$\varphi^i$}, {|{i}|:$\bar{\beta}$|=$\varphi^i$}) is minimized in an attempt to reduce the maximum, over the two new channels, of the bids that care about the channel.

When constraint generation is complete, the value of the allocation is computed based on the final feasible allocation generated by the LP (which might be different than that of the final MIP allocation, due to ∈), but the final (infeasible) MIP allocation is used as an upper bound on the true optimum value. This bound is close to, but somewhat tighter than the bound generated above in the section entitled "Constraint Generation".

Table 4 shows the results of experiments on the set of problems with bonus and per-unit bidders described above in the section entitled "Projection Into the Abstracted Space. Here, the results are shown only for the constraint generation portion. The table shows several key measures, including the number of constraint generation iterations, the number of additional channels generated and the number of constraints generated. The fraction of the upper bound on the optimal value obtained by the MIP when constraint generation terminates ("Frac UB") is also shown. An estimate of the improvement in the degree of optimality over the final column generation value is shown ("Improve"). Finally, the average and range of runtimes is presented.

TABLE 4

Average results for column generation followed by constraint generation with 100 attributes, $n_b$ bonus bidders, and $n_i$ per-impression bidders.

| | | # | # | # | Frac | | Runtime (sec) | |
|---|---|---|---|---|---|---|---|---|
| $n_b$ | $n_i$ | iterations | channels | constraints | UB | Improve | μ | range |
| 10 | 40 | 12.7 | 0.1 | 221 | .954 | 0.104 | 154 | [14, 615] |
| 20 | 80 | 12.1 | 2.3 | 557 | 0.939 | 0.118 | 636 | [118, 1178] |
| 30 | 120 | 9.1 | 4.4 | 750 | 0.965 | 0.190 | 850 | [317, 1750] |
| 40 | 160 | 5.9 | 7.5 | 787 | 0.954 | 0.157 | 1434 | [648, 6609] |
| 50 | 200 | 5.6 | 8.0 | 721 | 0.967 | 0.139 | 1419 | [679, 6235] |
| 60 | 240 | 8.4 | 7.6 | 803 | 0.964 | 0.143 | 1029 | [635, 2269] |

It can be seen that the additional phase increased the value to a high degree of optimality, although obtaining the improvement can be time consuming for larger problems.

Other Uses of Constraint Generation.

One of the bottlenecks in the effective use of constraint generation is its tendency to scale poorly in the number of "winners". Specifically, if an a-channel, time-period pair has a large number of bids that are allocated to it in the initial abstract MIP solve, the procedure can generate hundreds of thousands of constraints, causing the MIP to slow down significantly and to dominate runtime. As mentioned above, the number of winners in the MIP can be used to suggest further channel refinements. The development of effective channel splitting heuristics that attempt to "separate" bids into different channels could make constraint generation much more effective. This quick identification of problematic a-channels during constraint generation is critical as well: whenever a channel is split, all the constraints on the split channel must be discarded, and new constraints must be generated on the new channels, further extending runtime with wasted computational effort. Thus problematic a-channels should desirably be identified and discarded before significant constraint generation takes place.

Constraint generation can also be used selectively. The MIP can be solved by using the "optimistic" values on some channel-time pairs—requiring constraint generation to effectively carve up supply with those segments—while the random dispatch policy can be assumed in others (e.g., those where constraint generation cannot scale effectively). This offers a tractable means for improving on the abstract allocation problem without necessarily accounting for intelligent dispatch across the entire space.

Very Large Attribute Spaces.

The constraint generation approach relies on the assumption that it is tractable to solve an LP on the non-abstracted space. If this is not feasible, it will be necessary to fully abstract some attributes, i.e., not resolve them in the LP. This will lead to the dispatch issues described above. However, heuristics can be used to decide which abstraction might limit the degree of dispatch error.

Data Representation and Other Issues.

The implementation and practical deployment of the foregoing techniques brings to light a number of subsidiary issues that need to be addressed. Some of the more significant challenges to practical deployment and they are addressed will now be described.

Data Representation.

The foregoing approach to channel abstraction requires manipulation of logical formulae describing both abstract channels and bids. Furthermore, the natural and compact description of both bids/campaigns and channel supply requires the use of logical formulae. In problems with dozens or hundreds of channel attributes, supply distributions cannot be expected to be explicitly articulated for each concrete channel. Nor should bidders be expected to specify their interests explicitly over such concrete channels.

The foregoing data distributions make specific independence assumptions that allow them to be represented tractably. While more general models can be used (e.g., graphical models of distributions such as Bayesian networks), the following simple clustering model is adopted. The channel attribute set F is partitioned into a set $H=\{H_i\}$ of subsets or factors, and it is assumed an explicit joint distribution (or potential) $\psi_i$ is provided for each factor $H_i$ (e.g., if $H_i=\{A,B,C\}$, then $\psi_i$ is a joint distribution over Dom(A,B,C)). These potentials are independent, so the probability of any channel is $Pr(c)=\Sigma_i \psi_i(c[i])$, where c[i] is the restriction of c-channel c to its attribute values in $H_i$. The supply s(c,t) of any channel at time t is then s(c,t)=s(t) Pr(c). If impression distributions are nonstationary, the potentials can be indexed by time, or by time "attributes" such as day-part or week-part. Note that the assumption of complete attribute independence is a special case in which each factor contains a single attribute.

The implementation of channel abstraction uses ordered Boolean decision diagrams (OBDDs) to represent logical formulae: this includes the logical representation of bid formulae $\phi^i$ and of abstract channels $\alpha_i$. Given the specification of probabilities in terms of factors and potentials, efficient algorithms have been devised for: (a) computing the probabilities of a formula represented as an OBDD (e.g., to compute $Pr(\alpha)$ for some a-channel α in order to determine its supply); and (b) computing the conditional probability of one OBDD given another (e.g., to compute the probability $Pr(\phi^i | \alpha)$ that a-channel $\alpha$ satisfies bid formula $\phi^i$).

Channel Attributes and Stochastic Supply.

The nature of useful channel attributes varies significantly from one web site to another. This is captured by aggregating c-channels into groups known as base channels, typically corresponding to particular sites (or subsections of sites). Each base channel (e.g., a specific web site) is characterized by its total amount of supply and by the set of attributes that are observable (i.e., attributes that are known with certainty to hold of a particular impression, such as day-part, gender of subscription users, etc.), stochastically verifiable (i.e., attributes for which a probabilistic estimate of satisfaction can be given), or inapplicable (attributes for which no information is available). The distribution of channels with a base channel is specified using the method above.

It is important to note that c-channels cannot be defined using inapplicable attributes or stochastically verifiable attributes: for any base channel, its c-channels are the instantiations of its observable attributes only. For instance, on a site A that has statistical data on gender, but no means of actually observing gender, no c-channel exists with attributes site=A, gender=male (since one cannot assign an ad to such an impression with certainty). The distribution of gender is used only to predict the number of male-impressions (and hence payment) when an ad is assigned to the c-channel site=A. Similarly, if a attribute is inapplicable, every attribute value is assumed to go unsatisfied.

The abstraction model is presented as if supply is deterministic. If supply is stochastic, the abstraction techniques can be generalized using the methods described in Boutilier et al, "Expressive Banner Add Auctions and Model-Based Online Optimization for Clearing", AAAI, pps. 30-37, Chicago, 2008, where the results of deterministic optimization are used in a sampling and reoptimization framework to manage uncertainty and risk. The data representation can easily be generalized as well: (a) replace the point estimate of the supply s(b) of a base channel b by a distribution (e.g., normal, or other parametric form that makes sense and can easily be sampled from); (b) instead of a simple multinomial for each observable attribute, specify a Dirichlet, with hyperparameters for each domain value. This allows simple computation of expected values for deterministic optimization, and simple sampling for stochastic optimization.

Intelligent Dispatch.

MIP optimization for ad auctions using the standard architecture described herein will run into difficulties as the number of attributes grows. Very roughly, each instantiation of attribute values can potentially correspond to another channel of supply; thus the number of channels can grow exponentially with attributes of interest. While true in general, a lot of aggregation will typically be possible, especially with decent expressive bidding languages, but exponential growth can still be envisioned. Since each bid-channel pair (for which the channel is relevant to the bid) requires a (real-valued) variable in the MIP corresponding to the fraction of that supply of that channel allocationed to the bid, this will be impractical in general.

Channel abstraction provides a means to reduce the complexity of the decision space by aggregating certain channels of supply and assigning fractions of these abstract channels to bids rather than the actual channels. Herein, the term achannels will refer to the abstract channels, and the term echannels will refer to the underlying "exact" channels that would allow exact optimization.

There are several problems that must be addressed to make this work in practice without a severe performance hit in terms of revenue, while maintaining computational feasibility:

1. a method for determining suitable abstract channels without compromising decision quality to dramatically (and a means for assessing the tradeoffs between decision quality and computational efficiency)
2. an intelligent dispatch method that allows accounts for the fact that a bid may be allocated some portion of an achannel, but that certain of the echannels that make up the achannel do not contribute to the satisfaction of the bid
3. a MIP optimization routine that accounts for the intelligent dispatch rule in determining fractional allocations to achannels Issue 1 has been addressed by the methods for generating abstractions described herein.

A Simple Example

A simple example to illustrate the points to follow: imagine three bids b for news banner ads: $b_1$ wants banner ads on any major news site (MN); $b_2$ wants banner ads on the CNN site (CNN); $b_3$ wants the NY Times web site (NYT). Both CNN and NYT are subclasses of MN. Assume that the distribution of hits over major news sites is as follows: 15% CNN, 25% NYT, 60% OMN (other major news). These categorizations correspond to the relevant echannels for this problem. Suppose it is decided to abstract these echannels into one achannel called MN (Major News).

Some Terminology.

The echannels will be created dynamically according to actual bids in place and the ability to measure the properties in question, either in a fully or stochastically verifiable fashion. This last property is important: if some bidder uses property P in a bid, but this property cannot be verified or the probability with which it occurs cannot be estimated, it is useless with respect to channel definition. In this example, CNN, NYT, and OMN are the appropriate echannels.

An echannel e is relevant for bid b iff an ad on the channel contributes to the satisfaction of that bid. In this example, CAW is relevant to $b_2$, NYT is relevant to relevant to $b_3$ and all three echannels (including OMN) are relevant to $b_1$.

An achannel a is relevant for bid b iff a contains some echannel relevant for b. If the three echannels in this example are abstracted into one achannel MN, then MN would be relevant to all three bids.

Simple Intelligent Dispatch for Abstract Channels.

When optimizing with abstract channels, instead of fractional allocations of echannels to bids, some percentage of achannels are assigned to each bid. The qualification that channels are assigned only to bids for which they are relevant is to be understood: this generally reduces the number of variables to be less than one per bid-channel pair, whether achannels or echannels. Let $p_j^a$ be the percentage or fraction of achannel a assigned to bid $b_j$ by the optimizer.

The problem is that an allocation to an achannel must be realized by an actual allocation to some component echannel, and certain echannels may not be relevant to the bid even though the achannel is. A blind dispatch policy is one that fails to distinguish echannels, and simply assigns to $b_j$ the same fraction $p_j^a$ of each echannel that makes up achannel a. For instance, if $b_2$ (for CNN) was assigned 30% of MN, then it will receive 30% of CNN, 30% of NYT and 30% of OMN. Thus, write $p_2=0.3$ instead of $p_2^{MN}=0.3$, since there is only one achannel in this example.

Optimization under this blind dispatch policy is straightforward: namely, treat the echannel properties as if they were stochastically verifiable and include the stochastic component in the MIP when "counting" the impressions that satisfy the bid. In this example, the MIP will reflect that only 15% of the MN impressions assigned to $b_2$ are actually relevant and thus only "count" 0.15 $p_2$ of the total MN supply as contributing to the satisfaction of $b_2$.

The blind dispatch policy clearly wastes supply on bids that cannot exploit it. The selective dispatch policy offers the obvious fix: it assigns an echannel only to those bids for which it is relevant, and does so in proportion to its achannel fractional allocation. In this example, the following allocations would result assuming that the overall (i.e., MN) echannel allocation was $p_1$, $p_2$ and $p_3$ (and a concrete example with values 0.5, 0.3 and 0.2 respectively):

| Bid | Fraction CNN | Fraction NYT | Fraction OMN |
|---|---|---|---|
| $b_1$ | $\frac{p_1}{p_1+p_2}$ (0.625) | $\frac{p_1}{p_1+p_3}$ (0.714) | $\frac{p_1}{p_1}$ (1.0) |
| $b_2$ | $\frac{p_2}{p_1+p_2}$ (0.375) | 0 | 0 |
| $b_3$ | 0 | $\frac{p_3}{p_1+p_3}$ (0.296) | 0 |

There are variants on the above policy as well, such as those involving monitoring the actual supply and terminating the allocation to bids online when certain conditions are met (e.g., once it reaches some target); these are not considered here and how they impact offline optimization. However, such policies could be implemented to use supply rationally, allowing use of the updated bid states in the reoptimization phase.

Optimizing with Abstract Channels.

Next, consider the (offline) optimization problem for abstracted channels when the selective disptach rule is used. One could obviously optimize using the stochastically verifiable formulation above, yet still dispatch selectively. This however means the MIP will (substantially, in practice) underestimate the true revenue/value of its allocation and as a consequence make poor allocation decisions. Ideally, the selectivity of the dispatch rule would be encoded directly in the MIP. Mathematically, this is straightforward. Suppose for example, that bid $b_2$ (for CNN) places value per impression on the total number of impressions up to a max of 100K. The full echannel optimization would define the count variable $C_2^{CNN}$ for $b_2$'s CNN impressions as:

$$C_2^{CNN} = p_2^{CNN} Size(CNN)$$

where Size(CNN) is the expected number of CNN impressions to be allocated. In the abstracted formulation, where every bid gets the same fixed proportion of each relevant echannel (i.e., the proportion of the achannel it was allocated), the number of impressions would be defined as follows:

$$C_2^{CNN} = \frac{p_2}{p_1+p_2} Size(CNN)$$

Similarly, the relevant variables for $b_1$ and $b_3$ would be:

$$C_1^{MN} = Size(OMN) + \frac{p_1}{p_1+p_2}Size(CNN) + \frac{p_1}{p_1+p_3}Size(NYT)$$

$$C_3^{NYT} = \frac{p_3}{p_1+p_3}Size(NYT)$$

Note that these count variables do not count the number of impressions to echannels. Rather, they simply aggregate the relevant counts for a particular bid, thereby avoiding combinatorial blow up associated with taking the cross product of bid attributes. Of course, a complicated bid with multiple clauses or conditions may have multiple variables counting different classes of impressions, click throughs, etc. Thus the number of variables is proportional to the number of bids times the number of relevant achannels rather than the number of relevant echannels.

Of course, these constraints (or in some cases terms in the objective) are nonlinear. There are several approaches can be used to approximate the solution to this program.

Iterative Optimization.

Note that when the usual MIP optimization is used, allocations to specific echannels can go "unused" (at least from the perspective of the MIP). For example, in the standard optimization, only fraction $p_1+p_2$ of the CNN echannel would be counted as used. The allocation of fraction $p_3$ of echannel CNN to $b_3$ is "wasted".

One simple technique to overcome this involves the iterative solution of a series of MIPs in which the unallocated or "wasted" fraction of each echannel from the previous iteration is included as a "bonus" (in multiplicative fashion) to the allocation at the next iteration. For instance, suppose the MIP solution in this example gives allocations $p_1$=0.5, $p_2$=0.2, $p_3$=0.3. This means that 30% of echannel CNN has gone unused (from the point of view of the optimizer), in particular, the fraction allocated to $b_3$. Assume in the next iteration of the MIP, the allocations $p_1$ and $p_2$ are boosted by 1/0.7 when computing the fraction of the CNN channel they actually obtain. This is equivalent to solving the MIP with the following constraints (when considering all of the bids):

$$C_1^{MN} = Size(OMN) + \frac{p_1}{p_1'+p_2'}Size(CNN) + \frac{p_1}{p_1'+p_3'}Size(NYT)$$

$$C_2^{CNN} = \frac{p_2}{p_1'+p_2'}Size(CNN)$$

$$C_3^{NYT} = \frac{p_3}{p_1'+p_3'}Size(NYT)$$

where the p' terms are constants reflecting fractional allocations at the previous iteration.

More generally,

Initialize $P^j$=1 for each echannel j ($P^j$ refers to total fractional/percentage usage of echannel j).

Solve the MIP, defining the number of impressions (events) assigned to bid i as $$C_i = \sum_{j:\ echannel j is relevant\ to bid i} p_i \frac{1}{P_j} Size(j)$$

(where the count variable(s) or other state variables needed to determine the degree of satisfaction of a bid can be broken down as finely grained as necessary, and the sum over echannels is restricted to echannels that meet the needs of that state variable)

Set $$p^j = \sum_{i: \text{ echannel } j \text{ relevant to bid } i} p_i$$

Repeat until some convergence criterion is met

An important aspect of this optimization that will likely help is to allow the sum of the fractional allocations to exceed 1.0: specifically, the relevant constraints put on the $p_i$ are, for each echannel j:

$$\sum_{i: \text{ echannel } j \text{ relevant to bid } i} p_i \leq 1$$

This can allow the total sum of $p_i$'s to exceed one without actual causing infeasibility: the selective dispatch policy will never assign more than 100% of an echannel, even with this relaxation.

The aim of this procedure is to determine a somewhat accurate estimate of revenue/objective value accounting for selective dispatch. It is unclear whether this will converge, or if it does, to something interesting. Note several important points however:

The solution obtained is always feasible: that is, the $p_i$'s can always be implemented by the selective dispatch policy. The objective value may be underestimated or overestimated by the MIP (because the "boost" is based on the previous round's $p_i$'s); but once the $p_i$'s are in hand, computing the true objective value is trivial. Thus, should this procedure not converge, the best solution at any round can be stored and used at termination.

Since the procedures start with an underestimate of true usage (see how the $p_i$'s are initialized), it is envisioned that this may actually converge to something useful.

Running this iterative procedure in this example here illustrates its value and its convergence. In general, convergence to an optimal solution is not guaranteed, but it will generally improve allocation value significantly relative to optimization under the "random dispatch" assumption.

An Illustrative Example

Consider the example above with the following bids:

| Bid | Conditions |
|---|---|
| $b_1$ | will pay 0.10 per impression of Major News (MN) to a maximum of 70,000 impressions |
| $b_2$ | will pay 0.20 per impression of CNN to a maximum of 10,000 impressions |
| $b_3$ | will pay 0.30 per impression of NYT to a maximum of 18,000 impressions |

Recall that the distribution of hits over major news sites is as follows: 15% CNN, 25% NYT, 60% OMN (other major news). Treating supply as deterministic, with 100K available for the period in question, results in:

| eChannel | Impressions available |
|---|---|
| CNN | 15,000 |
| NYT | 25,000 |
| OMN | 60,000 |

The following table shows the convergence behavior of the iterative algorithm on this simple example. Objective value from the MIP (actually an LP in this case) is shown as is the actual revenue realized by the selective dispatch policy (recall that they are not the same). The $p_i$ terms show the "global" fractional allocation of the abstract MN channel to bid i and $q_i$ shows the actual number of relevant impressions realized by bid $b_i$ under the selective dispatch policy. The optimal allocation realizes revenue $14,400.

| Round | Obj. | Revenue | $p_1$ | $p_2$ | $p_3$ | $q_1$ | $q_2$ | $q_3$ |
|---|---|---|---|---|---|---|---|---|
| 1 | 9250 | 9250 | 0.700000 | 0.000000 | 0.300000 | 70000 | −0 | 7500 |
| 2 | 10527 | 10527 | 0.529730 | 0.000000 | 0.470270 | 70000 | 0 | 11756.7 |
| 3 | 11348 | 11348 | 0.420214 | 0.000000 | 0.579786 | 70000 | 0 | 14494 |
| 4 | 11919 | 11919 | 0.344014 | 0.000000 | 0.655986 | 70000 | −0 | 16399 |
| 5 | 13026 | 12619 | 0.288049 | 0.229342 | 0.482609 | 70000 | 10000 | 12065 |
| 6 | 13360 | 13476 | 0.259519 | 0.185607 | 0.554873 | 0000 | 5381 | 18000 |
| 7 | 13624 | 13591 | 0.236812 | 0.176825 | 0.586363 | 70000 | 5958 | 18000 |
| 8 | 13788 | 13767 | 0.218751 | 0.188564 | 0.592686 | 70000 | 6838 | 18000 |
| 9 | 13922 | 13954 | 0.204726 | 0.211040 | 0.584234 | 70000 | 7771 | 18000 |
| 10 | 14052 | 14117 | 0.193991 | 0.237958 | 0.568051 | 70000 | 8585 | 18000 |
| 11 | 14165 | 14244 | 0.185763 | 0.265567 | 0.548671 | 70000 | 9222 | 18000 |
| 12 | 14258 | 14339 | 0.179364 | 0.291844 | 0.528792 | 70000 | 9699 | 18000 |
| 13 | 14329 | 14400 | 0.174661 | 0.314809 | 0.510128 | 70000 | 10000 | 18000 |
| 14 | 14353 | 14400 | 0.174920 | 0.326316 | 0.496300 | 70000 | 10000 | 18000 |
| 15 | 14376 | 14400 | 0.175185 | 0.338425 | 0.486195 | 70000 | 10000 | 18000 |
| 16 | 14392 | 14400 | 0.174977 | 0.346066 | 0.478737 | 70000 | 10000 | 18000 |
| 17 | 14400 | 14400 | 0.175150 | 0.351254 | 0.473362 | 70000 | 10000 | 18000 |
| 18 | 14400 | 14400 | 0.175350 | 0.354823 | 0.469600 | 70000 | 10000 | 18000 |

Note that the MIP objective can both over and under estimate the actual revenue. Notice also the importance of accounting for the allocations realized by selective dispatch. For instance, $b_1$ nominally gets only 17% of the MN achannel, however, the fact that no other bids compete for the echannel OMN means that it in fact obtains all of that echannel. When this is taken into account, it allows $p_1$ to drop significantly, freeing up the other echannels for use by the other two bids.

Without this, $b_1$ would necessarily consume resources (NYT and CNN) that are not needed, and not allowing the other two bids to exploit them fully.

Optimizing Using Abstract Channels Under Uncertainty.

Optimization is important in ad markets, exchanges, and allocation systems in which expressive preferences or expressive bidding is used. For the purpose of describing the invention, banner ads are described. However, this is not to be construed as limiting the invention since the general principles and specific techniques described herein can be applied mutatis mutandis to other forms of advertising, especially online advertising, such as, without limitation, keyword search auctions, electronic auctions of TV and radio ads, etc.

The technical challenge for expressive ad auctions is optimization, namely, determining the optimal allocation of ad channels to very large numbers of complex bids in real-time. This is further complicated by the stochastic nature of the domain—both supply (number of impressions or CTs) and demand (future bids) are uncertain—which necessitates online allocation. Three models have been proposed to solve the problem of allocation in the presence of uncertain supply and demand.

Solving the problem as a a Markov decision process (MDP). This provides the optimal solution to the sequential optimization problem. It has the advantage of accounting for uncertainty and risk thus induced in precisely the right way, assuming the goal is revenue maximization (or expected objective value if some other objective, e.g., efficiency, is used). Unfortunately, given the sizes of the optimization problems, the solution of an MDP is intractable in all but the most simple ad allocation settings.

Expectation-based optimization and reoptimization. An especially simple model is that of expectation-based optimization. This model uses deterministic optimization using expectations of all random variables and exploiting powerful mixed integer programming (MIP) algorithms for expressive market clearing. Specifically, all random quantities (e.g., ad slot supply, click rate, future bids/demand) are fixed at their expected (mean) values. Once this is done, a deterministic optimization problem is solved maximizing revenue (or some other objective) assuming these mean values will be realized. Depending on the forms of expressiveness used, the deterministic optimization can be formulated as a linear program (LP), a MIP, or in some other fashion. State of the art MIP-solvers, tuned to economic allocation problems, can solve very large problems. However, the drawback of this approach is that such solver does not adequately account for uncertainty and risk. Thus the quality of allocations can suffer as there is sufficient uncertainty. This can be especially problematic for bonus (all or nothing) advertizer bids/preferences/demands.

The problem of uncertainty can be mitgated somewhat by periodic reoptimization. Given the realized values of uncertain quantities (and hence actual allocations to specific advertisers) at some time period, the optimization can be rerun to update future allocations. However, this cannot resolve all of the problems.

Online Stochastic Optimization. A third approach is that of online stochastic optimization. In this model, samples are drawn from a distribution of uncertain events, and a deterministic optimization problem, or scenario, is constructed using each sampled realization. Each scenario is solved and the results are aggregated to construct an approximately optimal decision at the current period in the underlying MDP. The method is online in that the sample-based optimization is repeated after the current realization of uncertain events. That is, the approach determines the expected value of the best next action (or dispatch decision) rather than an entire policy for the MDP. This method requires that a "combining" LP or MIP be solved that brings together the solutions of the deterministic optimizations for each sample. As a consequence, in the MIP case, k+1 (deterministic) MIPs need to be solved if k samples are generated. As with expectation-based optimization, the online stochastic optimization is rerun periodically.

This approach has the advantage of accounting for uncertainty and risk in a much more robust fashion than expectation-based optimization; thus it tends to provide much higher quality solutions (e.g., higher revenue) on average. Furthermore it is much more tractable than a full MDP solution. However, scalability is still limited to moderately sized problems. It cannot solve problems approaching the size of those well-tackled by expectation-based optimization.

Next, two techniques will be described for solving ad allocation problems in optimization settings that have the attractive computational properties of expectation-based optimization, but deal with uncertainly much more accurately than expectation-based optimization, thus realizing the attractive performance advantage of online stochastic optimization.

Deterministic Overprovisioning.

The first technique, deterministic overprovisioning, works as follows: for any advertiser that expresses preferences, bids or other demand for certain sets of ad slots, an increase, or overprovision is applied for that advertiser. Specifically, expectation-based optimization is run using expected (mean) values of uncertain quantities (as above), but in the optimization the quantity of specific ad channels demanded by the advertiser is replaced by an increased quantity. The optimization then allocates, in expectation, more ad supply to the advertiser than demanded in order to extract the relevant payment from the advertiser. This is the effect on optimization only; payments will be made according to the actual realized allocation, not this inflated figure. As in expectation-based optimization, the optimization is rerun periodically to account for actual realizations of uncertain supply, demand, etc.

The benefit of this approach is that uncertainty, which can cause an expectation-based optimizer running an optimization on a computer, like computer 2 in FIG. 1, to make allocations that miss "target levels" with some probability, is now mitigated to some extent. By overprovisioning in expectation, some "negative" variance in supply, click rate, or other uncertainty quantities can be tolerated with sacrificing revenue (or other objective value). This is especially important when advertisers payments are linked to meeting specific "all or nothing" targets, when smoothness conditions are in play, and when other complex forms of expressiveness are used.

Apart from handling risk and uncertainty, this approach is no more computationally demanding than expectation-based optimization. In fact, the problems are identical in structure, only target quantities are altered. Adjusting target quantities can take into account variance/standard deviation and the target adjustments can be varied over time, with each reoptimization using a different adjustment (e.g., to account for increase or decrease in variance).

Sample-Based Expected Revenue Optimization (SBERO).

The second technique, sample-based expected revenue optimization (SBERO), is similar to online stochastic optimization, with one difference. It works as follows. As in online stochastic optimization, k samples are drawn from the distribution of uncertain events: this gives us k trajectories or scenarios fixing specific supply, demand, click rates, etc. for all uncertain quantities affecting the optimization. Given a fixed allocation of channel supply to advertisers, each scenario determines the revenue (or value of another objective of interest) associated the allocation (as if it were a deterministic problem). Then, solve an optimization problem that determines the optimal allocation to advertisers averaged over the k scenarios. A weighted average can also be taken to reflect specific sampling strategies. Other constructed scenarios can also be accommodated, apart from random sampling. As in expectation-based optimization, the optimizer is rerun periodically to account for actual realizations of uncertain supply, demand, etc.

SBERO has the following distinction: unlike online stochastic optimization—in which a distinct allocation of supply must be determined for each scenario—SBERO computes a single allocation of supply to advertisers that is used in each scenario. In other words, SBERO computes an allocation assuming no recourse, i.e., a policy that is oblivious to the actual realization of past supply. This provides a computational advantage. Rather than solving k+1 MIPS, with a total of O(kn) decision variables (where n is the number of decision variables in a deterministic allocation), as does online stochastic optimization; SBERO solves only a single MIP with n decision variables. Thus, it is computationally extremely effective. In practice, it scales roughly linearly in the number of scenarios (i.e., if there are k scenarios, it takes roughly k times as long to solve as a deterministic optimization).

Despite the impressive computational performance, it handles risk and uncertainty well. While the lack of explicit recourse model causes it to suffer marginally relative to online stochastic optimization—indeed preliminary experiments show little appreciable difference in revenue in practice—this is more than offset by its computational performance.

Herein a suite of techniques have been described based on column and constraint generation that effectively tackle the channel explosion problem in the optimal allocation of online ads. The techniques apply to both simple, current forms of expressiveness (e.g., simple budget constraints) and other, richer forms of campaign-level expressiveness that require the solution of large-scale integer programs. Experiments demonstrate that high-quality allocations can be determined using very few abstract channels in optimization. This illustrates the desirable sensitivity of the techniques to those channel distinctions that have the greatest impact on value (e.g., revenue or efficiency). The techniques scale to problems with hundreds of attributes and bidders. Given the offline nature of the optimization problem described herein, the computational results suggest that the techniques can be run and rerun frequently to determine, for example, (approximately) optimal allocations in stochastic models that require sampling.

The search for channel splits in column generation, while effective for problems, is still quite crude. It is envisioned that simple heuristics for variable/literal ordering based on channel supply and bid properties could dramatically improve the performance of column generation (since the split search, not optimization, dominates running time). Dynamic programming may be used in special cases (e.g., under certain independence assumptions) to find higher quality splits than the techniques described herein.

The invention has been described with reference to the preferred embodiments. Obvious modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A computer-implemented method of determining an abstraction of a plurality of differentiated goods available for exchange, wherein each differentiated good is differentiatable based on at least one property of the good, and each property has associated therewith at least one attribute, the computer-implemented method comprising:
   (a) storing in a computer storage accessible to a processor of a computer data regarding each differentiated good of a plurality of differentiated goods, wherein the data regarding each differentiated good includes an attribute value assigned to at least one attribute of the differentiated good, wherein the data further includes a supply quantity of at least one differentiated good over a time period, wherein the supply quantity is either known with certainty or is estimated;
   (b) the processor determining a first abstraction of the plurality of differentiated goods based on the data in step (a), wherein the first abstraction comprises at least one abstract good, each abstract good includes one or more differentiated goods, and at least one abstract good of the first abstraction includes at least two distinct differentiated goods;
   (c) the processor determining for each abstract good a specification for said abstract good based on the data regarding the one or more differentiated goods comprising the abstract good;
   (d) the processor storing in the computer storage the specification determined for each abstract good in step (c); and
   storing in the computer storage data about at least one set of one or more first offers to purchase, wherein each offer to purchase is either an actual offer or an estimate of a current or future offer to purchase, and each offer to purchase includes at least one differentiated good set, wherein each differentiated good set includes at least one differentiated good and an associated price, wherein:
   step (b) includes the processor determining the first abstraction further based on the set of first offers to purchase; and
   the specification for at least one abstract good in step (c) includes data about a supply quantity available or predicted to be available for the abstract good, and that portion of the supply quantity for the abstract good that satisfies one or more attribute values.

2. The method of claim 1, wherein the at least one differentiated good set in step (e) includes at least one of the following:
   at least one property that each differentiated good in the differentiated good set must satisfy;
   at least one constraint on a relationship between the properties of a first subset of differentiated goods in the differentiated good set and the properties of a second subset of differentiated goods in the differentiated goods set; and
   at least one constraint on the quantity of differentiated goods in the differentiated goods set.

3. The method of claim 2, wherein the at least one property that each differentiated good in at least one differentiated good set must satisfy includes at least one of the following:
   inclusion in a set of one or more differentiated goods;
   the differentiated good has an attribute with a value from a set of one or more attribute values; and
   the values assigned to each of the attributes associated with the differentiated good satisfies a Boolean formula using operators AND, OR or NOT.

4. The method of claim 2, wherein the at least one constraint on the relationship between the properties of the first subset of differentiated goods and the properties of the second subset of differentiated goods includes a constraint on the ratio of a quantity of differentiated goods in the first subset of differentiated goods and a quantity of differentiated goods in the second subset of differentiated goods, where the differentiated goods in the first subset of differentiated goods satisfy a first property and the differentiated goods in the second subset satisfy a second property.

5. The method of claim 1, wherein the price associated with at least one differentiated good set includes at least one of the following:
   a per-unit price for each differentiated good in the differentiated good set;
   a per-unit price for each differentiated good in the differentiated good set that satisfies some property of the differentiated good;
   a budget constraint on a maximum total payment for differentiated goods in the differentiated good set; and
   a total price for the differentiated good set.

6. The method of claim 5, wherein at least one first offer to purchase further includes at least one of the following:
   a price to be paid per unit of differentiated good in each differentiated good set associated with the first offer to purchase; and
   an overall budget constraint limiting the maximum total payment for goods across all differentiated good sets associated with the first offer to purchase.

7. The method of claim 1, wherein the at least one differentiated good and an associated price in step (e) includes at least one of the following:
   a constraint requiring that every good in the set satisfies at least one property, including either verifiable or stochastically verifiable properties;
   a condition requiring that an observable action occurs in response to the allocation of a good;
   a condition that defines a set of allowable substitutes for at least one good;
   a payment rule with one of an all-or-nothing bonus, tiered pricing, a trigger condition and effect;
   a constraint requiring that a minimum quantity of goods are allocated;
   a constraint requiring that a maximum quantity of goods is allocated;
   a constraint on the sequencing of the allocation of goods to an offer to purchase over a specified interval of time, including at least one of a smoothing, ramp-up, or sequencing constraint;
   a payment rule specifying a positive adjustment in the event that complementary goods are allocated;
   a payment rule that includes a counting constraint on the maximum number of goods for which payment will be made;
   a budget constraint on the total payment that can be made associated with an offer to purchase;
   an aggregate volume constraint on the total volume of goods that can be allocated to an offer to purchase;
   a frequency constraint on the frequency with which goods are allocated over some time interval to an offer to purchase;
   a joint allocation constraint on the allocation of one or more goods to the offer to purchase based on the allocation of one or more related goods to at least one other offer to purchase; and
   a payment rule with an adjustment that has at least one prerequisite that must be satisfied as a condition to adjusting the payment.

8. The method of claim 1, further including:
   the processor receiving a set of second offers to purchase, wherein at least one second offer to purchase includes at least one set of at least one abstract good and a price associated with said set of abstract goods, where the abstract goods included in the second offer to purchase are selected from the abstract goods of the first abstraction determined in step (b).

9. The method of claim 1, wherein the first offers to purchase are actual offers to purchase; and
   the method further includes:
   (f) the processor determining an allocation of differentiated goods to at least one first offer to purchase in response to allocating none or at least a portion of one or more abstract goods of the first abstraction of step (b) to the first offer to purchase;
   (g) the processor determining a payment rule for the supply of abstract goods allocated to the first offer to purchase in step (f), wherein said payment rule is based on the specification of the abstract goods allocated in step (f) and the at least one differentiated good set included in the first offer to purchase in step (f); and
   (h) storing in the computer storage each allocation of differentiated goods and the payment rule.

10. A computer-implemented method of determining an abstraction of a plurality of differentiated goods available for exchange, wherein each differentiated good is differentiatable based on at least one property of the good, and each property has associated therewith at least one attribute, the computer-implemented method comprising:
   (a) storing in a computer accessible to a processor of a computer data regarding each differentiated good of a plurality of differentiated goods, wherein the data regarding each differentiated good includes an attribute value assigned to at least one attribute of the differentiated good;
   (b) the processor determining a first abstraction of the plurality of differentiated goods based on the data in step (a), wherein the first abstraction comprises at least one abstract good, each abstract good includes one or more differentiated goods, and at least one abstract good of the first abstraction includes at least two distinct differentiated goods;
   (c) the processor determining for each abstract good a specification for said abstract good based on the data regarding the one or more differentiated goods comprising the abstract good;
   (d) the processor storing in the computer storage the specification determined for each abstract good in step (c); and
   (e) storing in the computer storage data about at least one set of one or more first offers to trade, wherein each offer to trade is either an actual offer or an estimate of a current or future offer to trade, each offer to trade includes at least one set of at least one of the plurality of differentiated goods, wherein each differentiated good set includes at least one differentiated good and an associated price, and each offer to trade is either an offer to purchase or an offer of sale, wherein:
   step (b) includes the processor determining the first abstraction further based on the set of first offers to trade.

11. The method of claim 10, wherein the first offers to trade are actual offers to trade; and
   the method further includes:
   (f) the processor determining an allocation of differentiated goods to at least one first offer to trade in response to allocating none or at least a portion of one or more abstract goods of the first abstraction of step (b) to the first offer to trade;

(g) the processor determining a payment rule for the allocation of abstract goods to at least one first offer to trade in response to allocating at least a portion of one or more abstract goods of the first abstraction in step (b) to said first offer to trade, wherein said payment rule is based on the specification of the abstract goods allocated in step (f) and the at least one differentiated good set included in the first offer to trade; and (h) storing in the computer storage each allocation of differentiated goods and the payment rule.

12. The method of claim 10, further including:

(f) the processor receiving a set of second offers to trade;

(g) the processor determining an allocation of differentiated goods to at least one second offer to trade in response to allocating none or at least a portion of one or more abstract goods of the first abstraction of step (b) to the second offer to trade;

(h) the processor determining a payment rule for the allocation of abstract goods to at least one second offer to trade in response to allocating at least a portion of one or more abstract goods of the first abstraction in step (b) to said second offer to trade, wherein said payment rule is based on the specification of the abstract goods allocated in step (g) and the at least one set differentiated good set included in said second offer to trade; and (i) storing in the computer storage each allocation of differentiated goods and the payment rule.

13. The method of claim 9, wherein the allocation in step (f) satisfies one of the following objectives:

maximizing total payments given a known supply of goods;

maximizing total estimated payments given an estimated supply of goods;

maximizing worst-case payments over a plurality of possible realizations of the estimated supply of goods;

maximizing risk-adjusted revenue or expected utility given a distribution on possible realizations of estimated supply of goods; or maximizing total social welfare given estimated utility of buyers associated with offers to purchase and an estimated supply of goods.

14. The method of claim 1, further including:

(f) the processor receiving a set of second offers to purchase;

(g) the processor determining an allocation of differentiated goods to at least one second offer to purchase in response to allocating at least a portion of each abstract good of the first abstraction of step (b);

(h) the processor determining a payment rule for the supply of abstract goods allocated to each second offer to purchase in step (g), wherein said payment rule is based on the specification of the abstract goods allocated in step (g) and the at least one differentiated good set included in the second offer to purchase; and (i) storing in the computer storage each allocation of differentiated goods and its payment rule.

15. The method of claim 14, wherein the allocation in step (g) satisfies one of the following objectives:

maximizing total payments given a known supply of goods;

maximizing total estimated payments given an estimated supply of goods;

maximizing worst-case payments over a plurality of possible realizations of the estimated supply of goods;

maximizing risk-adjusted revenue or expected utility given a distribution on possible realizations of estimated supply of goods; and maximizing total social welfare given estimated utility of buyers associated with offers to purchase and an estimated supply of goods.

16. The method of claim 9, wherein the payment rule in step (g) is determined in one of the following ways:

when differentiated goods associated with an abstract good allocated to each first offer to purchase in step (f) are allocated randomly, the processor determines for each first offer to purchase the number of differentiated goods allocated to the first offer to purchase that are included in the one or more differentiated good sets associated with the first offer to purchase, and calculates a payment based on this determination; or the processor allocates to each first offer to purchase in step (f) only differentiated goods comprising said abstract good that are included in each differentiated good set associated with the first offer to purchase, and calculates a payment based on this determination.

17. The method of claim 14, wherein the payment rule in step (h) is determined in one of the following ways:

when differentiated goods associated with an abstract good allocated to each second offer to purchase in step (g) are allocated randomly, the processor determines for each second offer to purchase the number of differentiated goods allocated to the second offer to purchase that are included in the one or more differentiated good sets associated with the second offer to purchase, and calculates a payment based on this determination; or the processor allocates to each second offer to purchase in step (g) only differentiated goods comprising said abstract good that are included in each differentiated good set associated with the second offer to purchase, and calculates a payment based on this determination.

18. A computer-implemented method of determining an abstraction of a plurality of differentiated goods available for exchange, wherein each differentiated good is differentiatable based on at least one property of the good, and each property has associated therewith at least one attribute, the computer-implemented method comprising:

(a) storing in a computer storage accessible to a processor of a computer data regarding each differentiated good of a plurality of differentiated goods, wherein the data regarding each differentiated good includes an attribute value assigned to at least one attribute of the differentiated good, wherein the data further includes a supply quantity of at least one differentiated good over a time period, wherein the supply quantity is either known with certainty or is estimated;

(b) the processor determining a first abstraction of the plurality of differentiated goods based on the data in step (a), wherein the first abstraction comprises at least one abstract good, each abstract good includes one or more differentiated goods, and at least one abstract good of the first abstraction includes at least two distinct differentiated goods;

(c) the processor determining for each abstract good a specification for said abstract good based on the data regarding the one or more differentiated goods corn rising the abstract good;

the processor storing in the computer storage the specification determined for each abstract good in step (c); and storing in the computer storage data about at least one set of one or more first offers to purchase, wherein each offer to purchase is either an actual offer or an estimate of a current or future offer to purchase, and each offer to purchase includes at least one differentiated good set, wherein each differentiated rood set includes at least one differentiated good and an associated price, wherein:

step (b) includes the processor determining the first abstraction further based on the set of first offers to purchase; and the specification for at least one abstract good in step (c) includes data about a supply quantity available or predicted to be available for the abstract good, and that portion of the supply quantity for the abstract good that satisfies one or more attribute values, wherein determining the first abstraction in step (b) includes:

(i) storing in the computer storage a current abstraction of the plurality of differentiated goods, wherein said current abstraction comprises at least one abstract good;

(ii) the processor creating one or more candidate abstractions based on the data in step (a) and the set of first offers to purchase;

(iii) the processor determining a score for each candidate abstraction based on at least the set of first offers to purchase;

(iv) the processor replacing the current abstraction with a candidate abstraction that satisfies a predetermined objective, said objective being either a maximal score or minimal a minimal score; and (v) repeating steps (ii)-(iv) until a predetermined termination criterion is met, whereupon the current abstraction is selected as the first abstraction.

19. The method of claim 18, wherein the termination criterion is one of the following:

a property of the current abstraction meets, is greater than, or is less than a threshold, where the property is either: the number of abstract goods in the abstraction, or the improvement in absolute score relative to the prior current abstraction;

the number of repetitions of steps (ii)-(iv) meets or exceeds a limit; and the computation time spent in steps (ii)-(iv) meets or exceeds a limit.

20. A computer-implemented method of determining an abstraction of a plurality of differentiated goods available for exchange, wherein each differentiated rood is differentiatable based on at least one property of the good, and each property has associated therewith at least one attribute, the computer-implemented method comprising:

(a) storing in a computer storage accessible to a processor of a computer data regarding each differentiated good of a plurality of differentiated goods wherein the data regarding each differentiated good includes an attribute value assigned to at least one attribute of the differentiated good, wherein the data further includes a supply quantity of at least one differentiated good over a time period, wherein the supply quantity is either known with certainty or is estimated;

(b) the processor determining a first abstraction of the plurality of differentiated goods based on the data in step (a), wherein the first abstraction comprises at least one abstract good, each abstract good includes one or more differentiated goods, and at least one abstract good of the first abstraction includes at least two distinct differentiated goods;

(c) the processor determining for each abstract good a specification for said abstract good based on the data regarding the one or more differentiated goods comprising the abstract good;

(d) the processor storing in the computer storage the specification determined for each abstract good in step (c); and (e) storing in the computer storage data about at least one set of one or more first offers to purchase, wherein each offer to purchase is either an actual offer or an estimate of a current or future offer to purchase, and each offer to purchase includes at least one differentiated good set, wherein each differentiated good set includes at least one differentiated good and an associated price, wherein:

step (b) includes the processor determining the first abstraction further based on the set of first offers to purchase; and the specification for at least one abstract good in step (c) includes data about a supply quantity available or predicted to be available for the abstract good, and that portion of the supply quantity for the abstract good that satisfies one or more attribute values, wherein determining the first abstraction in step (b) includes:

(i) storing in the computer storage a plurality of candidate abstract goods, wherein each candidate abstract good includes one or more differentiated goods;

(ii) storing in the computer storage at least one constraint to preclude the first and second candidate abstract goods stored in step (i) from both occurring in at least one abstract good that comprises an abstraction;

(iii) the processor determining one or more candidate abstractions based on the data in step (a) and the set of first offers to purchase;

(iv) the processor determining a score for each candidate abstraction based on at least the set of first offers to purchase; and (v) the processor determining the first abstraction comprising one or more candidate abstract goods of step (i), wherein the first abstraction satisfies the at least one constraint of step (ii); and the first abstraction satisfies either a minimal score or a maximal score among all candidate abstractions comprised of one or more candidate abstract goods from step (i) and the first abstraction satisfies the at least one constraint of step (ii).

21. The method of claim 18, further including:

(f) the processor determining an allocation of differentiated goods to at least one first offer to purchase in response to allocating at least a portion of one or more abstract goods of the first abstraction of step (b);

(g) the processor determining a payment rule for the supply of abstract goods allocated to each first offer to purchase in step (f), wherein said payment rule is based on the specification of the abstract goods allocated in step (f) and the at least one differentiated good set included in the first offer to purchase; and (h) storing in the computer storage each allocation of differentiated goods and the payment rule.

22. The method of claim 18, further including:

(f) the processor receiving a set of second offers to purchase;

(g) the processor determining an allocation of differentiated goods to at least one second offer to purchase in response to allocating at least a portion of one or more abstract goods of the first abstraction of step (b);

(h) the processor determining a payment rule for the supply of abstract goods allocated to each second offer to purchase in step (g), wherein said payment rule is based on the specification of the abstract goods allocated in step (g) and the at least one differentiated good set included in the second offer to purchase; and (i) storing in the computer storage each allocation of differentiated goods and its payment rule.

23. The method of claim 18, wherein determining a score for each candidate abstraction in step (iii) includes:

the processor determining properties of the abstract goods that comprise the candidate abstraction from the specification for each abstract good determined in step (c), wherein the properties of the abstract goods include at least the total amount of supply available or estimated to be available of each abstract good and either none or the portion of each abstract good that satisfies one or more attribute values;

the processor determining an allocation of differentiated goods to at least one first offer to purchase in response to allocating none or at least a portion of each abstract good of the candidate abstraction to the first offer to purchase in a way that is feasible given the available or estimated supply of the abstract good; and the processor determining the score of the candidate abstraction as a sum of payments from all first offers to purchase, wherein said payments depend on the allocation;

and where in step (iv) the processor replacing the current abstraction with a candidate abstraction that satisfies the maximal score objective.

24. The method of claim 23, wherein, when the first offers to purchase are actual offers to purchase, the allocation of differentiated goods to first offers to purchase computed for the selected first abstraction is output by the processor to at least one of the following: a display of the computer or a computer network.

25. The method of claim 23, wherein the payment from each first offer to purchase the allocation is determined in one of the following ways:

when differentiated goods associated with an abstract good allocated to each first offer to purchase are allocated randomly, the processor determines for each first offer to purchase the number of differentiated goods allocated to the first offer to purchase that are included in the one or more differentiated good sets associated with the first offer to purchase, and calculates a payment based on this determination; or the processor allocates to each first offer to purchase only differentiated goods comprising said abstract good that are included in each differentiated good set associated with the first offer to purchase, and calculates a payment based on this determination.

26. The method of claim 18, wherein determining the first abstraction in step (b) further includes:

the processor determining a current allocation of the abstract goods in the current abstraction based on an objective of maximizing a total payment to be received from the current allocation and in a way that is feasible given the available or estimated supply of the abstract goods;

the processor determining at least one candidate abstract good to introduce into the current abstraction and creating at least one candidate abstraction by introducing at least one of the candidate abstract goods into the current abstraction;

the processor determining, for each of the at least one candidate abstract good, an estimate of the improvement in total payment that would be realized using a candidate allocation instead of the current allocation, said candidate allocation allocating none or at least a portion of one or more abstract goods from the set comprising the current abstraction and the candidate abstract good, to one or more first offers; and for each candidate abstraction determining a score based on the computed estimate in improvement in total payment for each candidate abstract good into the current abstraction to form the candidate abstraction, and where in step (iv) the processor replacing the current abstraction with a candidate abstraction that satisfies the maximal score objective.

27. The method of claim 26, further including the processor removing from each candidate abstraction each abstract good that is in the current abstraction and that intersects with a candidate abstract good that is introduced to the current abstraction to create the candidate abstraction.

28. The method of claim 26, wherein the score of the at least one candidate abstract good that is introduced into the current abstraction is determined as one of the following:

a maximum reduction in costs of variables corresponding to the candidate abstract good in a linear programming solution to the allocation of the current abstraction;

a sum of reduced costs of variables corresponding to the candidate abstract good in a linear programming solution to the allocation problem of the current abstraction;

a sum of non-negative reduced costs of variables corresponding to the candidate abstract good in a linear programming solution to the allocation problem of the current abstraction;

a sum of the reduced costs of variables corresponding to the assignment of some portion of the candidate abstract good to each first offer to purchase in a linear programming solution to the allocation problem of the current abstraction, wherein at least one variable for each offer is included in the sum; and a sum of non-negative reduced costs of variables corresponding to the assignment of some portion of the candidate abstract good to each first offer to purchase in a linear programming solution to the allocation problem of the current abstraction, wherein at least one variable for each offer is included in the sum.

29. The method of claim 26, wherein:

each candidate abstract good is a child abstract good of a parent abstract good included in the current abstraction; and each child abstract good includes a subset of the goods in the parent abstract good included in the current abstraction.

30. The method of claim 29, further including determining a score for each child abstract good given the current abstraction as follows:

the processor determining a set of values for the child abstract good, wherein each child abstract good value is based on at least a reduced cost of each variable corresponding to the child abstract good in a linear programming solution to the allocation problem for the abstract goods that comprise the current abstraction and on the total supply of differentiated goods available in the child abstract good;

the processor determining a set of values for a complement child abstract good of the child abstract good, wherein said complement child abstract good comprises each differentiated good in the parent abstract good that was not included in the child abstract good, wherein each complement child abstract good value is based on the reduced cost of each variable corresponding to the complement of the child abstract good in a linear programming solution to the allocation problem for the abstract goods that comprise current abstraction and on the total supply of differentiated goods included in the complement child abstract good; and the processor computing the score for the child abstract good based on the set of values for the child abstract good and the set of values for the complement child abstract good.

31. The method of claim 18, wherein:

each abstract good in each current abstraction is associated with a property;

the property of each abstract good is determined from values assigned to one or more attributes of the differentiated goods included in the abstract good or by a Boolean formula using operators AND, OR or NOT over such assignments; and determining the first abstraction in step (b) further includes:

the processor selecting at least one parent abstract good from the current abstraction and, for each selected parent abstract good, selecting at least one attribute-value pair;

the processor determining for each selected parent abstract good and each attribute-value pair selected for that parent abstract good: (a) a child abstract good that includes differentiated goods in the parent abstract good that satisfy the attribute-value pair, wherein a property associated with the child abstract good corresponds to the Boolean conjunction of the parent abstract good's property and its attribute-value pair; and (b) a complement child abstract good that includes differentiated goods in the parent abstract good that do not satisfy the attribute-value pair, wherein a property associated with the complement child abstract good corresponds to the Boolean conjunction of the parent abstract good's property and the negation of its attribute-value pair; and the processor determining at least one candidate abstraction by adding to the current abstraction the child abstract good and the complement child abstract good corresponding to the selected parent abstract good and removing the selected parent abstract good from the current abstraction; and the processor determining a score for each candidate abstraction based on the reduced costs of the variables corresponding to the child abstract good and the reduced costs of the variables corresponding to the complement child abstract good in a linear programming solution to the allocation problem that assigns abstract goods in the current abstraction to the set of first offers to purchase.

32. The method of claim 18, wherein:

each abstract good in each current abstraction is associated with a property;

the property of each abstract good is determined from values assigned to one or more attributes of the differentiated goods included in the abstract good or by a Boolean formula using operators AND, OR or NOT over such assignments;

determining the first abstraction in step (b) further includes the processor selecting at least one parent abstract good from the current abstraction and, for each selected parent abstract good, the processor determining a selected target refinement of the selected parent abstract good, wherein the selected target refinement is a child abstract good that is a subset of the parent abstract good, and the selected target refinement of the selected parent abstract good is determined as follows:

(i) storing in the computer storage a current target refinement corresponding to the parent abstract good, and associating with the current target refinement the property associated with the parent abstract good;

(ii) storing in the computer storage a set of one or more attribute-value pairs, each attribute value pair comprising an attribute used to describe properties of differentiated goods and a value assigned to said attribute;

(iii) the processor determining a set of one or more candidate conjunctive target refinements, wherein for each attribute-value pair in step (ii) the candidate conjunctive target refinement is a child abstract good comprising the differentiated goods in the parent abstract good that satisfy the Boolean conjunction of the property associated with the current target refinement and said attribute-value pair, and associating with each candidate conjunctive target refinement the property comprised of the Boolean conjunction of the property associated with the current target refinement and said attribute-value pair;

(iv) the processor determining for each candidate conjunctive target refinement, a complement child abstract good comprising the differentiated goods in the parent abstract good that do not satisfy the conjunction of the property associated with the current target refinement and the attribute-value pair for the candidate conjunctive target refinement;

(v) the processor determining a set of one or more candidate disjunctive target refinements, wherein for each attribute-value pair in step (ii) the candidate disjunctive target refinement is a child abstract good comprising the differentiated goods in the parent abstract good that satisfy the Boolean disjunction of the property associated with the current target refinement and said attribute-value pair, and associating with each candidate disjunctive target refinement the property comprised of the Boolean disjunction of the property associated with the current target refinement and said attribute-value pair;

(vi) the processor determining for each candidate disjunctive target refinement a complement child abstract good comprising the differentiated goods in the parent abstract good that do not satisfy the disjunction of the property associated with the current target refinement and the attribute-value pair for the candidate disjunctive target refinement;

(vii) the processor determining a score for each candidate target refinement in the set of one or more candidate conjunctive target refinements in step (iii) and in the set of one or more candidate disjunctive target refinements in step (v), wherein each score is based on a reduced costs of the variables corresponding to the child abstract good and its complement child abstract good in a linear programming solution to the allocation problem that assigns abstract goods in the current abstraction to the set of first offers to purchase;

(viii) the processor designating as the current target refinement the target refinement from step (vii) that satisfies a predetermined objective, the predetermined objective being either a maximal score or a minimal score, from the set of one or more candidate conjunctive target refinements in step (iii) and the set of one or more candidate disjunctive target refinements in step (v); and (ix) repeating steps (ii)-(viii) until a second predetermined termination condition is met, whereupon the current target refinement becomes the selected target refinement of the parent abstract good; and the processor determines the set of one or more candidate abstractions by constructing a candidate abstraction from the current abstraction for each of the selected parent abstract goods by adding the child and complement child abstract goods corresponding to the selected target refinement for the selected parent abstract good to the current abstraction, and removing the selected parent abstract good from the current abstraction.

33. The method of claim 32, wherein the second predetermined termination criterion is one of the following:
    a score computed for the new target refinement meets or exceeds some maximum threshold;
    a score computed for the new target refinement meets or is less than some minimum threshold;
    a difference in the score of the new target refinement and the score of the current target refinement is below some minimum threshold;
    a number of repetitions of steps (ii)-(viii) exceeds a maximum number of repetitions;
    a computation time of steps (ii)-(viii) meets or exceeds a maximum computation time.

34. The method of claim 1, wherein
    the differentiated goods available for exchange are advertising slots on television, interne or other media; and
    the properties by which advertising slots are differentiable are of interest to a set of at least one potential advertiser.

35. A computer-implemented method of determining an abstraction of a plurality of differentiated goods available for exchange, wherein each differentiated good is differentiatable based on at least one property of the good, and each property has associated therewith at least one attribute, the computer-implemented method comprising:
    (a) storing in a computer storage accessible to a processor of a computer data regarding each differentiated good of a plurality of differentiated goods, wherein the data regarding each differentiated good includes an attribute value assigned to at least one attribute of the differentiated good;
    (b) the processor determining a first abstraction of the plurality of differentiated goods based on the data in step a wherein the first abstraction comprises at least one abstract good, each abstract good includes one or more differentiated goods, and at least one abstract good of the first abstraction includes at least two distinct differentiated goods;
    (c) the processor determining for each abstract good a specification for said abstract good based on the data regarding the one or more differentiated goods comprising the abstract good; and
    (d) the processor storing in the computer storage the specification determined for each abstract good in step (c), wherein:
    the differentiated goods available for exchange are advertising slots on television, internet or other media; and
    the properties by which advertising slots are differentiable are of interest to a set of at least one potential advertiser, wherein the properties of an advertising slot include at least one of the following:
    a time at which the advertising slot is displayed to one or more members of the slot's audience;
    an expected or actual audience size for the advertising slot;
    an expected or actual demographic property of the slot's audience, such demographic property including at least one of the following: gender, income, geographic location, number of times audience members have previously viewed the advertisement allocated to that slot, or related advertisements;
    in the case of television, a show or show genre in which the advertising slot occurs;
    in the case of the Internet, content properties of a web page or web site on which the advertising slot occurs;
    a nature or content of advertisements displayed in temporally proximal advertising slots to said advertising slot;
    a nature or content of advertisements displayed in spatially proximal advertising slots to said advertising slot on a web page; and
    past trackable behavior of an audience member, including television viewership of previous shows or advertisements, previous visits to the web site or page on which the advertising slot occurs, or the pattern of previous visits to other web sites or web pages.

36. A computer-implemented method of determining an abstraction of a plurality of differentiated goods available for exchange, wherein each differentiated good is differentiatable based on at least one property of the good, and each property has associated therewith at least one attribute, the computer-implemented method comprising:
    (a) storing in a computer storage accessible to a processor of a computer data regarding each differentiated good of a plurality of differentiated goods, wherein the data regarding each differentiated good includes an attribute value assigned to at least one attribute of the differentiated good;
    (b) the processor determining a first abstraction of the plurality of differentiated goods based on the data in step (a), wherein the first abstraction comprises at least one abstract good, each abstract good includes one or more differentiated goods, and at least one abstract good of the first abstraction includes at least two distinct differentiated goods;
    (c) the processor determining for each abstract good a specification for said abstract good based on the data regarding the one or more differentiated goods comprising the abstract good;
    (d) the processor storing in the computer storage the specification determined for each abstract good in step (c); and
    (e) storing in the computer storage data about at least one set of one or more first offers to trade, wherein each offer to trade is either an actual offer or an estimate of a current or future offer to trade, each offer to trade includes at least one set of at least one of the plurality of differentiated goods, wherein each differentiated good set includes at least one differentiated good and an associated price, and each offer to trade is either an offer to purchase or an offer of sale, wherein:
    step (b) includes the processor determining the first abstraction further based on the set of first offers to trade, wherein:
    the differentiated goods available for exchange are advertising slots on television, internet or other media; and
    the properties by which advertising slots are differentiable are of interest to a set of at least one potential advertiser.

37. The method of claim 36, wherein at least one offer to trade is an offer to purchase that includes at least one set of one or more advertising slots and an associated price, and further includes at least one of the following:
    in connection with the Internet, a specification of at least one property of web-sites on which the one or more advertising slots occur;

in connection with the Internet, a specification of at least one property of the content or meta-tags of web-pages or web-sites on which the one or more advertising slots occur;

a specification of at least one temporal property of the one or more advertising slots;

a specification of at least one demographic property of at least one user who views the one or more advertising slots;

in connection with the Internet, a specification of at least one behavioral property of at least one user who views the one or more advertising slots, said behavioral property describing past web browsing, click-stream, or purchasing behavior of said user;

in connection with the Internet, a specification of at least one constraint on the advertisements that can be shown in other advertising slots spatially or temporally proximate to the one or more advertising slots;

a specification of a minimum quantity of the one or more advertising slots;

a specification of a maximum quantity of the one or more advertising slots;

a specification of at least one temporal constraint on the timing of two or more advertising slots or the advertisements displayed in said advertising slots;

in connection with the Internet, a specification of a price for a set of advertising slots based on per-impression, per-click, or per-action pricing;

a specification of a single price for an entire set of advertising slots;

a specification of price discounts or price bonuses based on reaching designated advertising slot volume thresholds;

in connection with television, a specification of at least one property of the TV shows on which the one or more advertising slots occur;

in connection with television, a specification of at least one property of the content of the TV shows on which the one or more advertising slots occur;

in connection with television, a specification of at least one demographic property of the audience of the TV show on which the one or more advertising slots occur;

in connection with television, a specification of at least one behavioral property of at least one user who views the one or more advertising slots, said behavioral property describing the past viewing behavior, remote control usage, or personal video recorder usage of said user;

in connection with television, a specification of at least one constraint on the advertisements that can be shown in other advertising slots in the same or temporally proximate commercial breaks as the one or more advertising slots; and in connection with television, a specification of a price for a set of advertising slots based on expected or actual demographic data of the TV audience.

* * * * *

UNITED STATES PATENT AND TRADEMARK OFFICE
CERTIFICATE OF CORRECTION

PATENT NO.        : 8,515,814 B2
APPLICATION NO.   : 12/616217
DATED             : August 20, 2013
INVENTOR(S)       : Craig E. Boutilier et al.

It is certified that error appears in the above-identified patent and that said Letters Patent is hereby corrected as shown below:

In the Claims:

Column 64, Line 28, Claim 1, delete "storing" and insert -- (e) storing --

Column 66, Line 32, Claim 10, delete "computer" and insert -- computer storage --

Column 68, Lines 61-62, Claim 18, delete "corn rising" and insert -- comprising --

Column 68, Line 63, Claim 18, delete "the" and insert -- (d) the --

Column 68, Line 65, Claim 18, delete "storing" and insert -- (e) storing --

Column 69, Line 3, Claim 18, delete "rood" and insert -- good --

Column 69, Line 28, Claim 18, before "a" delete "minimal"

Column 69, Line 44, Claim 20, delete "rood" and insert -- good --

Column 69, Line 50, Claim 20, delete "goods" and insert -- goods, --

Column 75, Line 44, Claim 35, delete "a" and insert -- (a), --

Column 76, Line 20, Claim 36, delete "pluality" and insert -- plurality --

Signed and Sealed this
Twenty-eighth Day of January, 2014

Michelle K. Lee
*Deputy Director of the United States Patent and Trademark Office*